US007849059B2

(12) United States Patent
Prahlad et al.

(10) Patent No.: US 7,849,059 B2
(45) Date of Patent: Dec. 7, 2010

(54) DATA CLASSIFICATION SYSTEMS AND METHODS FOR ORGANIZING A METABASE

(75) Inventors: Anand Prahlad, East Brunswick, NJ (US); Jeremy Alan Schwartz, Red Bank, NJ (US); David Ngo, Shrewsbury, NJ (US); Brian Brockway, Shrewsbury, NJ (US); Marcus S. Muller, Tinton Falls, NJ (US)

(73) Assignee: CommVault Systems, Inc., Oceanport, NJ (US)

( * ) Notice: Subject to any disclaimer, the term of this patent is extended or adjusted under 35 U.S.C. 154(b) by 140 days.

(21) Appl. No.: 11/605,931

(22) Filed: Nov. 28, 2006

(65) Prior Publication Data

US 2007/0198612 A1 Aug. 23, 2007

Related U.S. Application Data

(60) Provisional application No. 60/740,686, filed on Nov. 28, 2005, provisional application No. 60/752,203, filed on Dec. 19, 2005.

(51) Int. Cl.
*G06F 7/00* (2006.01)
*G06F 17/00* (2006.01)
*G06F 3/00* (2006.01)
*G06F 9/44* (2006.01)
*G06F 9/46* (2006.01)
*G06F 13/00* (2006.01)

(52) U.S. Cl. .................... 707/648; 715/229; 719/316
(58) Field of Classification Search ............... 707/200; 713/155

See application file for complete search history.

(56) References Cited

U.S. PATENT DOCUMENTS

| | | | |
|---|---|---|---|
| 4,686,620 A | 8/1987 | Ng | |
| 4,995,035 A | 2/1991 | Cole et al. | |
| 5,005,122 A | 4/1991 | Griffin et al. | |
| 5,093,912 A | 3/1992 | Dong et al. | |
| 5,133,065 A | 7/1992 | Cheffetz et al. | |

(Continued)

FOREIGN PATENT DOCUMENTS

EP          0259912          3/1988

(Continued)

OTHER PUBLICATIONS

Mehmet Aksit; Abtracting Object Interactions Using Compostion Filters; 1995; Springer Berling; ISSN 0302-9743; pp. 1-33.*

(Continued)

*Primary Examiner*—Neveen Abel Jalil
*Assistant Examiner*—Jermaine Mincey
(74) *Attorney, Agent, or Firm*—Knobbe, Martens, Olson & Bear, LLP

(57) ABSTRACT

Systems and methods for managing electronic data are disclosed. Various data management operations can be performed based on a metabase formed from metadata. Such metadata can be identified from an index of data interactions generated by a journaling module, and obtained from their associated data objects stored in one or more storage devices. In various embodiments, such processing of the index and storing of the metadata can facilitate, for example, enhanced data management operations, enhanced data identification operations, enhanced storage operations, data classification for organizing and storing the metadata, cataloging of metadata for the stored metadata, and/or user interfaces for managing data. In various embodiments, the metabase can be configured in different ways. For example, the metabase can be stored separately from the data objects so as to allow obtaining of information about the data objects without accessing the data objects or a data structure used by a file system.

23 Claims, 24 Drawing Sheets

U.S. PATENT DOCUMENTS

| | | |
|---|---|---|
| 5,193,154 A | 3/1993 | Kitajima et al. |
| 5,212,772 A | 5/1993 | Masters |
| 5,226,157 A | 7/1993 | Nakano et al. |
| 5,239,647 A | 8/1993 | Anglin et al. |
| 5,241,668 A | 8/1993 | Eastridge et al. |
| 5,241,670 A | 8/1993 | Eastridge et al. |
| 5,276,860 A | 1/1994 | Fortier et al. |
| 5,276,867 A | 1/1994 | Kenley et al. |
| 5,287,500 A | 2/1994 | Stoppani, Jr. |
| 5,321,816 A | 6/1994 | Rogan et al. |
| 5,333,315 A | 7/1994 | Saether et al. |
| 5,347,653 A | 9/1994 | Flynn et al. |
| 5,410,700 A | 4/1995 | Fecteau et al. |
| 5,448,724 A | 9/1995 | Hayashi |
| 5,491,810 A | 2/1996 | Allen |
| 5,495,607 A | 2/1996 | Pisello et al. |
| 5,504,873 A | 4/1996 | Martin et al. |
| 5,519,865 A | 5/1996 | Kondo et al. |
| 5,544,345 A | 8/1996 | Carpenter et al. |
| 5,544,347 A | 8/1996 | Yanai et al. |
| 5,559,957 A | 9/1996 | Balk |
| 5,619,644 A | 4/1997 | Crockett et al. |
| 5,638,509 A | 6/1997 | Dunphy et al. |
| 5,673,381 A | 9/1997 | Huai et al. |
| 5,699,361 A | 12/1997 | Ding et al. |
| 5,729,743 A | 3/1998 | Squibb |
| 5,737,747 A | 4/1998 | Vishlitzky et al. |
| 5,751,997 A | 5/1998 | Kullick et al. |
| 5,758,359 A | 5/1998 | Saxon |
| 5,761,677 A | 6/1998 | Senator et al. |
| 5,764,972 A | 6/1998 | Crouse et al. |
| 5,778,395 A | 7/1998 | Whiting et al. |
| 5,812,398 A | 9/1998 | Nielsen |
| 5,813,009 A | 9/1998 | Johnson et al. |
| 5,813,017 A | 9/1998 | Morris |
| 5,829,046 A | 10/1998 | Tzelnic et al. |
| 5,832,510 A | 11/1998 | Ito et al. |
| 5,875,478 A | 2/1999 | Blumenau |
| 5,887,134 A | 3/1999 | Ebrahim |
| 5,892,917 A | 4/1999 | Myerson |
| 5,901,327 A | 5/1999 | Ofek |
| 5,907,621 A * | 5/1999 | Bachman et al. ............ 713/155 |
| 5,924,102 A | 7/1999 | Perks |
| 5,950,205 A | 9/1999 | Aviani, Jr. |
| 5,953,721 A | 9/1999 | Doi et al. |
| 5,974,563 A | 10/1999 | Beeler, Jr. |
| 6,021,415 A | 2/2000 | Cannon et al. |
| 6,026,414 A | 2/2000 | Anglin |
| 6,052,735 A | 4/2000 | Ulrich et al. |
| 6,061,692 A * | 5/2000 | Thomas et al. ............. 707/200 |
| 6,076,148 A | 6/2000 | Kedem et al. |
| 6,094,416 A | 7/2000 | Ying |
| 6,131,095 A | 10/2000 | Low et al. |
| 6,131,190 A | 10/2000 | Sidwell |
| 6,148,412 A | 11/2000 | Cannon et al. |
| 6,154,787 A | 11/2000 | Urevig et al. |
| 6,154,852 A | 11/2000 | Amundson et al. |
| 6,161,111 A | 12/2000 | Mutalik et al. |
| 6,167,402 A | 12/2000 | Yeager |
| 6,175,829 B1 | 1/2001 | Li et al. |
| 6,212,512 B1 | 4/2001 | Barney et al. |
| 6,240,416 B1 | 5/2001 | Immon et al. |
| 6,260,069 B1 | 7/2001 | Anglin |
| 6,269,431 B1 | 7/2001 | Dunham |
| 6,275,953 B1 | 8/2001 | Vahalia et al. |
| 6,301,592 B1 | 10/2001 | Aoyama et al. |
| 6,324,581 B1 | 11/2001 | Xu et al. |
| 6,328,766 B1 | 12/2001 | Long |
| 6,330,570 B1 | 12/2001 | Crighton |
| 6,330,642 B1 | 12/2001 | Carteau |
| 6,343,324 B1 | 1/2002 | Hubis et al. |
| 6,350,199 B1 | 2/2002 | Williams et al. |
| RE37,601 E | 3/2002 | Eastridge et al. |
| 6,356,801 B1 | 3/2002 | Goodman et al. |
| 6,374,336 B1 | 4/2002 | Peters et al. |
| 6,389,432 B1 | 5/2002 | Pothapragada et al. |
| 6,418,478 B1 | 7/2002 | Ignatius et al. |
| 6,421,683 B1 | 7/2002 | Lamburt |
| 6,421,711 B1 | 7/2002 | Blumenau et al. |
| 6,421,779 B1 | 7/2002 | Kuroda et al. |
| 6,430,575 B1 | 8/2002 | Dourish et al. |
| 6,438,586 B1 | 8/2002 | Hass et al. |
| 6,487,561 B1 | 11/2002 | Ofek et al. |
| 6,487,644 B1 | 11/2002 | Huebsch et al. |
| 6,519,679 B2 | 2/2003 | Devireddy et al. |
| 6,538,669 B1 | 3/2003 | Lagueux, Jr. et al. |
| 6,542,909 B1 | 4/2003 | Tamer et al. |
| 6,542,972 B2 | 4/2003 | Ignatius et al. |
| 6,564,228 B1 | 5/2003 | O'Connor |
| 6,581,143 B2 | 6/2003 | Gagne et al. |
| 6,625,623 B1 | 9/2003 | Midgley et al. |
| 6,647,396 B2 | 11/2003 | Parnell et al. |
| 6,658,436 B2 | 12/2003 | Oshinsky et al. |
| 6,658,526 B2 | 12/2003 | Nguyen et al. |
| 6,732,124 B1 | 5/2004 | Koseki et al. |
| 6,763,351 B1 | 7/2004 | Subramaniam et al. |
| 6,775,790 B2 | 8/2004 | Reuter et al. |
| 6,847,984 B1 | 1/2005 | Midgley et al. |
| 6,871,163 B2 | 3/2005 | Hiller et al. |
| 6,886,020 B1 | 4/2005 | Zahavi et al. |
| 6,947,935 B1 | 9/2005 | Horvitz et al. |
| 6,983,322 B1 | 1/2006 | Tripp et al. |
| 6,996,616 B1 | 2/2006 | Leighton et al. |
| 7,003,519 B1 | 2/2006 | Biettron et al. |
| 7,035,880 B1 | 4/2006 | Crescenti et al. |
| 7,103,740 B1 | 9/2006 | Colgrove et al. |
| 7,130,970 B2 | 10/2006 | Devassy et al. |
| 7,167,895 B1 | 1/2007 | Connelly |
| 7,181,444 B2 | 2/2007 | Porter et al. |
| 7,240,100 B1 | 7/2007 | Wein et al. |
| 7,246,207 B2 | 7/2007 | Kottomtharayil et al. |
| 7,246,211 B1 | 7/2007 | Beloussov et al. |
| 7,330,997 B1 | 2/2008 | Odom |
| 7,346,623 B2 | 3/2008 | Prahlad et al. |
| 7,346,676 B1 | 3/2008 | Swildens et al. |
| 7,359,917 B2 | 4/2008 | Winter et al. |
| 7,454,569 B2 | 11/2008 | Kavuri et al. |
| 7,500,150 B2 | 3/2009 | Sharma et al. |
| 7,529,748 B2 | 5/2009 | Wen et al. |
| 7,533,103 B2 | 5/2009 | Brendle et al. |
| 7,590,997 B2 | 9/2009 | Perez |
| 7,613,752 B2 | 11/2009 | Prahlad et al. |
| 7,627,598 B1 | 12/2009 | Burke |
| 7,627,617 B2 | 12/2009 | Kavuri et al. |
| 2002/0004883 A1 | 1/2002 | Nguyen et al. |
| 2002/0049738 A1 * | 4/2002 | Epstein ........................ 707/1 |
| 2002/0069324 A1 | 6/2002 | Gerasimov et al. |
| 2002/0083055 A1 * | 6/2002 | Pachet et al. ................. 707/5 |
| 2002/0087550 A1 | 7/2002 | Carlyle et al. |
| 2002/0133476 A1 | 9/2002 | Reinhardt |
| 2002/0174107 A1 * | 11/2002 | Poulin ........................ 707/3 |
| 2003/0018607 A1 | 1/2003 | Lennon et al. |
| 2003/0115219 A1 | 6/2003 | Chadwick |
| 2003/0130993 A1 | 7/2003 | Mendelevitch et al. |
| 2003/0182583 A1 | 9/2003 | Turco |
| 2004/0003132 A1 * | 1/2004 | Stanley et al. ............. 709/316 |
| 2004/0010487 A1 | 1/2004 | Prahlad et al. |
| 2004/0010493 A1 | 1/2004 | Kojima et al. |
| 2004/0015468 A1 * | 1/2004 | Beier et al. ................... 707/1 |
| 2004/0015514 A1 | 1/2004 | Melton et al. |
| 2004/0139059 A1 | 7/2004 | Conroy et al. |
| 2004/0141661 A1 | 7/2004 | Hanna et al. |
| 2004/0254919 A1 * | 12/2004 | Giuseppini ................... 707/3 |
| 2004/0260678 A1 * | 12/2004 | Verbowski et al. ............. 707/3 |

| | | |
|---|---|---|
| 2005/0021537 A1 | 1/2005 | Brendle et al. |
| 2005/0033800 A1 | 2/2005 | Kavuri et al. |
| 2005/0044114 A1 | 2/2005 | Kottomtharayil et al. |
| 2005/0050075 A1 | 3/2005 | Okamoto et al. |
| 2005/0114406 A1 | 5/2005 | Borthakur |
| 2005/0154695 A1 | 7/2005 | Gonzalez et al. |
| 2005/0182773 A1 | 8/2005 | Feinsmith |
| 2005/0182797 A1 | 8/2005 | Adkins et al. |
| 2005/0188248 A1 | 8/2005 | O'Brien et al. |
| 2005/0193128 A1 | 9/2005 | Dawson et al. |
| 2005/0198559 A1* | 9/2005 | Fujiwara ............... 715/500 |
| 2005/0203964 A1 | 9/2005 | Matsunami et al. |
| 2005/0216453 A1 | 9/2005 | Sasaki et al. |
| 2005/0228794 A1 | 10/2005 | Navas et al. |
| 2005/0257083 A1 | 11/2005 | Cousins |
| 2005/0262097 A1 | 11/2005 | Sim-Tang et al. |
| 2005/0289193 A1 | 12/2005 | Arrouye et al. |
| 2006/0004820 A1 | 1/2006 | Claudatos et al. |
| 2006/0010227 A1 | 1/2006 | Atluri |
| 2006/0031225 A1 | 2/2006 | Palmeri et al. |
| 2006/0031263 A1 | 2/2006 | Arrouye et al. |
| 2006/0031287 A1 | 2/2006 | Ulrich et al. |
| 2006/0101285 A1 | 5/2006 | Chen et al. |
| 2006/0106814 A1 | 5/2006 | Blumenau et al. |
| 2006/0224846 A1 | 10/2006 | Amarendran et al. |
| 2006/0253495 A1 | 11/2006 | Png |
| 2006/0259468 A1 | 11/2006 | Brooks et al. |
| 2006/0294094 A1 | 12/2006 | King et al. |
| 2007/0033191 A1 | 2/2007 | Hornkvist et al. |
| 2007/0112809 A1 | 5/2007 | Arrouye et al. |
| 2007/0179995 A1 | 8/2007 | Prahlad et al. |
| 2007/0185914 A1 | 8/2007 | Prahlad et al. |
| 2007/0185915 A1 | 8/2007 | Prahlad et al. |
| 2007/0185916 A1 | 8/2007 | Prahlad et al. |
| 2007/0185917 A1 | 8/2007 | Prahlad et al. |
| 2007/0185921 A1 | 8/2007 | Prahlad et al. |
| 2007/0185925 A1 | 8/2007 | Prahlad et al. |
| 2007/0185926 A1 | 8/2007 | Prahlad et al. |
| 2007/0192360 A1 | 8/2007 | Prahlad et al. |
| 2007/0192385 A1 | 8/2007 | Prahlad et al. |
| 2007/0198570 A1 | 8/2007 | Prahlad et al. |
| 2007/0198593 A1 | 8/2007 | Prahlad et al. |
| 2007/0198601 A1 | 8/2007 | Prahlad et al. |
| 2007/0198608 A1 | 8/2007 | Prahlad et al. |
| 2007/0198611 A1 | 8/2007 | Prahlad et al. |
| 2007/0198612 A1 | 8/2007 | Prahlad et al. |
| 2007/0198613 A1 | 8/2007 | Prahlad et al. |
| 2007/0203937 A1 | 8/2007 | Prahlad et al. |
| 2007/0203938 A1 | 8/2007 | Prahlad et al. |
| 2007/0288536 A1 | 12/2007 | Sen et al. |
| 2008/0021921 A1 | 1/2008 | Horn |
| 2008/0059515 A1 | 3/2008 | Fulton |
| 2008/0091655 A1 | 4/2008 | Gokhale et al. |
| 2008/0228771 A1 | 9/2008 | Prahlad et al. |
| 2008/0243796 A1 | 10/2008 | Prahlad et al. |
| 2008/0249996 A1 | 10/2008 | Prahlad et al. |
| 2008/0294605 A1 | 11/2008 | Prahlad et al. |
| 2009/0287665 A1 | 11/2009 | Prahlad et al. |

FOREIGN PATENT DOCUMENTS

| | | |
|---|---|---|
| EP | 0405926 | 1/1991 |
| EP | 0467546 | 1/1992 |
| EP | 0774715 | 5/1997 |
| EP | 0809184 | 11/1997 |
| EP | 0899662 | 3/1999 |
| EP | 0981090 | 2/2000 |
| EP | 1174795 | 1/2002 |
| WO | WO-95/13580 | 5/1995 |
| WO | WO-99/12098 | 3/1999 |
| WO | WO 99/14692 | 3/1999 |
| WO | WO 03/060774 | 7/2003 |
| WO | WO 2005/055093 | 6/2005 |
| WO | WO /US2006/045556 | 11/2006 |
| WO | WO /US2006/061304 | 11/2006 |
| WO | WO 2007/062254 A2 | 5/2007 |
| WO | WO 2007/062429 A3 | 5/2007 |
| WO | WO 2008/049023 A3 | 4/2008 |

OTHER PUBLICATIONS

"Text Figures," retrieved from http://www.microsoft.com/msj/1198.ntfs/ntfstextfigs.htm on Nov. 10, 2005, 7 pages.

Richter et al., "A File System for the 21st Century: Previewing the Windows NT 5.0 Files System," Nov. 1998, reieved from http://www.rnicrosoft.com/msj/1198/ntfs/ntfs.aspx on Nov. 10, 2005, 17 pages.

Microsoft, "WiN32_File_Attribute_Data," updated Sep. 2005, retrieved from http://msdn.microsoft.com/library/en-us/fileio/fs/win32_file_attribute_data_str.asp?frame on Nov. 10, 2005, 3 pages.

Microsoft, "GetFileAttributesEx," updated Sep. 2005, retrieved from http://msdn.microsoft.com/library/en-us/fileio/fs/getfileattributesex.asp?frame=true on Nov. 10, 2005, 2 pages.

Microsoft, "GetFileAttributes," updated Sep. 2005, retrieved from http://msdn.microsoft.com/library/en-us/fileio/fs/getfileattributes.asp?frame=true on Nov. 10, 2005, 3 pages.

Cooperstein et al., "Keeping an Eye on Your NTFS Drives: The Windows 2000 Change Journal Explained," Sep. 1999, retrieved from http://www.microsoft.com/msj/0999/journal/journal.aspx on Nov. 10, 2005, 17 pages.

Cooperstein et al., "Keeping an Eye on Your NTFS Drives, Part II: Building a Change Journal Application," Oct. 1999, retrieved from http://www.microsoft.com/msj/1099/journal2/journal2.aspx on Nov. 10, 2005, 14 pages.

Brad O'Neill, "New Tools to Classify Data," Storage Magazine, Aug. 2005, retrieved from http://storagemagazine.techtarget.com/magPrintFriendly/0,293813,sid35_gci1114703,00.html on Aug. 25, 2005, 4 pages.

Karl Langdon et al., "Data Classification: Getting Started," Storage Magazine, Jul. 2005, retrieved from http://storagemagazine.techtarget.com/magPrintFriendly/0,293813,sid35_gci1104445,00.html; on Aug. 25, 2005, 3 pages.

Communication with extended European Search Report for Application No. PCT/US2006/061304, dated Dec. 30, 2008.

U.S. Appl. No. 11/931,034, filed Oct. 31, 2007, Kottomtharayil et al.

U.S. Appl. No. 12/058,487, filed Mar. 28, 2008, Prahlad.

U.S. Appl. No. 12/058,575, filed Mar. 28, 2008, Prahlad et al.

U.S. Appl. No. 12/058,589, filed Mar. 28, 2008, Prahlad et al.

Search Report for European Application No. 06 844 595.6, Mail Date: Sep. 26, 2008, 5 pages.

PCT International Search Report and Written Opinion for International Application No. PCT/US07/81681, Mail Date: Oct. 20, 2008, 7 pages.

U.S. Appl. No. 12/511,653, filed Jul. 29, 2009, Prahlad et al.

U.S. Appl. No. 12/548,953, filed Aug. 27, 2009, Ahn et al.

U.S. Appl. No. 12/695,203, filed Jan. 28, 2010, Prahlad et al.

U.S. Appl. No. 12/695,289, filed Jan. 28, 2010, Prahlad et al.

Examination Report for European Application No. 06 844 595.6, Mail Date: Sep. 26, 2008, 5 pages.

PCT International Search Report and Written Opinion for International Application No. PCT/US07/81681, Mail Date Nov. 13, 2009, 8 pages.

Armstead et al., "Implementation of a Campus-wide Distributed Mass Storage Service: The Dream vs. Reality," *IEEE*, 1995, pp. 190-199.

Arneson, David A., Control Data Corporation, *Development of Omniserver*, Mass Storage Systems, 1990, pp. 88-93.

Arneson, "Mass Storage Archiving in Network Environments," Digest of Papers, Ninth IEEE Symposium on Mass Storage Systems, Oct. 31, 1998-Nov. 3, 1988, pp. 45-50, Monterey, CA.

Cabrera et al., "ADSM: A Multi-Platform, Scalable, Backup and Archive Mass Storage System," Digest of Papers, Compcon '95, Proceedings of the 40th IEEE Computer Society International Conference, Mar. 5, 1995-Mar. 9, 1995, pp. 420-427, San Francisco, CA.

Eitel, "Backup and Storage Management in Distributed Heterogeneous Environments," *IEEE*, 1994, pp. 124-126.

Jander, M., "Launching Storage-Area Net," *Data Communications*, US, McGraw Hill, NY, vol. 27, No. 4 (Mar. 21, 1998), pp. 64-72.

Jason Gait, "The Optical File Cabinet: A Random-Access File System for Write-Once Optical Disks," *IEEE Computer*, vol. 21, No. 6, pp. 11-22 (1988).

Rosenblum et al., "The Design and Implementation of a Log-Structured File System," *Operating Systems Review SIGOPS*, vol. 25, No. 5, New York, US, pp. 1-15 (May 1991).

Partial International Search Results, mailed May 25, 2007, International Application No. PCT/US2006/045556, 2 pages.

* cited by examiner

DATA CLASSIFICATION SYSTEMS AND METHODS FOR ORGANIZING A METABASE

RELATED APPLICATIONS

This application claims the benefit of priority under 35 U.S.C. §119(e) of U.S. Provisional Application No. 60/740,686, entitled "Systems and Method for Classifying Information in a Storage Network," filed Nov. 28, 2005, and U.S. Provisional Application No. 60/752,203, entitled "Systems and Methods for Classifying and Transferring Information in a Storage Network," filed Dec. 19, 2005, each of which is hereby incorporated herein by reference in its entirety.

The present disclosure relates to U.S. patent application Ser. No. 11/563940, titled "METABASE FOR FACILITATING DATA CLASSIFICATION," U.S. patent application Ser. No. 11/564130, titled "SYSTEMS AND METHODS FOR USING METADATA TO ENHANCE DATA MANAGEMENT OPERATIONS," U.S. patent application Ser. No. 11/564,174, titled "SYSTEMS AND METHODS FOR USING METADATA TO ENHANCE DATA IDENTIFICATION OPERATIONS," U.S. patent application Ser. No. 11/564,177, titled "SYSTEMS AND METHODS FOR USING METADATA TO ENHANCE STORAGE OPERATIONS," U.S. patent application Ser. No. 11/605,944, titled "SYSTEMS AND METHODS FOR CATALOGING METADATA FOR A METABASE," and U.S. patent application Ser. No. 11/605,932, titled "USER INTERFACES AND METHODS FOR MANAGING DATA IN A METABASE," each filed on even date herewith and each hereby incorporated by reference herein in their entirety.

One or more embodiments of the present disclosure may also be used with systems and methods disclosed in the following patents and pending U.S. patent applications, each of which is hereby incorporated herein by reference in its entirety:

U.S. patent application Ser. No. 09/354,058, entitled "Hierarchical Backup and Retrieval System," filed Jul. 15, 1999;

U.S. Pat. No. 6,418,478, entitled "Pipelined High Speed Data Transfer Mechanism," issued Jul. 9, 2002;

U.S. patent application Ser. No. 09/610,738, entitled "Modular Backup and Retrieval System Used in Conjunction with a Storage Area Network," filed Jul. 6, 2000;

U.S. Pat. No. 6,542,972, entitled "Logical View and Access to Physical Storage in Modular Data and Storage Management System," issued Apr. 1, 2003;

U.S. Pat. No. 6,658,436, entitled "Logical View and Access to Data Manage by a Modular Data and Storage Management System," issued Dec. 2, 2003;

U.S. patent application Ser. No. 10/658,095, entitled "Dynamic Storage Device Pooling in a Computer System," filed Sep. 9, 2003;

U.S. patent application Ser. No. 10/262,556, entitled "Method for Managing Snapshots Generated by an Operating System or Other Application," filed Sep. 30, 2002;

U.S. patent application Ser. No. 10/818,749, entitled "System and Method for Dynamically Performing Storage Operations in a Computer Network," filed Apr. 5, 2004;

U.S. patent application Ser. No. 10/877,831, entitled "Hierarchical System and Method for Performing Storage Operations in a Computer Network," filed Jun. 25, 2004;

U.S. patent application Ser. No. 11/313,256, entitled "System and Method for Containerized Data Storage and Tracking," filed Dec. 19, 2005;

U.S. Patent Application No. 60/752,198, entitled "Systems and Methods for Granular Resource Management in a Storage Network," filed Dec. 19, 2005;

U.S. patent application Ser. No. 11/313,224, entitled "Systems and Methods for Performing Multi-Path Storage Operations," filed Dec. 19, 2005;

U.S. Patent Application No. 60/752,196, entitled "Systems and Methods for Migrating Components in a Hierarchical Storage Network," filed Dec. 19, 2005;

U.S. Patent Application No. 60/752,202, entitled "Systems and Methods for Unified Reconstruction of Data in a Storage Network," filed Dec. 19, 2005;

U.S. Patent Application No. 60/752,201, entitled "Systems and Methods for Resynchronizing Storage Operations," filed Dec. 19, 2005 ; and U.S. Patent Application No. 60/752,197, entitled "Systems and Methods for Hierarchical Client Group Management," filed Dec. 19, 2005.

COPYRIGHT NOTICE

A portion of the disclosure of this patent document contains material that is subject to copyright protection. The copyright owner has no objection to the facsimile reproduction by anyone of the patent document or the patent disclosures, as it appears in the Patent and Trademark Office patent files or records, but otherwise reserves all copyright rights whatsoever.

BACKGROUND

1. Field

Embodiments of the present disclosure relate generally to performing operations on electronic data in a computer network. More particularly, embodiments of the present disclosure relate to detecting data interactions within a computer network and/or performing storage-related operations according to one or more classification paradigms.

2. Description of the Related Art

Current storage management systems employ a number of different methods to perform storage operations on electronic data. For example, data can be stored in primary storage as a primary copy or in secondary storage as various types of secondary copies including, as a backup copy, a snapshot copy, a hierarchical storage management copy ("HSM"), an archive copy, and other types of copies.

A primary copy of data is generally a production copy or other "live" version of the data which is used by a software application and is generally in the native format of that application. Such primary copy data is typically intended for short term retention (e.g., several hours or days) before some or all of the data is stored as one or more secondary copies, such as, for example, to prevent loss of data in the event a problem occurred with the data stored in primary storage.

Secondary copies include point-in-time data and are typically intended for long-term retention (e.g., weeks, months or years) before some or all of the data is moved to other storage or is discarded. Secondary copies may be indexed so users can browse and restore the data at another point in time. After certain primary copy data is backed up, a pointer or other location indicia such as a stub may be placed in the primary copy to indicate the current location of that data.

One type of secondary copy is a backup copy. A backup copy is generally a point-in-time copy of the primary copy data stored in a backup format, as opposed to a native application format. For example, a backup copy may be stored in a backup format that facilitates compression and/or efficient long-term storage. Backup copies generally have relatively long retention periods and may be stored on media with slower retrieval times than other types of secondary copies and media. In some cases, backup copies may be stored at on offsite location.

Another form of secondary copy is a snapshot copy. From an end-user viewpoint, a snapshot may be thought of as an instant image of the primary copy data at a given point in time. A snapshot generally captures the directory structure of a primary copy volume at a particular moment in time and may also preserve file attributes and contents. In some embodiments, a snapshot may exist as a virtual file system, parallel to the actual file system. Users typically gain read-only access to the record of files and directories of the snapshot. By electing to restore primary copy data from a snapshot taken at a given point in time, users may also return the current file system to the state of the file system that existed when the snapshot was taken.

A snapshot may be created instantly, using a minimum amount of file space, but may still function as a conventional file system backup. A snapshot may not actually create another physical copy of all the data, but may simply create pointers that are able to map files and directories to specific disk blocks.

In some embodiments, once a snapshot has been taken, subsequent changes to the file system typically do not overwrite the blocks in use at the time of the snapshot. Therefore, the initial snapshot may use only a small amount of disk space needed to record a mapping or other data structure representing or otherwise tracking the blocks that correspond to the current state of the file system. Additional disk space is usually required only when files and directories are actually modified later. Furthermore, when files are modified, typically only the pointers which map to blocks are copied, not the blocks themselves. In some embodiments, for example in the case of copy-on-write snapshots, when a block changes in primary storage, the block is copied to secondary storage before the block is overwritten in primary storage. The snapshot mapping of file system data is also updated to reflect the changed block(s) at that particular point in time.

An HSM copy is generally a copy of the primary copy data but typically includes only a subset of the primary copy data that meets a certain criteria and is usually stored in a format other than the native application format. For example, an HSM copy may include data from the primary copy that is larger than a given size threshold or older than a given age threshold and that is stored in a backup format. Often, HSM data is removed from the primary copy, and a stub is stored in the primary copy to indicate the new location of the HSM data. When a user requests access to the HSM data that has been removed or migrated, systems use the stub to locate the data and often make recovery of the data appear transparent, even though the HSM data may be stored at a location different from the remaining primary copy data.

An archive copy is generally similar to an HSM copy. However, the data satisfying criteria for removal from the primary copy is generally completely removed with no stub left in the primary copy to indicate the new location (i.e., where the archive copy data has been moved to). Archive copies of data are generally stored in a backup format or other non-native application format. In addition, archive copies are generally retained for very long periods of time (e.g., years) and, in some cases, are never deleted. In certain embodiments, such archive copies may be made and kept for extended periods in order to meet compliance regulations or for other permanent storage applications.

In some embodiments, application data over its lifetime moves from more expensive quick access storage to less expensive slower access storage. This process of moving data through these various tiers of storage is sometimes referred to as information lifecycle management ("ILM"). This is the process by which data is "aged" from forms of primary storage with faster access/restore times down through less expensive secondary storage with slower access/restore times. For example, such aging may occur as data becomes less important or mission critical over time.

Regardless of where data is stored, conventional storage management systems perform storage operations associated with electronic data based on location-specific criteria. For example, data generated by applications running on a particular client is typically copied according to location-specific criteria, such as from a specific folder or subfolder, according to a specified data path. A module installed on the client or elsewhere in the system may supervise the transfer of data from the client to another location in a primary or secondary storage.

Similar data transfers associated with location-specific criteria are performed when restoring data from secondary storage to primary storage. For example, to restore data a user or system process generally must specify a particular secondary storage device, piece of media, or archive file. Thus, the precision with which conventional storage management systems perform storage operations on electronic data is generally limited by the ability to define or specify storage operations based on data location.

Moreover, when identifying data objects, such as files associated with performing storage operations, conventional storage systems often scan the file system of a client or other computing device to determine which data objects on the client should be associated with the storage operation. This may involve traversing the entire file system of the client prior to performing storage operations. This process is typically time-consuming and uses significant client resources. In view of the foregoing, there is a need for systems and methods for performing more precise and efficient storage operations.

SUMMARY

Certain embodiments of the present disclosure provide systems and methods for data classification to facilitate and improve data management within an enterprise. In certain embodiments, the disclosed systems and methods evaluate and define data management operations based on data characteristics rather than, or in addition to, data location. Also provided are methods for generating a data structure of metadata that describes system data and storage operations. In certain embodiments, this data structure may be consulted to determine changes in system data rather than scanning the data files themselves.

One embodiment of the present disclosure relates to a method for managing electronic data in one or more storage devices. The method includes receiving from a journaling module an index of data interactions made by one or more applications to one or more data objects on at least one storage device. The method further includes processing the index to identify at least one data interaction with at least one of the data objects. The method further includes obtaining the metadata associated with the at least one data interaction. The method further includes storing the metadata associated with the at least one data interaction in a metabase.

In one embodiment, data object comprises a data file. In one embodiment, the metabase does not store the entire contents of the data objects. In one embodiment, the metabase is stored separately from the data objects. In one embodiment, the metabase is stored on a storage device different than the at least one storage device. In one embodiment, the metabase is configured to allow obtaining of information about the plurality of data objects without accessing a data structure used by a file system. In one embodiment, the data interactions are controlled by at least a first processor and the metabase is controlled by a second processor. In one embodiment, the method further includes accessing the metadata one or more times to update the metabase. In one embodiment, the journaling module comprises an application separate from the applications associated with the data interactions. In one embodiment, the method further includes compiling the index of data interactions. In one embodiment, the storing comprises updating the metadata stored in the metabase.

In one embodiment, the method additionally includes receiving a selection criteria, and accessing the metabase to identify which of the plurality of data objects satisfies the selection criteria without accessing the plurality of data objects on the at least one storage device. In one embodiment, the selection criteria identifies data objects subject to a data migration policy.

In one embodiment, the method additionally includes initially populating the metabase by traversing the plurality of data objects to access available metadata associated with the plurality of data objects.

Another embodiment of the present disclosure relates to a system for managing electronic data in a network environment. The system includes at least one storage device configured to store one or more data objects. The system further includes a journal file populated by a monitoring module, with the journal file comprising a list of data interactions between at least one application and at least of one of the data objects. The system further includes a classification module configured to process the journal file to identify at least one data interaction with at least one of the data objects, with the classification module being further configured to obtain the metadata associated with the data object. The system further includes a metabase comprising a plurality of records, with at least one record storing the metadata associated with the data object.

In one embodiment, the at least one data object interaction comprises a modification of the at least one data object. In one embodiment, the classification module is further configured to update the plurality of records in the metabase based at least in part on the metadata obtained from the data object. In one embodiment, for each listed data interaction in the journal file, the journal file comprises at least one of an update sequence number and a change journal reason code. In one embodiment, the classification module is further configured to initially populate the metabase by traversing the at least one storage device to access available metadata associated with the data objects. In one embodiment, the system further includes a first processor and a second processor. Operations associated with the monitoring module are substantially controlled by the first processor and operations associated with the metabase are substantially controlled by the second processor. In one embodiment, the journal file is associated with a first computing device and the metabase is associated with a second computing device.

In one embodiment, the metabase comprises a centralized metabase in communication with a plurality of computing devices. In one embodiment, each of the plurality of computing devices has its own journal file. In one embodiment, at least some of the plurality of records includes an identifier that indicates which computing device, and where on that computing device, the metadata is located to allow comparison with a selection criteria without accessing the data objects.

In one embodiment, the classification module is located outside a data flow path between the at least one application and the data objects on the at least one storage device.

In one embodiment, the at least one storage device comprises a first storage device and a second storage device. In one embodiment, the system further includes a management module configured to access the metabase to determine which of the plurality of data objects on the first storage device is subject to a data transfer policy. In one embodiment, the management module performs the determination without accessing the plurality of data objects on the first storage device. In one embodiment, the first storage device comprises a primary storage device and the second storage device comprises a secondary storage device. In one embodiment, the management module is configured to copy a first data object of the plurality of data objects on the first storage device to the second storage device. In one embodiment, the metabase comprises first and second metabases, the first metabase having records storing metadata associated with the data objects on the first storage device and the second metabase having records storing metadata associated with the data objects on the second storage device. In one embodiment, the metabase is updated according to locations of the data objects.

Yet another embodiment of the present disclosure relates to a system for managing electronic data in a network environment. The system includes means for receiving from a journaling module an index of data interactions between at least one application and one or more data objects. The system further includes means for processing the index to identify at least one data interaction with at least one data object. The system further includes means for obtaining metadata associated with the at least one data object. The system further includes means for storing the metadata. The metadata in the means for storing is separate from the at least one data object.

In one embodiment, the means for processing is located outside a data flow path between the at least one application and the plurality of data objects. In one embodiment, the journaling module is located in the data flow path.

Yet another embodiment of the present disclosure relates to a method for managing the transfer of electronic data in a storage system. The method includes receiving a monitor index having a plurality of entries identifying data interactions made by at least one application to a plurality of data objects on first and second storage devices, with the entries in the monitor index being populated by a journaling application. The method further includes updating, based on the monitor index entries, metadata stored in a metabase. The method further includes evaluating a selected criteria for transferring at least one data object from the first storage device to the second storage device, with the evaluating comprising accessing the metadata stored in the metabase. The method further includes identifying a first data object, of the plurality of data objects, that satisfies the selected criteria.

In one embodiment, the method further includes performing at least one transferring operation on the first data object based on the selected criteria. In one embodiment, the accessing of the metadata stored in the metabase is performed without accessing the data objects stored in the first storage device. In one embodiment, the method further includes accessing one or more metadata associated with the corresponding data objects again one or more times to update the metabase. In one embodiment, the identifying further comprises providing a file reference number associated with the first data object. In one embodiment, the identifying further comprises providing a path indicative of a location of the first data object on the first storage device. In one embodiment, the selected criteria comprises at least one of a schedule policy, a storage policy and a migration policy.

In one embodiment, the method additionally includes copying the first data object from a first location on the first storage device to a second location on the second storage device. In one embodiment, the method additionally includes updating the metabase to reflect the second location of the first data object on the second storage device. In one embodiment, the metabase comprises first and second metabases. The first metabase is associated with the first storage device and the second metabase is associated with the second storage device. In one embodiment, the updating comprises updating one or more records of the second metabase. In one embodiment, the method additionally includes removing records on the first metabase associated with the metadata of the first data object. In one embodiment, the method additionally includes storing on the first storage device reference data that identifies the second location of the first data object on the second storage device.

Yet another embodiment of the present disclosure relates to a system for managing the transfer of electronic data between a plurality of storage devices. The system includes a first storage device having a plurality of data objects. The system further includes a second storage device. The system further includes a selected criteria for copying at least one of the plurality of data objects on the first storage device to the second storage device. The system further includes at least one metabase having a plurality of records comprising metadata associated with the plurality of data objects. The system further includes a classification module configured to evaluate a monitor index generated by a journal program. The monitor index includes a list of interactions between at least one application and the plurality of data objects. The classification module is further configured to update the metadata stored in the at least one metabase based on interactions identified by the monitor index. The system further includes a management module configured to access the at least one metabase to identify a first data object, of the plurality of data objects, that satisfies the selected criteria.

In one embodiment, the interactions identified by the monitor index comprise interactions that modify metadata of at least a portion of the plurality of data objects. In one embodiment, the management module accesses the at least one metabase without accessing the plurality of data objects on the first storage device. In one embodiment, the journal program is different than the at least one application. In one embodiment, the classification module is located outside an input/output (I/O) path between the at least one application and the first storage device. In one embodiment, the classification module is managed by a first processor and the interactions are managed by a second processor.

In one embodiment, the management module is further configured to transfer the first data object from the first storage device to the second storage device. In one embodiment, the first storage device comprises a faster access time than the second storage device.

In one embodiment, the at least one metabase comprises a first metabase and a second metabase. Records stored in the first metabase correspond to metadata of the plurality of data objects stored on the first storage device, and records stored in the second metabase correspond to metadata of a second plurality of data objects stored on the second storage device. In one embodiment, the system further includes a master index identifying information stored on the first and second metabases.

In one embodiment, at least a portion of the at least one metabase is stored on the first storage device.

Yet another embodiment of the present disclosure relates to a system for managing the transfer of electronic data stored on a plurality of storage devices. The system includes first means for storing a first plurality of data objects. The system further includes second means for storing a second plurality of data objects. The system further includes means for identifying at least one of the first plurality of data objects to be transferred from the first storing means to the second storing means. The system further includes third means for storing metadata associated with the first plurality of data objects. The system further includes means for processing a journal file comprising a list of interactions between at least one application and the plurality of data objects, with the processing means being further configured to update the third storing means based on interactions identified by the journal file. The system further includes means for accessing the third storing means to identify a first data object, of the plurality of data objects, that satisfies the selected criteria.

In one embodiment, the metadata is stored separate from the entire contents of the data objects. In one embodiment, the identified interactions comprise interactions that modify metadata of at least a portion of the plurality of data objects. In one embodiment, the accessing of the third storing means is performed without accessing the plurality of data objects on the first storing means. In one embodiment, the selected criteria comprises a data storage migration policy.

Yet another embodiment of the present disclosure relates to a method for performing data identification operations involving electronic data. The method includes receiving an index generated by a journal application, with the index identifying data interactions made by at least one other application to one or more data objects on a storage device. The method further includes updating, based on the index, metadata stored in a metabase. The method further includes receiving selected criteria identifying one or more properties of at least one data object. The method further includes accessing the metabase according to the selected criteria without accessing the data objects on the storage device. The method further includes identifying, based on the accessing, the at least one data object that satisfies the selected criteria.

In one embodiment, the metadata in the metabase are stored separate from the entire content of each of the data objects. In one embodiment, accessing of the metabase is performed without accessing the data objects on the storage device. In one embodiment, the method further includes accessing one or more of the metadata associated with the corresponding data objects again one or more times to update the metabase.

In one embodiment, the method additionally includes receiving the selected criteria from a user. In one embodiment, the method additionally includes providing a graphical user interface for prompting the selected criteria.

In one embodiment, the selected criteria comprises identification and tracking of the data interactions on a user or group basis. In one embodiment, the data interactions comprise at least one of a read operation, a write operation and an access operation. In one embodiment, the access operation comprises at least one of web-page access, electronic gaming interaction, chat-room access, instant messaging, communication interaction and multimedia interaction.

In one embodiment, the accessing comprises accessing a plurality of metabases. In one embodiment, the at least one storage device comprises a plurality of storage devices and each of the plurality of metabases is associated with one of the plurality of storage devices. In one embodiment, the method additionally includes accessing a metadata index to determine which of the plurality of metabases is likely to contain information relating to the selected criteria.

In one embodiment, the identifying comprises providing a storage device path of the at least one data object. In one embodiment, the identifying comprises providing a file reference number of the at least one data object.

Yet another embodiment of the present disclosure relates to a system for performing data identification operations involving electronic data. The system includes at least one storage device configured to store a plurality of data objects having metadata and content associated therewith. The system further includes a journal file maintained by a monitoring module, with the journal file identifying data operations directed to one or more of the plurality of data objects by at least one application. The system further includes at least one metabase comprising a plurality of records storing the metadata associated with the plurality of data objects, with the plurality of records being updated based on information obtained from the journal file. The system further includes a processor configured to receive a selected criteria and to access the at least one metabase to identify at least one data object of the plurality of data objects that satisfies the selected criteria.

In one embodiment, the at least one metabase does not store the entire content of each of the plurality of data objects. In one embodiment, the access of the at least one metabase is performed without accessing the plurality of data objects on the at least one storage device. In one embodiment, the system further includes a classification module configured to update the plurality of records on the at least one metabase, with the classification module being located outside a data flow path between the at least one application and the plurality of data objects.

In one embodiment, the processor comprises first and second processors. The first processor is configured to access the at least one metabase and the second processor is configured handle the data operations associated with the plurality of data objects on the at least one storage device. In one embodiment, the first processor is associated with a first computing device and the second processor is associated with a second computing device.

In one embodiment, the at least one storage device comprises multiple storage devices and the at least one metabase comprises multiple metabases, with each of the multiple metabases being associated with one of the multiple storage devices. In one embodiment, the multiple storage devices comprise a primary storage device having production data and a secondary storage device having one or more copies of at least some of the production data. In one embodiment, the secondary storage device has at least some additional data other than the one or more copies of the at least some of the production data. In one embodiment, the processor is further configured to access each of the multiple metabases.

Yet another embodiment of the present disclosure relates to a system for performing data identification operations involving electronic data. The system includes means for storing a plurality of data objects. The system further includes means for identifying data operations directed to one or more of the data objects by at least one application, with the means for identifying being generated by a journaling module. The system further includes means for storing metadata associated with the data objects, where the means for storing metadata is updated based on selected ones of the data operations identified by the means for identifying. The system further includes means for accessing the means for storing metadata based on at least one selected criteria to identify at least one data object corresponding to the selected criteria without accessing the data objects located on the means for storing the data objects.

In one embodiment, the selected ones of the data operations result in modification of the metadata of at least one of the data objects. In one embodiment, the identifying of the at least one data object is performed without accessing the data objects on the first storing means. In one embodiment, the system further includes means for receiving the selected criteria.

Yet another embodiment of the present disclosure relates to a method for managing electronic data in a storage system. The method includes storing a plurality of data objects in a storage device. The method further includes receiving a log having a plurality of entries identifying data interactions between at least one application and one or more of the plurality of data objects, with the log entries being populated by a journaling application. The method further includes updating, based on the log entries, metadata stored in a metabase. The method further includes accessing a selection criteria regarding performing at least one storage operation on at least one of the plurality of data objects based on the metadata. The method further includes identifying at least a first data object of the plurality of data objects based on the metadata that satisfies the selection criteria.

In one embodiment, the metadata in the metabase are stored separate from entire content of each of the plurality of data objects. In one embodiment, the identifying is performed without accessing the plurality of data objects on the storage device.

In one embodiment, the updating comprises processing the log to select at least one data interaction that modifies the metadata of at least one of the plurality of data objects, and updating the metadata in the metabase based on the selected at least one data interaction. In one embodiment, the identifying is performed without accessing a data structure associated with storage of the plurality of data objects on the storage device. In one embodiment, the identifying is performed without accessing a file access table (FAT) associated with storage of the plurality of data objects on the storage device.

In one embodiment, the method additionally includes performing the at least one storage operation on the first data object. In one embodiment, the at least one storage operation comprises a copy operation. In one embodiment, the at least one storage operation comprises a snapshot operation. In one embodiment, the at least one storage operation comprises a hierarchical storage management (HSM) operation. In one embodiment, performing the at least one storage operation comprises copying the first data object to a second storage device. In one embodiment, the method additionally includes updating records of a second metabase associated with the second storage device to include the metadata of the first data object.

In one embodiment, the selection criteria comprises a user-defined policy. In one embodiment, the selection criteria identifies metadata relating to at least one of a read operation, a write operation, and an access operation associated with the data object. In one embodiment, the access operation comprises at least one of web-page access, electronic gaming interaction, chat-room access, instant messaging, communication interaction, or multimedia interaction. In one embodiment, the selection criteria involving the access operation allows at least one of identifying, capturing, classifying, or tracking of the access operation.

In one embodiment, the method further includes accessing one or more of the metadata associated with the corresponding data objects one or more times to update the metabase.

Yet another embodiment of the present disclosure relates to a system for managing electronic data stored on a storage device. The system includes a selection criteria for performing a storage operation on at least one of a plurality of data objects on a storage device, with the selection criteria being dependent upon metadata, other than location data, associated with the plurality of data objects. The system further includes a metabase having a plurality of records storing the metadata associated with the plurality of data objects. The system further includes a classification module configured to process a log file generated by a journal program. The log file includes a list of interactions between at least one application and the plurality of data objects. The classification module is further configured to update the metabase based on interactions identified in the log file. The system further includes a management module configured to access the metabase to identify at least a first data object that satisfies the selection criteria.

In one embodiment, the metadata in the metabase are stored separate from entire content of the plurality of data objects. In one embodiment, the classification module is configured to update the metabase based on interactions that modify metadata of at least a portion of the plurality of data objects. In one embodiment, the management module accesses the metabase to identify the first data object without accessing either the plurality of data objects or a data structure used in storage of the plurality of data objects on the storage device.

In one embodiment, the management module is configured to copy the first data object from the storage device to a second storage device. In one embodiment, the second storage device comprises a storage device configured to retain the copy of the first data object. In one embodiment, the plurality of records on the metabase store metadata associated with data objects on the second storage device. In one embodiment, the system further includes a second metabase having a second plurality of records storing metadata associated with data objects on the second storage device. In one embodiment, the selection criteria comprises a data migration policy.

Yet another embodiment of the present disclosure relates to a system for performing storage operations on electronic data. The system includes means for storing a plurality of data objects. The system further includes means for identifying at least one storage operation to be performed on one or more data objects based on the metadata associated with the plurality of data objects. The system further includes means for storing the metadata. The system further includes means for processing a journal file comprising a list of interactions between at least one application and one or more of the plurality of data objects, with the processing means being further configured to update the means for storing the metadata based on interactions identified by the journal file. The system further includes means for performing a storage operation on the at least one data object, based on accessing the metadata in the means for storing the metadata.

In one embodiment, the interactions identified by the journal file comprised interactions that modify metadata of at least a portion of the plurality of data objects. In one embodiment, accessing of the metadata in the means for storing the metadata is performed without accessing the plurality of data objects on the means for storing the data objects. In one embodiment, the at least one application is managed by a first processor and the processing means is managed by a second processor.

Yet another embodiment of the present disclosure relates to a method of classifying data in a storage system. The method includes processing an index of data interactions between at least one application and one or more data objects on at least one storage device, with the index being populated by a journaling module. The method further includes selecting an entry from the index corresponding to a first data interaction involving a first data object. The method further includes obtaining from the selected entry information indicative of metadata associated with the first data object. The method further includes updating a metabase with the information obtained from the selected entry, with the metabase having a plurality of records storing metadata associated with the data objects.

In one embodiment, the selected entry information comprises information indicative of modifications to metadata associated with the first data object. In one embodiment, the metadata in the metabase is stored separately from the entire contents of the data objects. In one embodiment, the method further includes accessing one or more of the metadata associated with the corresponding data objects again one or more times to update the metabase.

In one embodiment, the updating comprises determining whether the selected entry in the index of data interactions has an existing record in the metabase; if no record exists corresponding to the selected entry, creating a new record in the metabase; and updating the existing record or the new record with at least a part of the information obtained from the selected entry.

In one embodiment, the selecting comprises determining whether the entry is a new entry in the index of data interactions. In one embodiment, the entry is considered to be new if a time stamp of the entry is later than a time at which a previous entry was analyzed. In one embodiment, the entry is considered to be new based on an identifier of the entry. In one embodiment, the identifier comprises an update sequence number that identifies the entry in the index of data interactions.

In one embodiment, the method further includes initially populating the metabase by accessing the data objects so as to access available metadata associated with the data objects. In one embodiment, the method additionally includes quiescing the data interactions associated with the at least one storage device, and performing the populating during the quiescing. In one embodiment, the populating is performed during operation of the at least one storage device. In one embodiment, the method additionally includes queuing the data interactions generated during the populating to allow capture of the data interactions during the accessing process.

In one embodiment, the method additionally includes receiving input regarding a user-defined tag. The obtaining information is based at least in part on the user-defined tag. In one embodiment, the updating further comprises determining which of a plurality of metabases comprises records storing metadata associated with the first data object.

Yet another embodiment of the present disclosure relates to a system for managing electronic data in a storage network. The system includes a data classification module configured to scan entries in a journal file of data interactions between at least one application and one or more data objects stored on at least one storage device. The data classification module is further configured to select an entry from the index corresponding to a first data interaction involving a first data object. The data classification module is further configured to classify one or more properties of the data object based on information obtained from the selected entry. The data classification module is further configured to update the one or more classified properties of the data object in a metabase.

In one embodiment, the journal file is populated by a monitoring module. In one embodiment, the data classification module is further configured to access the one or more data objects one or more times to update the metabase. In one embodiment, the properties of the data objects are stored in the metabase separately from entire content of the data objects.

In one embodiment, the information obtained from the selected entry is indicative of modifications to metadata of the first data object resulting from the first data interaction. In one embodiment, the metadata comprises at least one of: a data owner, a last modified time, a last accessed time, a data object size and an application type.

In one embodiment, the data classification module is further configured to classify the one or more properties of the data object based on user-defined tags.

In one embodiment, the data classification module is further configured to periodically scan the entries in the index. In one embodiment, the data classification module is further configured to allow analysis of the one or more properties of the data objects based on a selected criteria without accessing the data objects.

Yet another embodiment of the present disclosure relates to a system for managing electronic data. The system includes means for storing a list of data object interactions between at least one application and one or more data objects. The system further includes means for storing metadata associated with the one or more data objects. The system further includes means for identifying from the list of data object interactions a first data object interaction involving metadata modifications to a first data object, with the identifying means being further configured to update a record in the means for storing metadata associated with the metadata of the first data object.

In one embodiment, the means for storing is generated by a journaling application. In one embodiment, the means for storing metadata comprises means for storing the metadata separate from the entire content of each of the data objects. In one embodiment, the means for identifying is further configured to initially populate the means for storing metadata by accessing the data objects so as to access available metadata associated with the data objects. In one embodiment, the means for identifying is configured to process the list of data object interactions by accessing an identifier of each entry in the list.

Yet another embodiment of the present disclosure relates to a method for managing electronic data in a data storage network. The method includes receiving a classification criteria that identifies at least one property associated with one or more data objects. The method further includes monitoring a plurality of data interactions involving at least one application and the one or more data objects. The method further includes determining, from the data interactions, select data interactions that satisfy the classification criteria, with each select data interaction being indicative of changes to the properties associated with the one or more data objects. The method further includes maintaining a metabase based at least in part on the select data interactions, with the metabase storing at least the properties of the one or more data objects.

In one embodiment, the classification criteria comprises a user-defined rule. In one embodiment, the one or more properties comprise at least one of a file owner and a permission level. In one embodiment, the metabase stores a path of one or more of the data objects corresponding to the select data interactions. In one embodiment, the metabase stores a reference number of the data object corresponding to one of the data interactions. In one embodiment, the maintaining comprises periodically processing and updating the metabase based on modifications associated with the select data interactions.

In one embodiment, the method further includes recording the data interactions in a journal index. In one embodiment, the recording further comprises recording metadata corresponding to the select data interactions.

In one embodiment, the metabase stores the properties of the data objects without storing the entire contents of the data objects.

Yet another embodiment of the present disclosure relates to a system for cataloging electronic data associated with data objects stored on at least one storage device. The system includes a journaling module configured to receive a classification criteria. The journaling module is further configured to track a plurality of data interactions involving at least one application and one or more data objects stored on at least one storage device. The journaling module is further configured to identify, from the plurality of data interactions, select data interactions that satisfy the classification criteria. The system further includes a classification module configured to maintain a data structure of metadata associated with the select data interactions with the one or more data objects.

In one embodiment, each of the select data interactions result in a change to metadata of a corresponding one of the data objects. In one embodiment, the journal module is further configured to record the select data interactions in a log.

In one embodiment, the metabase comprises a plurality of metabases and the at least one storage device comprises a plurality of storage devices. In one embodiment, each of the plurality of metabases is associated with one of the plurality of storage devices. In one embodiment, the entry is recorded in one or more of a plurality of logs, with each log being associated with one of the plurality of metabases.

In one embodiment, the system further includes a second storage device for storing the log. In one embodiment, the system further includes a user interface module configured to receive the classification criteria from a user. In one embodiment, the journaling module is further configured to tag certain entries based on user-defined data object properties.

In one embodiment, the system further includes a processor configured to compare a selection criteria and the metadata in the metabase without accessing the plurality of data objects on the at least one storage device. In one embodiment, the selection criteria is associated with identifying which of the plurality of data objects satisfies a data migration policy.

Yet another embodiment of the present disclosure relates to a system for cataloging electronic data in a data storage network. The system includes means for receiving classification criteria. The system further includes means for monitoring a plurality of data interactions between at least one application and one or more data objects stored on at least one storage device. The monitoring means is further configured to determine, from the plurality of data interactions, select data interactions that satisfy the classification criteria. The monitoring means is further configured to record an entry for each select data object interaction. The system further includes means for maintaining a data structure of metadata associated with the select data interactions with the one or more data objects.

In one embodiment, each of the select data object interactions is indicative of a modification to metadata of a corresponding one of the of data objects. In one embodiment, the system further includes means for processing a journal file and updating the metabase based on modifications to metadata resulting from select data interactions identified in the journal file. In one embodiment, the system further includes means for performing data migration of a portion of the plurality of data objects based on the data structure of metadata. In one embodiment, the system further includes means for comparing a selection criteria with the metabase without accessing the data objects on the at least one storage device to identify the portion of data objects that relate to the selection criteria.

Yet another embodiment of the present disclosure relates to a system for managing electronic data in a network environment. The system includes an index generated by a journaling module, with the index comprising a list of one or more data interactions with one or more data objects. The system further includes an interface configured to receive at least one selection criteria regarding at least one attribute of the one or more of the data objects. The system further includes metadata stored in a data structure where the metadata is associated with the one or more data objects. The system further includes a classification module configured to process the index to identify data interactions that satisfy the selection criteria, with the classification module being further configured to update the metadata in the data structure based on the identified data object interactions.

In one embodiment, the list of data interactions comprises a list of interactions between a memory and the data objects on a storage device. In one embodiment, the interface comprises a user interface. In one embodiment, the selection criteria comprises criteria for migrating one or more data objects from a first storage device to a second storage device. In one embodiment, the data structure that stores the metadata is stored separately from the entire contents of the data objects.

In one embodiment, the selection criteria comprises a policy for performing a storage operation on at least one of the plurality of data objects. In one embodiment, the policy identifies a plurality of data file attributes.

In one embodiment, the at least one attribute comprises a user-defined attribute. In one embodiment, the interface is configured to provide a user with an option to select at least one of a plurality of predefined attributes.

Yet another embodiment of the present disclosure relates to a method for managing electronic data in a storage system. The method includes receiving from a journaling module a list of data interactions made by at least one application to at least one or more data objects on at least one storage device, with each of the data objects having metadata and content associated therewith. The method further includes maintaining metadata associated with the data objects. The maintaining further includes processing the data interactions made to one or more of the data objects, obtaining the metadata of the one or more data objects, and storing the metadata in a data structure. The method further includes allowing a user interaction to obtain information from the metadata about one or more properties of the data objects without accessing the data objects on the storage device.

In one embodiment, the at least one data interaction results in a modification of metadata of at least one of the data objects. In one embodiment, the user interaction comprises a selection criteria input by a user.

In one embodiment, the user interaction comprises performing a storage migration operation. In one embodiment, the user-defined interaction comprises performing a scheduling operation.

Yet another embodiment of the present disclosure relates to a system for managing electronic data in a storage system. The system includes means for providing a list of data interactions, with the providing means being generated by a journal application. The system further includes means for receiving from a user a selection criteria regarding at least one attribute of one or more data objects. The system further includes means for storing metadata associated with the data objects. The system further includes means for processing the data interactions to identify data object interactions that satisfy the selection criteria. The processing means is further configured to update the metadata in the means for storing based on the identified data interactions.

In one embodiment, the list of data interactions comprises a list of interactions between a memory and data objects stored on a storage device. In one embodiment, the storing means comprises storing metabase associated with the data objects separate from the entire content of the data objects. In one embodiment, the selection criteria comprises migrating one or more data objects on a first storage device to a second storage device. In one embodiment, the selection criteria comprises performing a storage operation. In one embodiment, the selection criteria comprises a data migration policy. In one embodiment, the means for receiving comprises a graphical user interface.

Yet another embodiment of the present disclosure relates to a system for managing electronic data in a network environment. The system includes a data structure comprising metadata associated with a plurality of data objects, with the metadata resulting from processing a list of data interactions generated by a journaling module. The system further includes an interface configured to receive a selection criteria regarding at least one attribute of one or more of the data objects. The system further includes a classification module configured to process the metadata to identify one or more data interactions that satisfy the selection criteria.

In one embodiment, the classification module is further configured to provide information about the one or more identified data interactions to the interface.

For purposes of summarizing the disclosure, certain aspects, advantages and novel features of the present disclosure have been described herein. It is to be understood that not necessarily all such advantages may be achieved in accordance with any particular embodiment of the present disclosure. Thus, the present disclosure may be embodied or carried out in a manner that achieves or optimizes one advantage or group of advantages as taught herein without necessarily achieving other advantages as may be taught or suggested herein.

BRIEF DESCRIPTION OF THE DRAWINGS

Embodiments of the present disclosure are illustrated in the figures of the accompanying drawings, which are meant to be exemplary and not limiting, and in which like references are intended to refer to like or corresponding parts.

DETAILED DESCRIPTION OF SOME EMBODIMENTS

Figure 1:
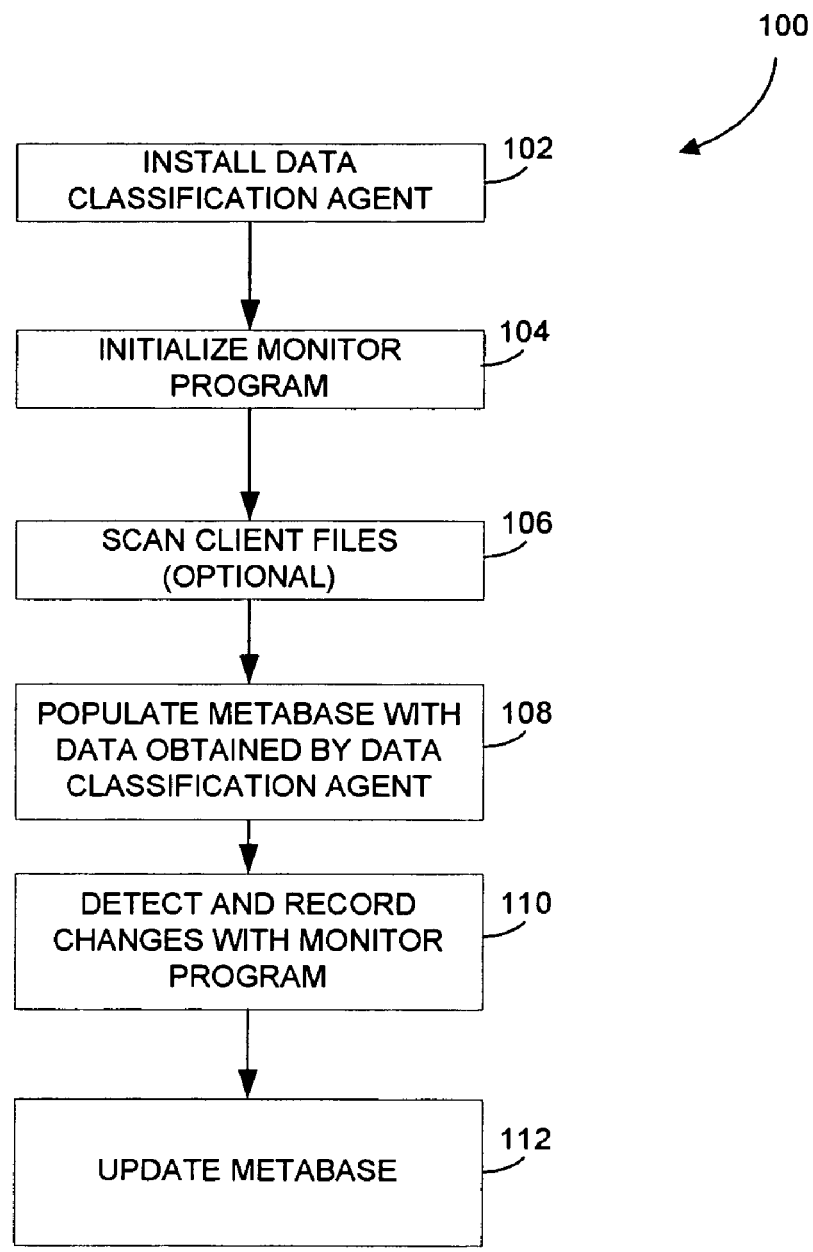
FIG. 1 illustrates a flow chart of a metadata storage process in accordance with embodiments of the present disclosure.

The features of the systems and methods will now be described with reference to the drawings summarized above. Throughout the drawings, reference numbers are re-used to indicate correspondence between referenced elements. The drawings, associated descriptions, and specific implementation are provided to illustrate embodiments of the present disclosure and not to limit the scope of the disclosure.

Embodiments of the present disclosure are generally concerned with systems and methods that analyze and classify various forms of data that, among other things, facilitate identification, searching, storage and/or retrieval of data that satisfies certain criteria. Although described in connection with certain specific embodiments, it will be understood that various features disclosed herein can have broad-based applicability to any wireless or hard-wired network or data transfer system that stores and/or conveys data from one point to another, including communication networks, enterprise networks, combinations of the same storage networks, and the like.

Generally, certain embodiments of the present disclosure include systems and methods for analyzing data and other electronic information in a computer network (sometimes referred to herein as a "data object"). For instance, certain embodiments concern creating a database or index of information that describes certain pertinent aspects of the data objects that allow a user or system process to consult the database to obtain information regarding the network data. For example, a data collection agent may traverse a network file system and obtain certain characteristics and other attributes of data in the system. In some embodiments, such a database may be a collection of metadata and/or other information regarding the network data and is referred to herein as a "metabase." Generally, metadata refers to data or information about data, and may include, for example, data relating to storage operations or storage management, such as data locations, storage management components associated with data, storage devices used in performing storage operations, index data, data application type, combinations of the same or other data.

In certain embodiments, if it is desired to obtain information regarding network data, a system administrator or system process may consult the metabase for such information rather than iteratively access and analyze each data item in the network. Accessing the metabase may significantly reduce the amount of time required to obtain data object information by reducing the need to obtain information from the source data. Furthermore, such embodiments may reduce the involvement of network resources in this process, thereby reducing the processing burden on the host system.

Examples of various types of data and operations on such data are further described in the above-referenced related applications. One example of a system that performs storage operations on electronic data is the QiNetix® storage management system by CommVault Systems of Oceanport, N.J.

The QiNetix® system leverages a modular storage management architecture that may include, among other things, storage manager components, client or data agent components, and/or media agent components. Additional details of the QiNetix® system are further described in U.S. patent application Ser. No. 10/818,749, filed Apr. 5, 2004, which is hereby incorporated herein by reference in its entirety. The QiNetix® system also may be hierarchically configured into backup cells to store and retrieve backup copies of electronic data as further described in U.S. patent application Ser. No. 09/354,058.

FIG. 1 illustrates flow chart of a metadata storage process 100 according to certain embodiments of the present disclosure. In order to perform the some of the functions described herein, it may be necessary at the outset to install certain data classification software or data classification agents on computing devices within the network (block 102). This may be done, for example, by installing classification software on client computers and/or servers within a given network. In some embodiments, classification agents may be installed globally on a computing device or with respect to certain subsystems on a computing device. The classification software may monitor certain information regarding data objects generated by the computers and classify this information for use as further described herein.

Next, at block 104, a monitor agent is initialized. Such a monitoring agent may be resident or installed on each computing device similar to the deployment of classification agents described above and may be configured to monitor and record certain data interactions within each machine or network process. For example, the monitor agent may include a filter driver program and may be deployed on an input/output port or data stack and operate in conjunction with a file management program to record interactions with computing device data. Such operation may involve creating a data structure such as a record or journal of each interaction. The records may be stored in a journal data structure and may chronicle data interactions on an interaction by interaction basis. The journal data structure may include information regarding the type of interaction that has occurred along with certain relevant properties of the data involved in the interaction. One example of such a monitor program may include Microsoft's Change Journal.

Prior to populating a metabase with metadata, in certain embodiments, portions of the network or subject system may be quiesced such that data interactions are not permitted prior to completing an optional scan of system files as described in conjunction with block 106 below. This may be done in order to obtain an accurate picture of the data being scanned and/or to maintain referential integrity within the system. For example, if the system was not quiesced, data interactions would continue and be allowed to change data in the mass storage. However, in some embodiments, the subject system may be allowed to continue to operate, with operations or instructions queued in a cache. In such embodiments, these operations are performed after the scan is complete so that any data interactions that occur based on the cached operations are captured by the monitor agent.

In certain embodiments, the file scanning of block 106 is performed by a data classification agent or module. Such scanning may include traversing the file system of a client to identify data objects or other files, email or other information currently stored or present in the system and/or to obtain certain information, such as metadata, regarding the information. In certain embodiments metadata may include information about data objects or characteristics associated with the data objects, such as one or more of the following, but not limited to: the data owner (e.g., the client or user that generates the data or other data manager), the last modified time (e.g., the time of the most recent modification of the data object), a data object size (e.g., number of bytes of data), information about the data content (e.g., application that generated the data and/or user that generated the data), to/from information for email (e.g., an email sender, recipient, individual or group on an email distribution list), creation date (e.g., date on which the data object was created), file type (e.g., format or application type), last accessed time (e.g., time the data object was most recently accessed or viewed), application type (e.g., application that generated the data object), location/network (e.g., a current, past or future location of the data object and network pathways to/from the data object), frequency of change (e.g., a period in which the data object is modified), business unit (e.g., a group or department that generates, manages or is otherwise associated with the data object), and aging information (e.g., a schedule, such as a time period, in which the data object is migrated to secondary or long term storage), combinations of the same or the like. In certain embodiments, the information obtained in the scanning process may be advantageously used to initially populate the metabase of information regarding network data at block 108.

After the metabase has been populated, the network or subject system may be released from its quiesced state. Next, at block 110, the monitor agent monitors system operations to record changes to system data, such as in the change journal database as described above. In certain embodiments, the change journal database includes a database of metadata or data changes and may comprise, for example, log files of the data or metadata changes. In some embodiments, the data classification agent may periodically consult the change journal database for new entries. If new entries exist, the data classification agent may examine the entries, and if deemed relevant, the entries may be analyzed, parsed, and written to the metabase as an update (block 112). In other embodiments, change journal entries may be supplied substantially in parallel to the journal database and data classification agent. This allows the metabase to maintain substantially current information regarding the state of system data at any given point in time.

As mentioned above, one benefit of such a metabase is that the metabase, in certain embodiments, significantly reduces the amount of time required to obtain information by substantially eliminating the need to obtain information directly from the source data. For example, assume a system administrator desires to identify data objects that a certain user has interacted with that contain certain content or other characteristics. Rather than search each file in each directory, which can be a very time consuming process, especially when the data objects reside on multiple storage devices, the administrator may search the metabase to identify such data objects and properties (e.g., metadata) associated with those objects.

Moreover, in certain embodiments, use of the metabase for satisfying data queries may also reduce the involvement of network resources in this process, substantially reducing the processing burden on the host system. For example, as described above, if an administrator desires to identify certain data objects, querying the metabase rather than the file system virtually removes the host system from the query process (e.g., no brute force scanning of directories and files is required), allowing the host system to continue performing host tasks rather than be occupied with search tasks.

Figure 2:
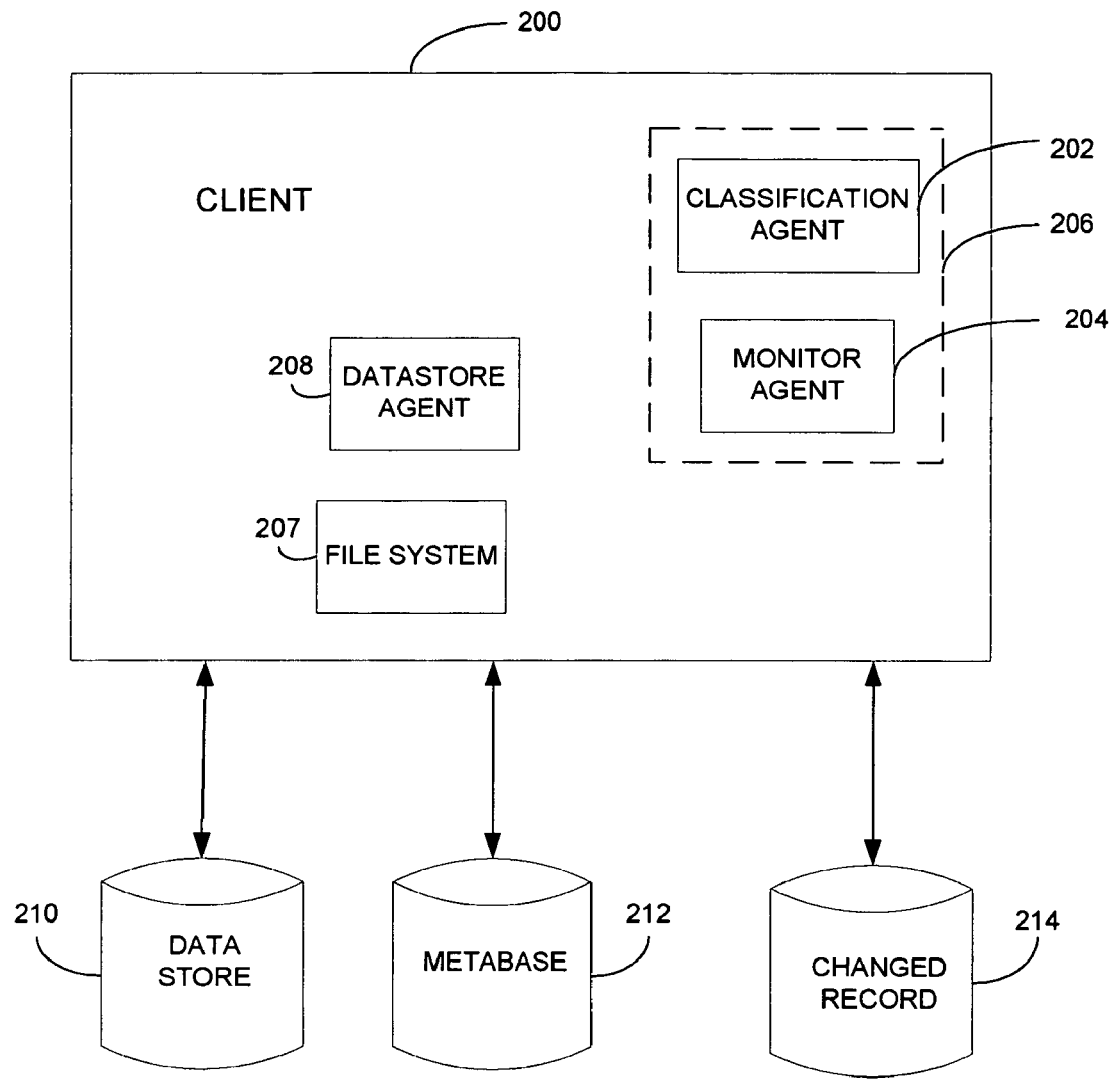
FIG. 2 illustrates a block diagram of an exemplary embodiment of a data classification system.

FIG. 2 depicts a client 200 constructed in accordance with certain embodiments of the present disclosure. As shown, the client 200 includes a classification agent 202 and a monitor agent 204, combined as an update agent 206, which may be a single module encompassing the functionality of both agents. In yet other embodiments, the classification agent 202 and monitor agent 204 may be two separate modules configured to communicate with each other. Client 200 also includes data store 210, a metabase 212, and a change record module 214. In certain embodiments, one or more of the data store 210, the metabase 212 and the changed record module 214 are external and/or internal to the client 200.

Generally, the client 200 may be a computing device, or any portion of a computing device that generates electronic data. Data store 208 generally represents application data such as production volume data used by client 200. Metabase 212, which may be internal or external to client 200 may contain information generated by classification agent 202 as described above. Similarly, changed record journal 214, which also may be internal or external to client 200 may contain information generated by monitor agent 204 as described above.

In operation, data interactions occurring within client 200 may be monitored with update agent 206 or monitor agent 204. Any relevant interaction may be recorded and written to change record 214. Data classification agent 202 may scan or receive entries from monitor agent 204 and update metabase 212 accordingly. Moreover, in the case where update agent 206 is present, monitored data interactions may be processed in parallel with updates to change record 214 and written to data store 210 and metabase 212 occurring accordingly. A file system 207 may be used to conduct or process data from the client to a data store 210.

Figure 3A:
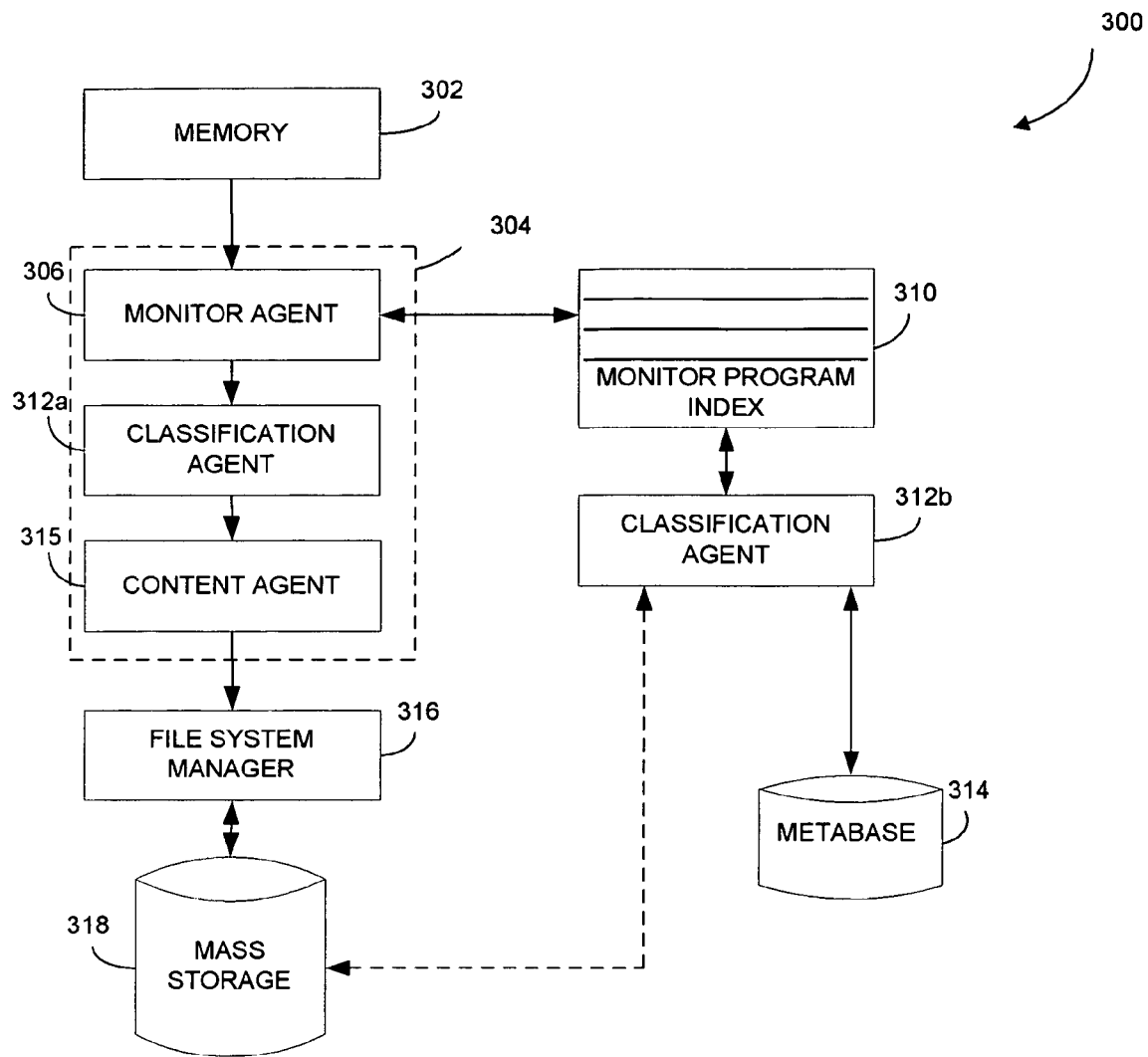
FIG. 3A illustrates a block diagram of another exemplary embodiment of a data classification system.

FIG. 3A provides a more detailed view of the journaling and classification mechanisms of client 200 generally shown in FIG. 2. As shown, system 300 may include a memory 302, an update agent 304 which may include a separate or integrated monitor agent 306, a classification agent 312*a* and/or 312*b*, and a content agent 315, a monitor program index 310, metabase 314 and mass storage device 318.

In operation, data interactions that occur between memory 302 and mass storage device 318 may be monitored by monitor agent 306. In some embodiments, memory 302 may include random access memory (RAM) or other memory device employed by a computer in client 200 in performing data processing tasks. Certain information from memory 302 may be periodically read or written to mass storage device 318 which may include a magnetic or optical disk drive such as a hard drive or other storage device known in the art. Such data interactions are monitored by monitoring agent 306 which, in some embodiments, may include any suitable monitoring or journaling agent as further described herein.

As shown, system 300 may also include an administrative file system program 316, such as a file system program known in the art which may include operating system programs, a FAT, an NTFS, or the like that may be used to manage data movement to and from mass storage device 318. Thus, in operation, data may be written from memory 302 to mass storage device 318 via file system program 316. Such an operation may occur, for example, to access data used to service an application running on a computing device. During this operation, monitor agent 306 may capture this interaction and generate a record indicating that an interaction has occurred and store the record in index 310. The data may be stored in mass storage 318 under the supervision of file system manager 316.

As shown in FIG. 3A, monitor agent 306 may analyze data interactions such as interactions between memory 302 and mass storage 318 via the file system manager 316, and record any such interactions in monitor index 310. Thus, as described above, monitor index 310 may represent a list of data interactions wherein each entry represents a change that has occurred to client data along with certain information regarding the interaction. In embodiments where Microsoft Change Journal or other similar software is used, such entries may include a unique identifier such as an update sequence number (USN), certain change journal reason codes identifying information associated with a reason(s) for the change made, along with data or metadata describing the data and certain data properties, data copy types, combinations of the same or the like.

Thus, in operation, as data moves from memory 302 to mass storage 318 (or vice versa), monitor agent 306 may create and write an entry to index 310 which may in turn, be analyzed and classified by classification agent 312b for entry in metabase 314. In some embodiments, classification agent 312a may be coupled with mass storage device (either directly or through file system manager 316) and write metadata entries to both metabase 314 and mass storage device 318. In some embodiments, the metabase information may be stored on mass storage device 318. Moreover, in certain embodiments, classification agent 312b may periodically copy or backup metabase 314 to a device under the direction of a storage manager and/or pursuant to a storage policy such that the information in metabase 314 may be quickly restored if lost, deleted or is otherwise unavailable.

In some embodiments, optional classification agent 312a may operate in conjunction with monitor agent 306 such that data moving to mass storage device 318 is classified as further described herein and written to device 318. With this arrangement, the data, along with the processed metadata describing that data, is written to mass storage device 318. This may occur, for example in embodiments in which monitor agent 306 and classification agent 312a are combined into update agent 304. Writing metadata in this way allows it to be recovered or accessed from mass storage device 318 if necessary, for example, when metabase 314 is missing certain information, busy, or otherwise inaccessible.

In certain embodiments, content agent 315 may be generally used to obtain or filter data relating to content of the data moving from memory 302 to mass storage 318. For example, content agent 315 may read data payload information and generate metadata based on the operation for storage in metabase 314 and may include a pointer to the data item in mass storage 318. The pointer information may optionally be stored in an index. This metadata may also be stored with the data item in mass storage 318 or as an entry functioning in place of or in addition to metabase 314. Storing metadata relating to data content in metabase 314 provides the capability to perform content searches for data in the metabase 314, instead of searching entries in mass storage 318. This allows the system to quickly locate information satisfying a content query that may be retrieved from mass storage 318, if necessary.

Moreover, such content metadata may be generated and used in locating data based on content features throughout a hierarchy within a storage operation system (e.g., content metadata may be generated and stored at each or certain levels of storage within the system (primary, secondary, tertiary, and the like) to facilitate location and retrieval of data based on content). As will be understood by one of skill in the art, the functionality provided by the content agent 315, classification agent 312a and 312b and monitor agent 306 may be provided by one or more modules or components such that the modules may be integrated into a single module providing the described functions, or may be implemented in one more separate modules each providing some of the functions.

Figure 3B:
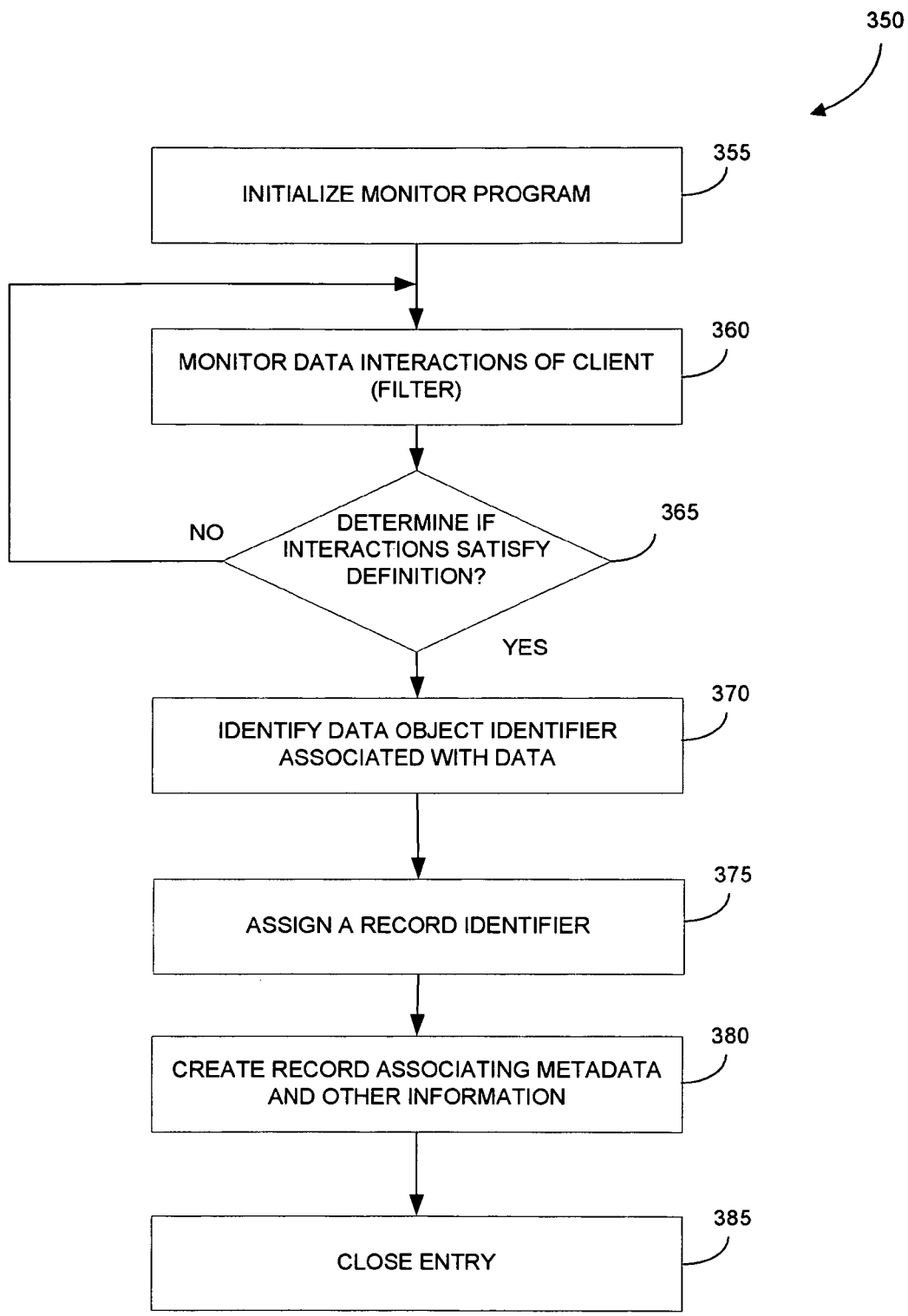
FIG. 3B illustrates a flow chart of a journaling process in accordance with embodiments of the present disclosure.

FIG. 3B is a flow chart 350 illustrating some of the blocks that may be involved in the journaling process described above, according to certain embodiments of the disclosure. At block 355, the monitor program may be initialized, which may include instantiating a data structure or index for recording interaction entries, and the assignment of a unique journal ID number which allows the system to differentiate between various journaling data structures that may be operating within the system. As mentioned above, the monitor program may include a filter driver or other application that monitors data operations (block 360). During the monitoring process, the monitor agent may observe data interactions between memory and mass storage to determine that certain data interactions have occurred. Information relating to the interactions may be captured and used to populate the metabase. In some instances, interaction types or certain aspects of interactions are captured. Such types or aspects may be defined in an interaction definition, which may be a change journal reason codes as used by Microsoft's Change Journal program, or be defined by a user or network administrator to capture some or all data interactions in order to meet user needs. For example, certain change definitions may record every data interaction that occurs regardless of whether any data actually changes or not. Such information may be useful, for example, to determine users or processes that have "touched," scanned or otherwise accessed data without actually changing it.

Thus, it is possible to employ interaction definitions that may capture a relatively broad or narrow set of operations, allowing a user to customize the monitor program to meet certain goals. Such interaction definitions may define or describe data movement, changes, manipulations or other operations or interactions that may be of interest to a system user or administrator (e.g., any operation that "touches" data may be recording along with the action or operation that caused the interaction (e.g. read, write, copy, parse, or the like.) Moreover, change definitions may evolve over time or may be dynamic based on the entries sent to the index. For example, if expected results are not obtained, change definitions may be modified or additional definitions used until appropriate or desired results are obtained. This may be accomplished, for example by globally linking certain libraries of interaction definitions and selectively enabling libraries on a rolling basis until acceptable results are achieved. This process may be performed after the initial activation of the monitor agent and periodically thereafter, depending on changing needs or objectives.

Moreover, in some embodiments, the system may support the use of "user tags" that allow certain types of information to be tagged so they may be identified and tracked throughout the system. For example, a user may designate a particular type of data or information such as project information, or information shared between or accessed by particular group of users to be tracked across the system or through various levels of storage. This may be accomplished through a user interface that allows a user to define certain information to be tagged, for example, by using any available attribute within the system such as those specified above with respect to the classification agent or filter used in the system. In some embodiments, the user may define one or more tags using these or other attributes which may be further refined by combining them through the use of logical or Boolean operators to a define a certain tag expression.

For example, a user may define a certain tag by specifying one or more criteria to be satisfied such as certain system users, a certain data permission level, a certain project, combinations of the same or the like. These criteria may be defined using a logical operators such as an AND or OR operators to conditionally combine various attributes to create a condition that defines a tag. In certain embodiments, information satisfying those criteria may be tagged and tracked within the system. For example, as data passes through the monitor agent 306 (or other module within update agent 304), the data satisfying these criteria may be identified and tagged with a header or a flag or other identifying information as is known in the art. This information may be copied or otherwise noted by metabase 314 and mass storage 318 so that the information may be quickly identified. For example, the metabase 314 may contain entries keeping track of entries satisfying the tag criteria along with information relating to the types of operations performed on the information as well as certain metadata relating to the data content and its location in mass storage 318. This allows the system to search the metabase 314 at a particular level of storage for the information, and quickly locate it within mass storage device for potential retrieval.

Next, a block 365, the monitor agent 306 may continue to monitor data interactions based on change definitions until an interaction satisfying a definition occurs. Thus, a system according to one embodiment of the present disclosure may continue to monitor data interactions at blocks 360 and 365 until a defined interaction, such as an interaction satisfying or corresponding to a selection criteria, such as an interaction definition or the like, occurs. If a defined interaction does occur, the monitor agent 306 may create a record, which may be stored in a monitor program index, and in some embodiments, assign an interaction code that describes the interaction observed on the data object. Next, a block 370, the monitor program may identify a data object identifier associated with the data and that is associated with the data interaction, such as a file reference number (FRN) related to the data object. The FRN may include certain information such as the location or path of the associated data object. Any additional information (e.g., data properties, copy properties, storage policy information, combinations of the same or the like) associated with the FRN may also be obtained in order to enrich or enhance the record. In some embodiments, this may further involve obtaining information from other system files including master file tables (MFTs) to further enhance the metabase entries. Additional processing or formatting of the metabase entries may also occur in accordance with certain defined classification paradigms in order to populate the metabase with optimal or preferred information.

Next, at block 375, the record may be assigned a record identifier such as, for example, a unique update sequence number (USN) that may be used to uniquely identify the entry within the index, and, in some embodiments, act as an index memory location. Thus, a particular record may be quickly located with a data structure based on the USN. Next at block 380, the information described above may be concatenated or otherwise combined with other data or metadata data obtained by the monitor agent and arranged in an appropriate or expected format to create the record that may be written to the monitor index.

In other embodiments, the information described above may be written to the index and arranged at the index into an expected format or may be written to the record "as received" and include metadata or other information, such as a header describing that information such that adherence to a strict data format is not required. For example, some records may contain more or less information than other records, as appropriate. After the record has been constructed and deemed complete, the record may be "closed" by the system at block 385 and the system may then assign another USN to the next detected change. However, if the record is determined to be incomplete, the monitor agent or update agent may request any missing information to complete the entry. If such information is not received, the monitor agent may set a flag within the record to indicate it contains incomplete information and the record may then be closed.

Figure 4:
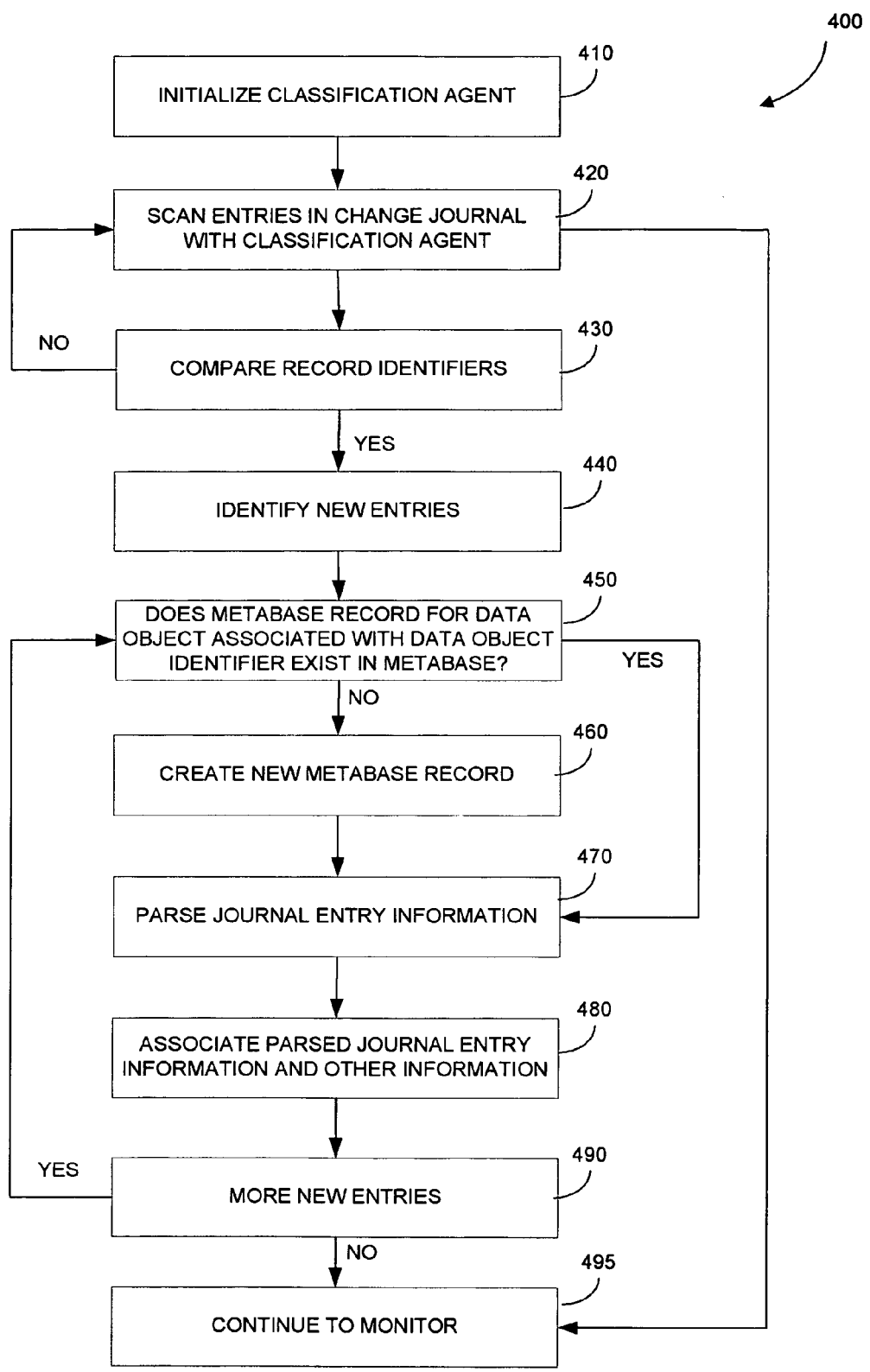
FIG. 4 illustrates a flow chart of a data classification process in accordance with embodiments of the present disclosure.

FIG. 4 is a flow chart 400 illustrating some of the blocks that may be involved in a data classification process, according to certain embodiments of the present disclosure. At block 410, the classification agent may be initialized, which may include activating, reserving and/or clearing certain buffers and/or linking to libraries associated with deployment of the classification agent. Prior to scanning the interaction records generated by the monitor agent as described above, the classification agent may classify existing stored data by, for example, traversing the file and directory structure of an object system to initially populate the metabase as described herein.

Next, at block 420, during normal operation, the classification agent may scan the entries in the interaction journal to determine whether new entries exist since any previous classification processing was performed, for example, by determining whether the most recent entry currently in the journal is more or less recent than the last journal entry analyzed. This may be accomplished in several ways. One method may include scanning a time or date information associated with the last journal entry examined and comparing it to the most recent time or date information than the entry currently present in the journal. If it is determined that the most recent journal entry occurred after a previous classification process, this process may be performed iteratively by "walking backwards" through the journal entries until the last entry previously analyzed by the classification agent is found. Entries with time information after that point may be considered new or unprocessed by the classification agent (block 440). If the last entry analyzed has the same time stamp as the most recent entry in the journal, no new entries exist and the system may return to block 420 to continue monitoring.

Another method of identifying new journal entries may include comparing record identifiers such as USN numbers assigned to each journal entry (block 430). Journal entries with a larger USN number than the last entry previously analyzed may be considered new or unprocessed. If the last entry analyzed has the same USN number as the current entry, no new entries exist and the system may return to block 420 to continue monitoring. This comparison may be performed until new entries are located (block 440) or until it is determined that no new entries exist.

In other embodiments, rather than scanning the journal data structure for new entries, any entries created by the journal agent may be automatically sent to the classification agent and the identification process may be largely unnecessary (except for the case where such scanning is necessary or desirable, for example, to repopulate the journal or verify certain information).

Next, at block 450, assuming new journal entries are identified, the system may determine if a metabase record already exists for the data object associated with those entries. This may be accomplished by comparing data object identifiers, such as FRNs of metabase entries with data object identifiers such as FRNs of journal entries. Matching these and other unique data characteristics may be used to match or correlate metabase and journal entries.

If no corresponding metabase record is identified, a new record may be created at block 460. This may involve creating a new metabase entry ID, analyzing the journal entry and parsing the entry into a predetermined format, and copying certain portions of the parsed data to the new metabase entry (blocks 460 and 470), as further described herein. Any additional metadata or file system information may also be associated with the new entry to enhance its content, including information from an FRN or information derived from an interaction code present in the journal entry, file system such as, for example, MFT (block 480).

On the other hand, if a corresponding metadata entry is identified, the new journal entry may be processed as described above and may overwrite some or all of the corresponding entry. Such an updated pre-existing entry may receive an updated time stamp to indicate a current revision. However, in some embodiments, even if a corresponding entry is located, a new entry may be created and written to the metabase and optionally associated with the existing record. In such a system, the older related record may be maintained, for example, archival, recreation, historical or diagnostic purposes, and in some embodiments, may be marked or indicated as outdated or otherwise superseded. Such corresponding entries may be linked to one another via a pointer or other mechanism such that entries relating to the history of a particular data object may be quickly obtained.

Next, at block 490 the system may process any additional new journal entries detected by returning to block 450, where those additional new entries may be processed as described above. If no new entries are detected, the system may return to block 420 to perform additional scans on the journal data structure and continue monitoring.

Figure 5:
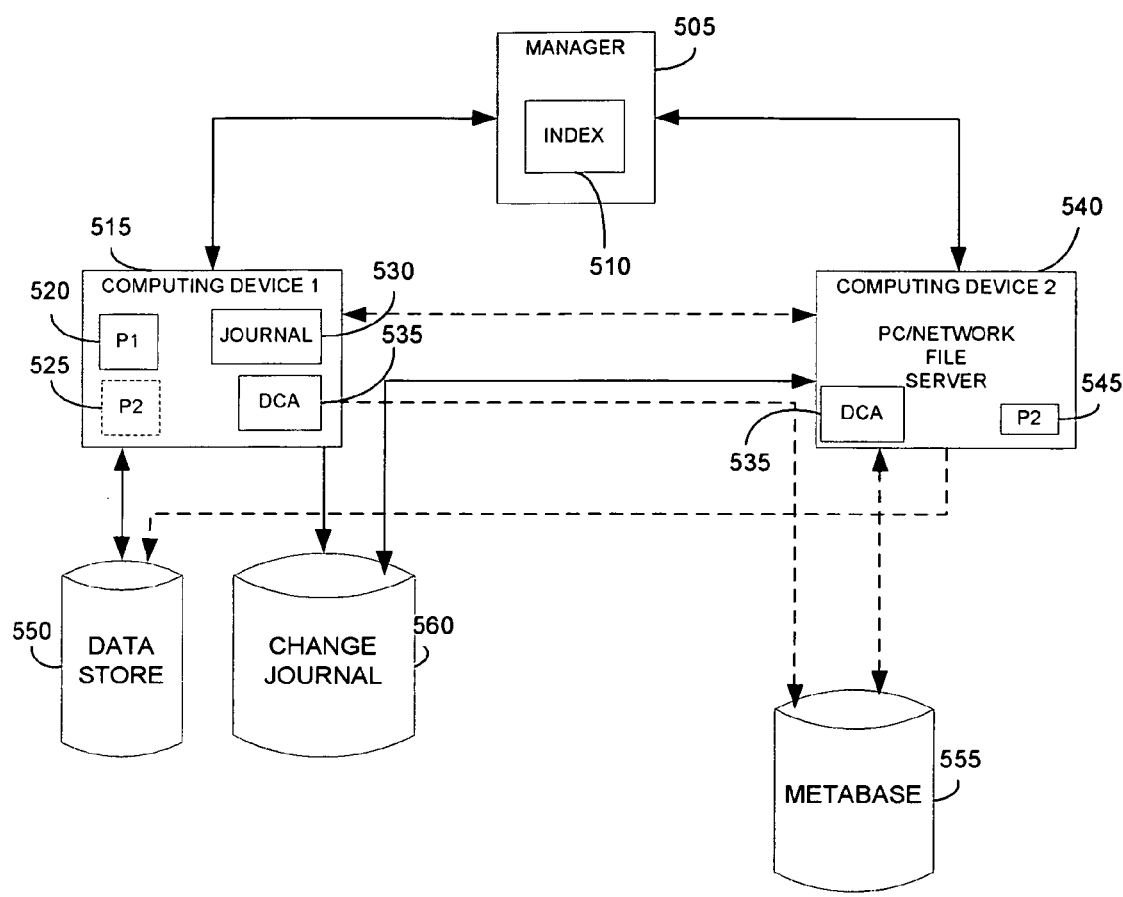
FIG. 5 illustrates a block diagram of another exemplary embodiment of a data classification.

FIG. 5 illustrates an embodiment of the present disclosure in which a secondary processor performs some or all of functions associated with the data classification process described herein, including certain search functions. As shown, system 500 may include a manager module 505 which may include an index 510, a first computing device 515, (which may include a first processor 520, a journal agent 530, and a data classification agent 535), and a second computing device 540 which may include a second processor 545 and a data classification agent 535. System 500 may also include data store 550, a metabase 555 and change journal 560.

Computing devices 515 and 540 may be any suitable computing device as described herein and may include clients, servers or other network computers running software, such as applications or programs that create, transfer, and store electronic data. In some embodiments, metabase 555 and journal 560 may be physically located within computing device 515, e.g., stored on local mass storage. In other embodiments the metabase 555 and journal 560 may be external to computing device 515 (or distributed between the two). In yet other embodiments, metabase 555 is accessible via a network and journal 560 is a local device.

In operation, computing device 515 may operate substantially similar system 300 shown in FIG. 3 with second processor 545 in second computing device 540 performing certain functions. For example, as shown, data classification agent 535 and journaling agent 530 may operate substantially as described in connection with FIG. 3, i.e., journaling agent monitors data interactions on computing device 515 and records the interactions in journal 535 and classification agent processes journal entries and populates metabase 555.

However, certain of the functions may be initiated or performed in whole or in part by second processor 545. Computing operations associated with journal agent 530 and/or classification agent 535 may run on or be directed by second processor 545 and may also utilize support resources located on or associated with computing device 540 such that the resources on computing device 515 are substantially unimpacted by these operations. This may serve to offload certain non-critical tasks from the host system (computing device 515) and have them performed by a secondary computing device (computing device 540).

For example, in some embodiments, the processing burden associated with some or all of the following tasks normally performed by first computing device 515 may be performed by processor 545 and associated resources in second computing device 540: (1) the initial scan of client files by the classification agent 535 and population of metabase 555, (2) the ongoing monitoring of data interactions of computing device (e.g., 515) and generation of interaction records for storage in journal 560, (3) processing and classification of journal information for updating metabase 555; and (4) searching or otherwise analyzing or accessing metabase 555 and/or journal 560 for certain information. However, in some embodiments it may be preferred to assign the secondary computing device the certain tasks such as those associated with searching metabase 555, while other tasks such as updating the journal and metabase may be performed by the primary computing device.

Performing such operations using a secondary or other processor may be desirable, for example, when the primary processor (e.g., processor 520) is unavailable, over utilized, unavailable or otherwise heavily used, or when it is otherwise desired to remove the primary processor and other primary system resources from performing certain tasks such as the ones described above. For example, in the case where it is desired to search or access metabase 555 for certain information, it may be preferable to avoid using processor 520 for this task so it remains free to perform other tasks associated with programs operating on computing device 515 (e.g., when computing device 515 is busy performing other network or application-related functions).

In some embodiments, the secondary processor may be located on computing device 515 (e.g., processor 525) and may perform the operations described herein in connection with processor 545. Moreover, some embodiments may include a manager module 505 which may coordinate overall operations between the various computing devices. For example, manager module 505 may monitor or otherwise be cognizant of the processing load on each computing device and may assign processing tasks based on availability (e.g., load balance). For example, if processor 520 is idle or operating at a low capacity, a request to search metabase 555 may be handled by processor 520. However, if processor 520 is busy or scheduled to perform or is performing priority work, manager 505 may assign the task to processor 545. Manager 505 may act as a general arbiter for such processor assignments to ensure system 500 is making efficient use of system resources.

Figure 6:
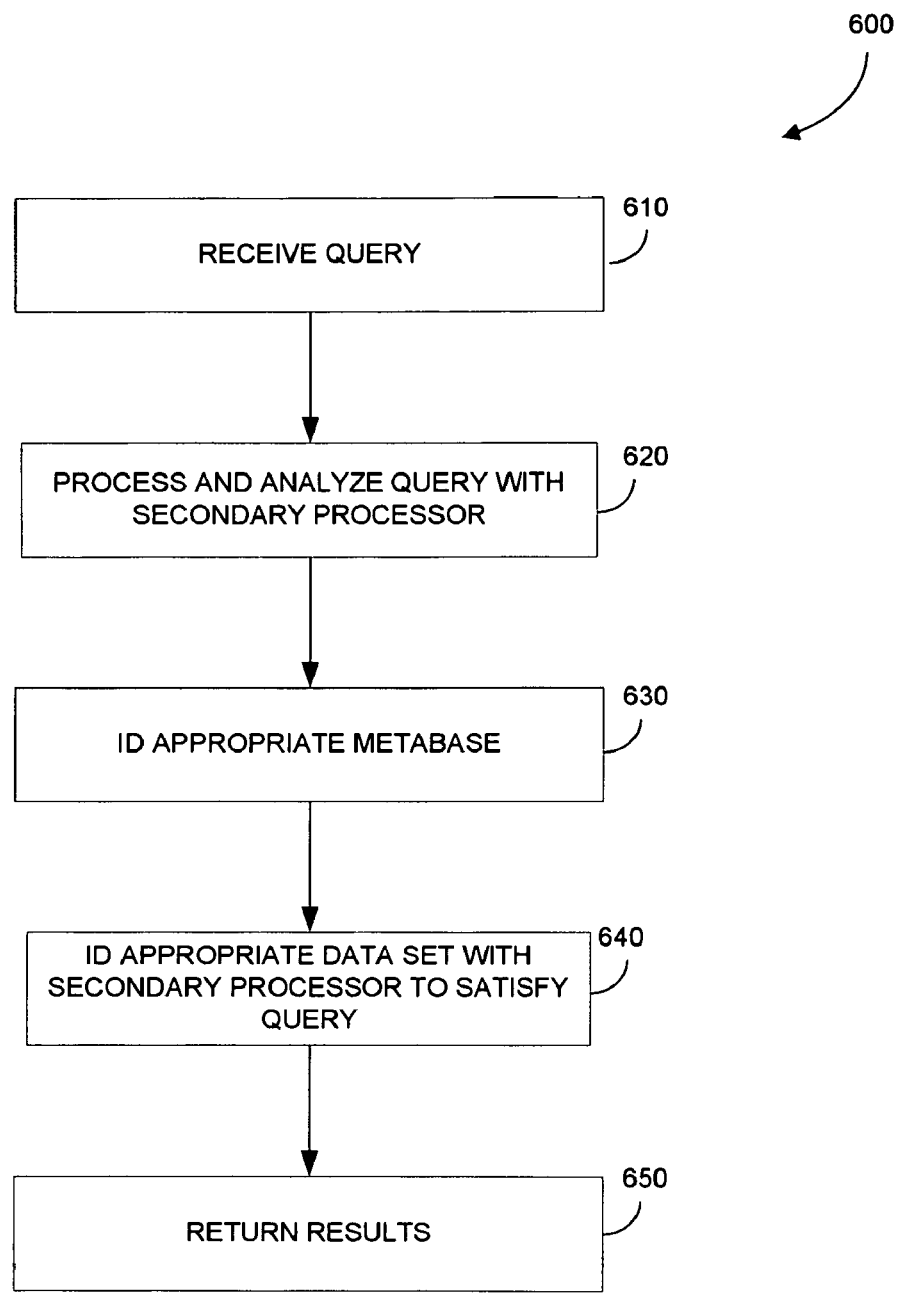
FIG. 6 illustrates a flow chart of a metabase query process in accordance with embodiments of the present disclosure.

FIG. 6 is flow chart 600 illustrating some of the blocks involved in performing a query on a metabase in a multiple processor system similar to the system shown in FIG. 5, according to certain embodiments of the invention. At block 610, a query may be received by the system for certain information. This request may be processed and analyzed by a manager module or other system process (block 620) that determines or otherwise identifies which metabase or metabases within the system likely include at least some of the requested information (block 630). For example, the query itself may suggest which metabases to search and/or the management module may consult an index that contains information regarding metabase content within the system as further described herein. It will be understood that the identification process may require searching and identifying multiple computing devices within an enterprise or network that may contain information satisfying search criteria.

In other embodiments, search requests may be automatically referred to a secondary processor to minimize processing demands on the computing device that may have created or is otherwise associated with the identified metabase(s). In some embodiments, it is preferable that the computing device that created or is otherwise associated with the identified metabase(s) not be involved in processing search operations as further described herein. Thus, the secondary computing device may consult with a manager or index associated with other computing devices to identify metabases with responsive information.

Next at block 640, the secondary processor may search metabases to identify appropriate data set that may potentially have information related to the query. This may involve performing iterative searches that examine results generated by previous searches and subsequently searching additional, previously unidentified metabases to find responsive information that may not have been found during the initial search. Thus the initial metabase search may serve as a starting point for searching tasks that may be expanded based on returned or collected results. Next, at block 650, the returned results may be optionally analyzed for relevance, arranged, and placed in a format suitable for subsequent use (e.g., with another application), or suitable for viewing by a user and reported (block 650).

Figure 7:
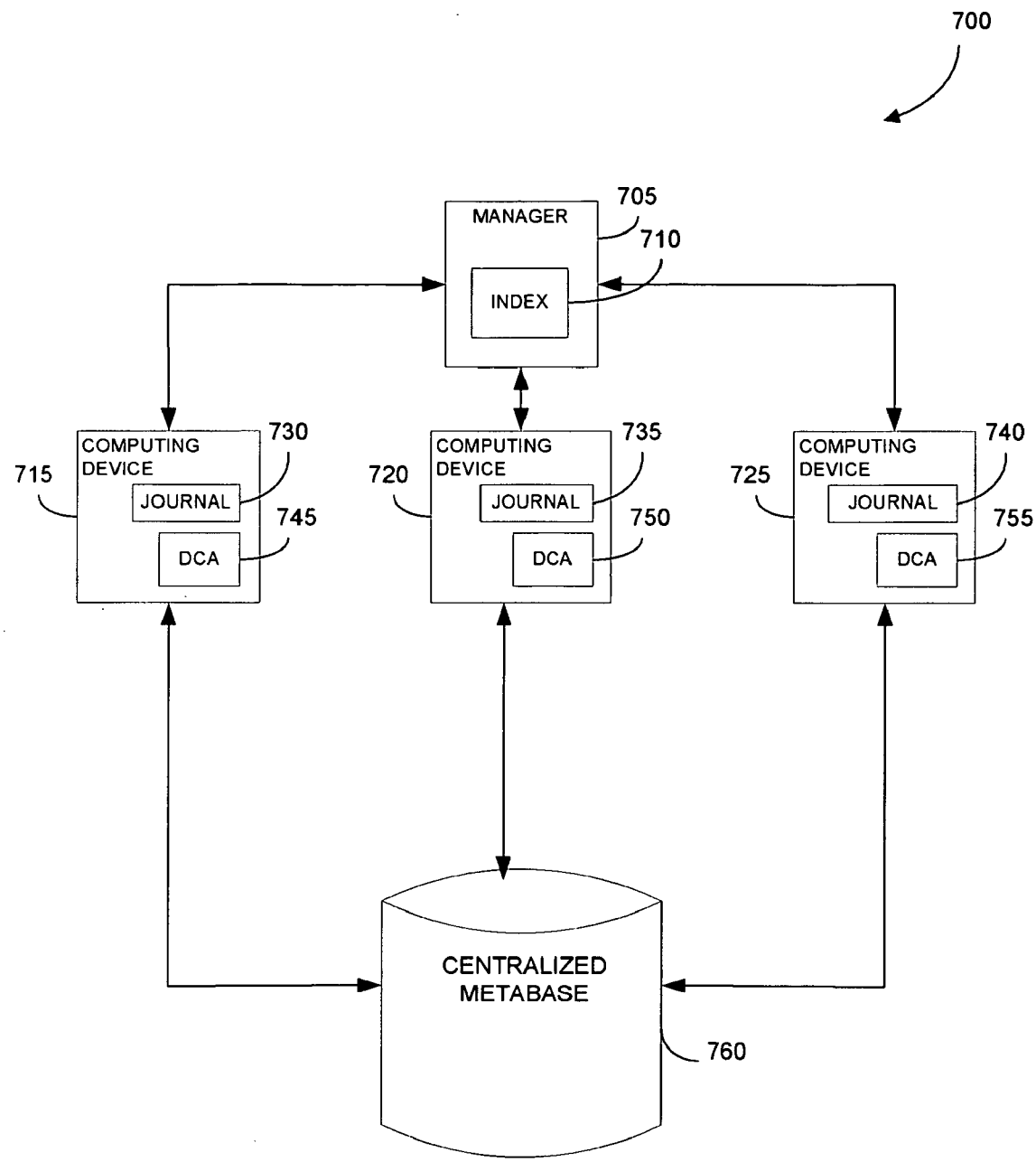
FIG. 7 illustrates a block diagram of another embodiment of a data classification system having a centralized metabase

FIG. 7 presents a system 700 constructed in accordance with the principles of the present disclosure employing a centralized metabase 760 that may serve multiple computing devices 715, 720, 725. For example, as shown, system 700 may include computing devices 715, 720, 725, each of which may include a journaling agent (730, 735, 740 respectively), a classification agent (745, 750, 755 respectively), and centralized metabase 760, and in some embodiments, a manager module 705 with an index 710.

In operation, system 700 may operate substantially similar to system 300 shown in FIG. 3 with each computing device 715, 720, 725 storing classification entries in centralized metabase 760 rather than each computing device having its own dedicated metabase. For example, as shown, data classification agents 745, 750, 755 may operate substantially as described herein and communicate results to centralized metabase 760. That is, the data classification agents 745, 750, 755 may analyze and process entries within the respective journals associated with journaling agents 730, 735, 740, and report results to metabase 760. With this arrangement, the classification agent may provide each metabase entry with an ID tag or other indicia that identifies which computing device 715, 720, 725 the entry originated from to facilitate future searches and efficiently designate entry ownership, or other associations between entries and computing devices.

Moreover, each entry to metabase 760 may be assigned a unique identifier for management purposes. As mentioned above, this number may represent the index location or offset of the entry within centralized metabase 760. In some embodiments, entries may be communicated to metabase 760 from the computing devices 715, 720, 725 on a rolling basis and may be arranged and formatted for storage by the metabase 760. For example, metabase 760 may receive multiple entries at substantially the same point in time from multiple computing devices 715, 720, 725 and may be responsible for queuing and arranging such entries for storage within the metabase 760.

In some embodiments, the system 700 may include manager module 705 that may be responsible for assigning or removing associations between certain computing devices 715, 720, 725 and a particular centralized metabase 760. For example, in accordance with certain system preferences defined in index 710, manager 705 may direct certain computing devices 715, 720, 725 to write classification entries to a particular centralized metabase 760. Information indicating an association of the metabase 760 and the computing devices 715, 720, 725 may be stored in the index 710. In certain embodiments, this allows system 700 to reassign resources (globally or locally) to optimize system performance without the need to change device pointers or code associated with each computing device 715, 720, 725 that may be affected by a particular reallocation. For example, manager 705 may reassign certain computing devices 715, 720, 725 to another metabase by changing a destination address in an appropriate index.

Figure 8:
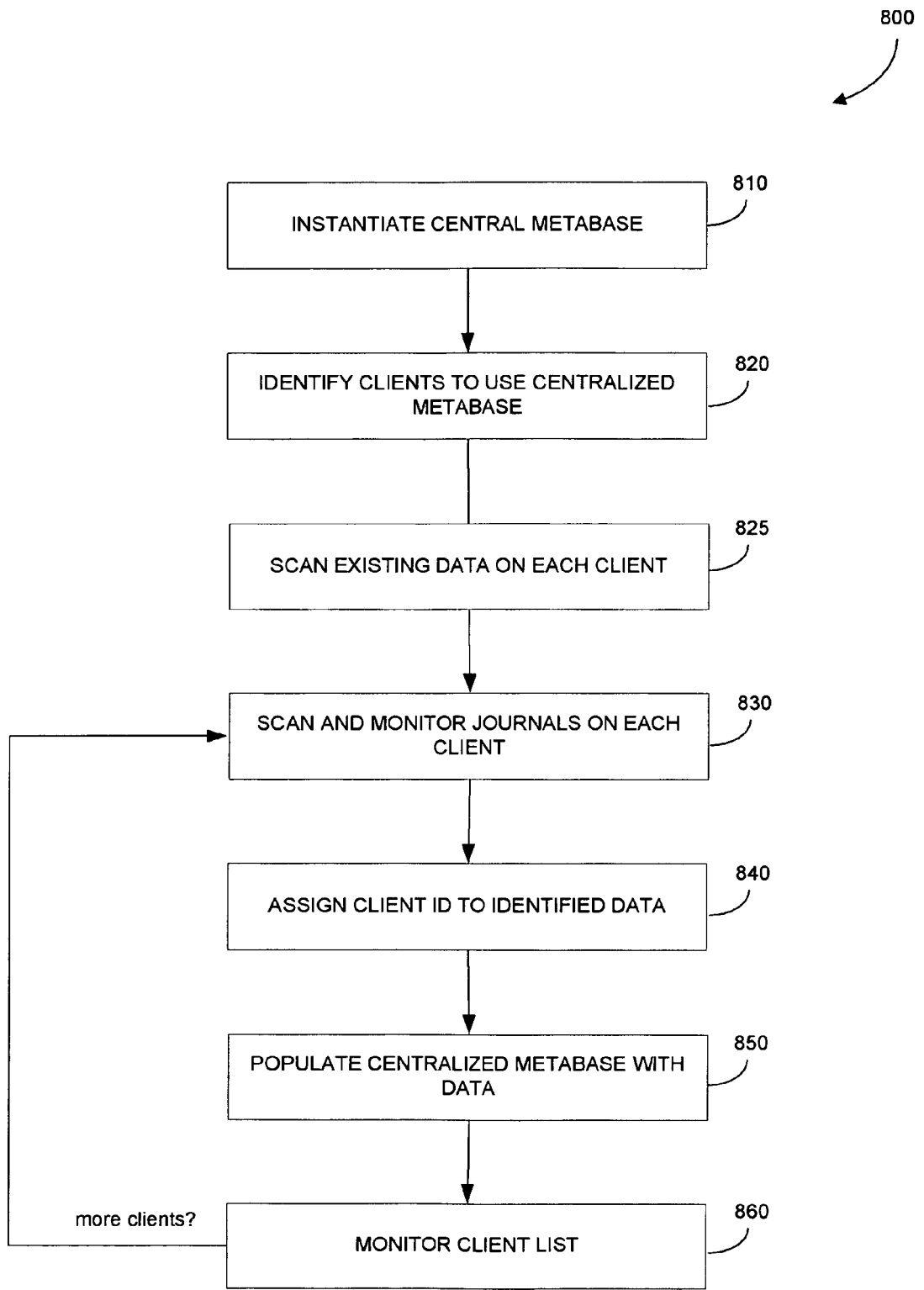
FIG. 8 illustrates a flow chart of a data classification process usable by the data classification system of FIG. 7, in accordance with embodiments of the present disclosure.

FIG. 8 illustrates a flow chart 800 illustrating some of the blocks involved in using a centralized metabase with multiple computing devices similar to the one shown in FIG. 7, according to certain embodiments of the present disclosure. At block 810, a centralized metabase may be instantiated by a manager module or in accordance with certain system management or provisioning policies. This may involve securing certain processing, storage, and management resources for performing the task, loading certain routines into various memory buffers and informing the management module that the metabase is ready for operation.

Next, at block 820, the management module may review system resources, management policies, operating trends, and other information, for example, to identify computing devices to associate with the instantiated centralized metabase. This may further involve identifying pathways to the metabase from the various computing devices, locating operational policies governing the computing devices and, creating certain logical associations between the centralized metabases and the identified computing devices. These associations, once created, may be stored in an index or database for system management purposes.

After the metabase has been instantiated and associated with computing devices, classification agents within each associated computing device may scan existing files or data on the computing devices or clients (block 825) and populate the centralized metabase as further described herein (block 830). During the scanning process, a computing device identifier or other indicia may be appended or otherwise associated with the entry prior to transmission to the metabase such that each entry in the metabase can be tracked to its associated source computing device (block 840). Next, the centralized metabase may be populated with entries (block 850) and may communicate with the management module to establish and monitor a list of computing devices serviced by the centralized metabase (block 860) and return to block 830. At this point, the system continues to monitor the associated computing devices for data interactions, which may be reported to the centralized metabase on an ongoing, periodic, or rolling basis.

In certain circumstances, the centralized metabase may need to assimilate or otherwise integrate existing entries with new entries reported by the computing devices. For example, the centralized metabase may become disconnected or unavailable for a period of time and subsequently be required to integrate a large number of queued entries. In this case, the metabase or management module may examine existing metabase entries as described herein and communicate with computing devices to identify: (1) the amount of time the object computer and the metabases have been disconnected, (2) the number of queued entries at the computing devices that need to be processed (for example, entries cached once the centralized metabase was inaccessible for write operations), (3) whether there are any duplicative entries, and (4) which entries need to be integrated and in what order of preference (assuming multiple computing devices contain queued entries).

Based on one or more of these criteria, the management module or centralized metabase may assimilate the relevant entries into the metabase in the appropriate order until the backlog is eliminated and the system returns to normal operation. If it is determined during this process that certain information is lost to cache overflow, accidental deletion, corruption, or other reasons, the metabase and/or manager module may indicate such a discontinuity with the metadata or index associated with the centralized storage device or management module. In this case, clients, computing devices or other data sources may be rescanned to replace or repair the faulty entries. In other embodiments, the points of discontinuity may be noted and interpolation or other data healing techniques may be employed to provide derived information for the unknown points based on known information.

Figure 9:
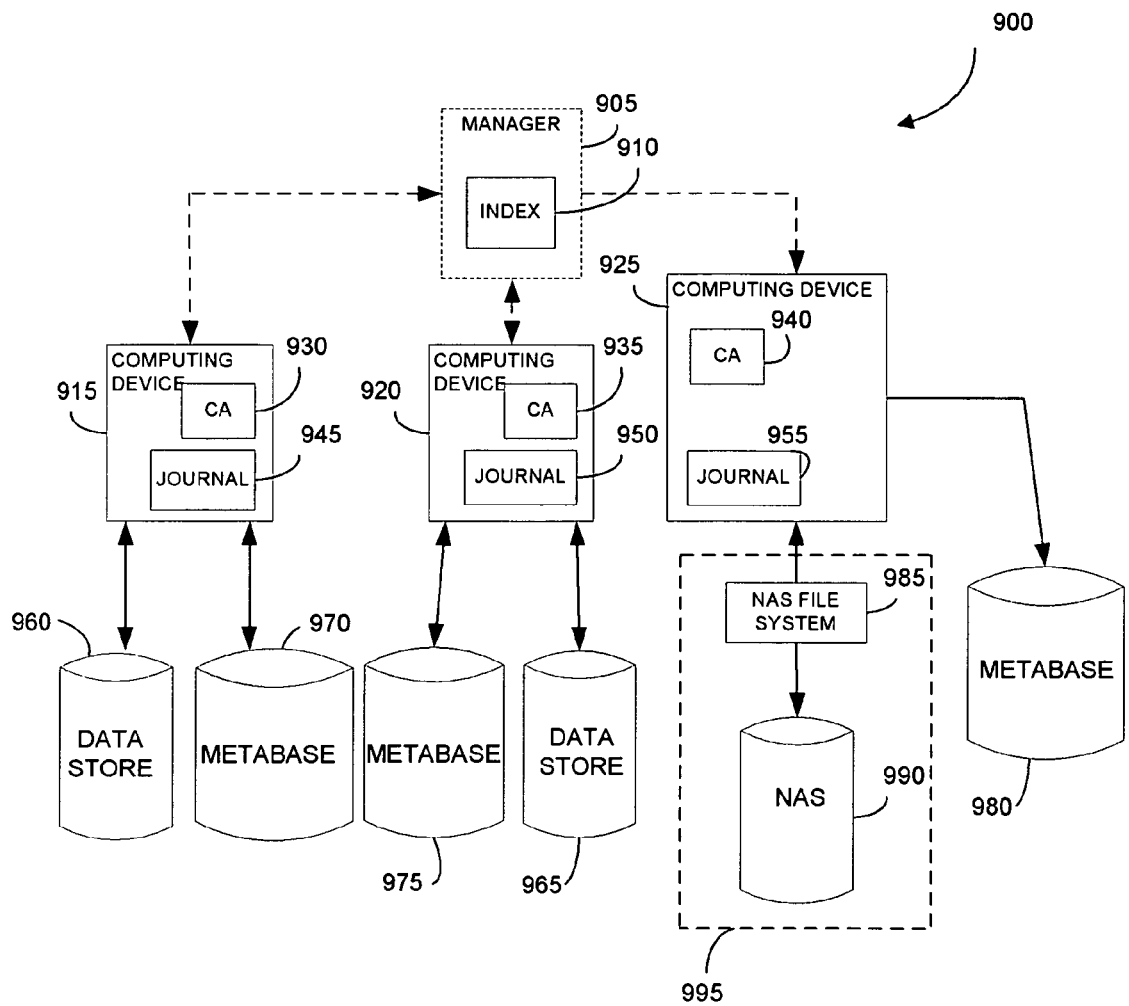
FIG. 9 illustrates a block diagram of an exemplary embodiment of a data classification system having a network attached storage (NAS) device.

FIG. 9 presents a system 900 constructed in accordance with the principles of the present disclosure including a computing device that interacts with a network attached storage device (NAS). As shown, system 900 may include a management module 905 and index 910, computing devices 915, 920, 925, each of which may include a journaling agent (945, 950, 955 respectively), a classification agent (930, 935, 940 respectively), data stores 960 and 965, and metabases 970, 975, 980, respectively. System 900 may also include NAS device 995 which may include NAS storage device 990 and NAS file system manager 985. Moreover, computing device 925 may be configured to operate as a NAS proxy device supervising the transfer of data to and from NAS device 995.

In operation, system 900 may operate substantially similar to system 300 shown in FIG. 3A with exception of the illustrated NAS portion. For example, as shown, data classification agents 930, 935, 940 may operate substantially as described herein and communicate results to their respective metabases 970, 975, 980. That is, analyze and process entries within the respective journals associated with journaling agents 945, 950, 955, and report results to metabases 970, 975, 980 which may be supervised in whole or in part by management module 905.

Data from computing device 925 may be journaled and classified using methods similar to those described herein. For example, journaling agent 955 may reside on computing device 925 and track each or certain data interactions between NAS device 995 and external applications. The location of the journaling agent 955 may be external to the NAS device 995 due, at least in part, to its proprietary nature (i.e., a closed system) and the difficulty associated with attempting to run other programs on the NAS device 995 itself.

The NAS portion 995 of system 900 may operate somewhat differently. For example computing device 925 may operate as a NAS proxy for moving data files to and from NAS device 995 using a specialized protocol such as the Network Data Management Protocol (NDMP) that is an open network protocol designed to perform data backups over heterogeneous networks. NDMP may be used to enhance performance by transferring data over a network by separating data and control paths, while maintaining centralized backup administration.

Journaling agent 955 may record any interactions between NAS data and external applications and record those interactions in computing device 925 as described herein. In some embodiments, such a journaling agent may include specialized routines for interpreting and processing data in NAS format. Data classification agent 940 may analyze journal entries and populate metabase 980 initially and periodically as further described herein.

Once initially populated, it may be desired to search the metabases of system 900 for certain information. This is discussed in more detail below in connection with the flow chart of FIG. 11. In some embodiments, this may be handled by manager 905 or other system process which may initially evaluate any search request and consult index 910 or other information stores to determine which metabases within the system are likely to include responsive information. The results of this evaluation may be provided to the computing device handling the search request and may be in the form of pointers or other indicia or identifiers identifying a metabase such as a metabase ID. This may allow the computing device posing the search request to contact and search the identified metadata directly. In other embodiments manager 905 may process the request and provide substantially complete results to the computing device that submitted the query.

Figure 10:
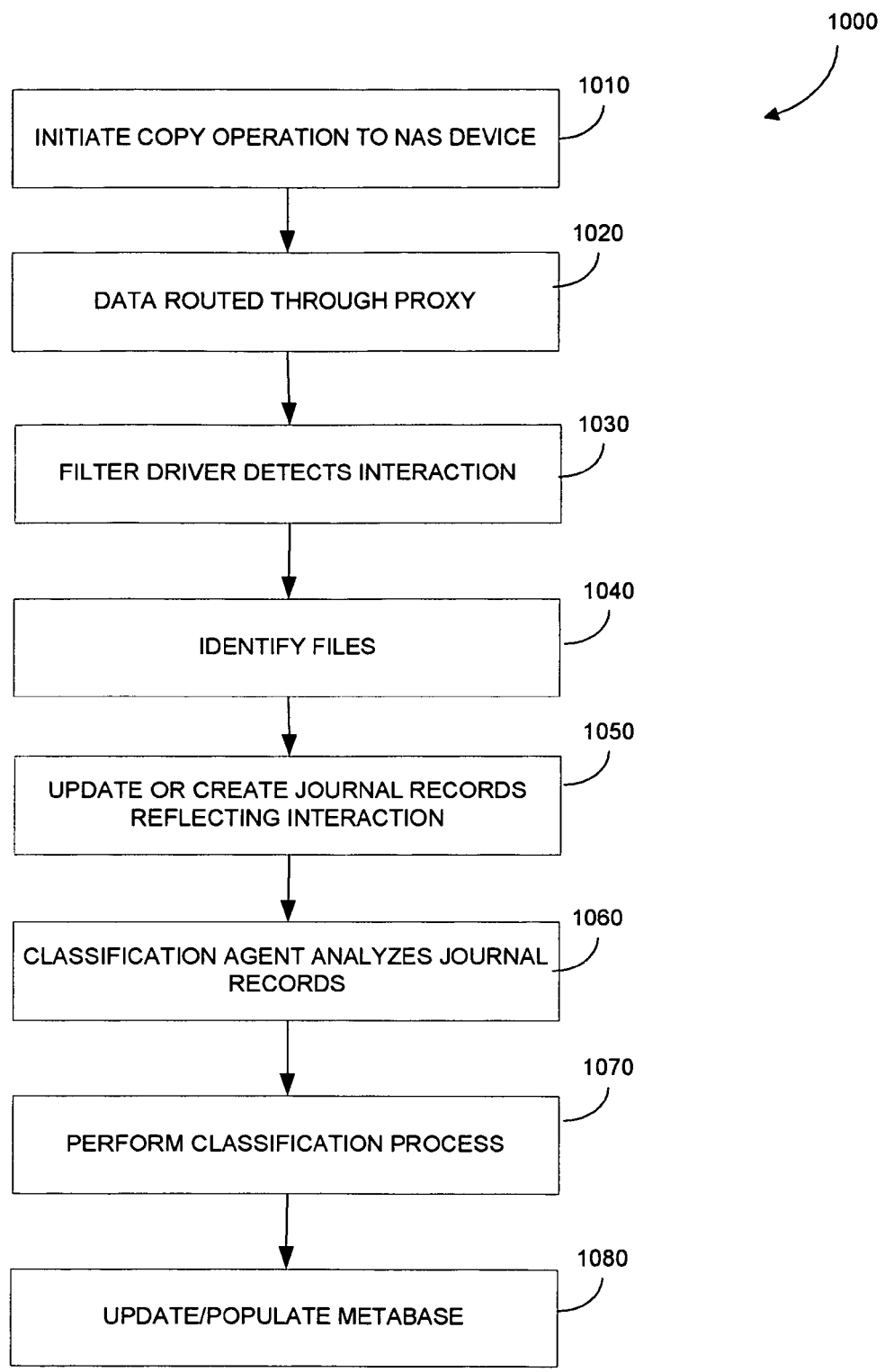
FIG. 10 illustrates a flow chart of a data classification process usable by the data classification system of FIG. 9, in accordance with embodiments of the present disclosure.

FIG. 10 is a flow chart 1000 illustrating some of the blocks that may be involved in using the NAS system similar to or the same as the one shown of FIG. 9, according to certain embodiments of the present disclosure. At block 1010, a copy operation may be initiated that directs data from computing device to a NAS device. This may involve identifying certain data to moved, for example, based on a data management or storage policy. Other factors that may also be considered may include data size, the last time the data was moved to the NAS device, the file owner, application type, combinations of the same or the like.

It will be understood that in some embodiments it may be preferred to use computing device 925 as a NAS proxy that routes data from other network computing devices to NAS device 995 with the computing device 925 supervising the data movement using certain specialized transfer programs to assist in the effort (block 1020). As the data is routed though computing device 925, journaling agent 955 may monitor interactions with NAS device 995 and create interaction entries for an interaction journal (block 1030). This may be accomplished by consulting with NAS file manager 985 and identifying which files in NAS 995 that have been involved in a data interaction as further described herein (block 1040). Next, journal entries may be created or updated to reflect data interactions currently detected as previously described herein (block 1050). The interaction journal may then be scanned to analyze the journal records (block 1060) and perform the classification process as further described herein to create metabase entries (block 1070). At this point metabase entries may be assigned an identifier and used to populate metabase 980 (block 1080).

Figure 11:
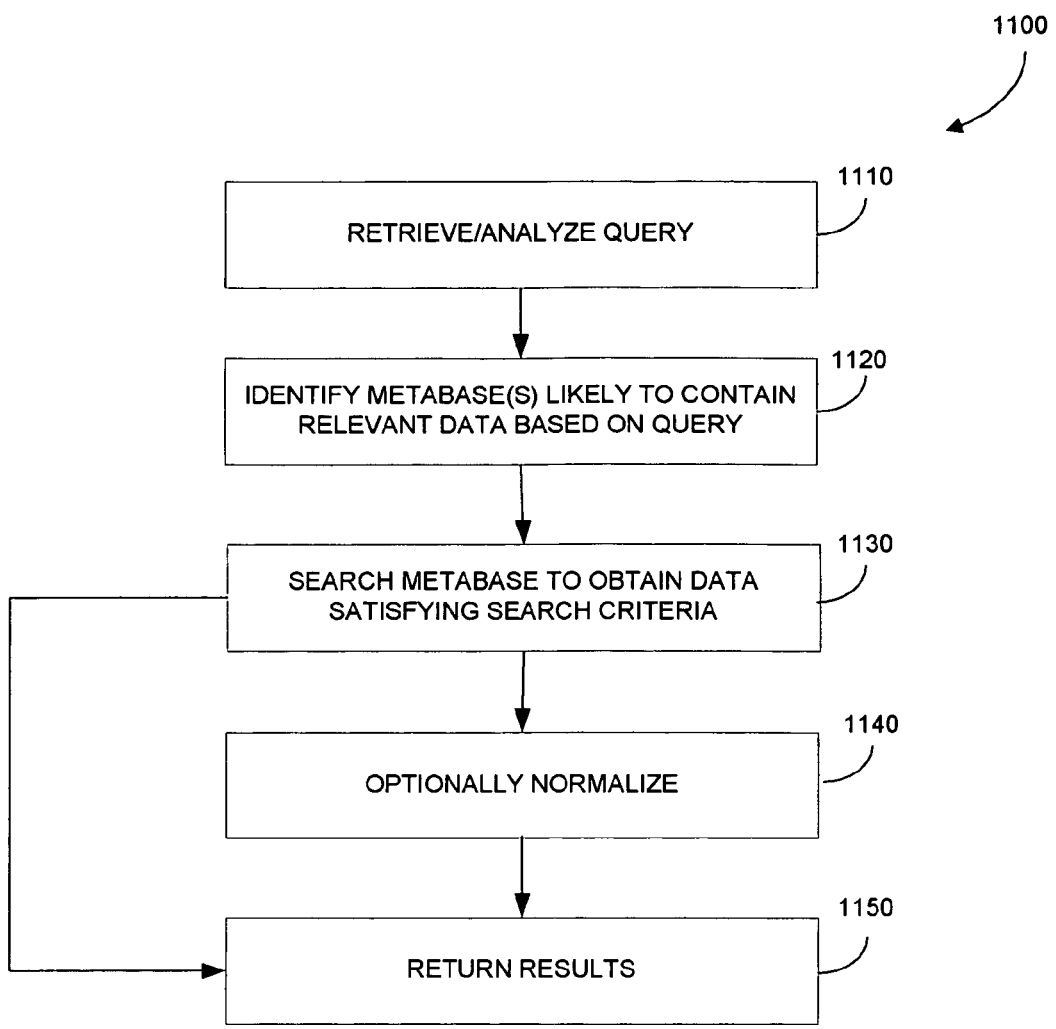
FIG. 11 illustrates a flow chart of an exemplary embodiment of a search process for a multiple metabase system.

As mentioned above, under certain circumstances, it may be desired to search a system that includes multiple metabases for certain information such as system 900 shown in FIG. 9 whether or not NAS included. FIG. 11 includes a flow chart 1100 illustrating some of the blocks that may be performed in searching a multiple metabase system in accordance with certain embodiments of the present disclosure.

Assume, for example, a user wants to locate and copy all data relating to a certain specified criteria such as data relating to a specific marketing project created and edited by a specific group of users over a certain period of time. First, the requester may formulate such a request through a user interface using techniques known in the art and submit the request to the system for processing. This may also be accomplished by an automated computerized process, for example, when the system is performing certain management functions. Next the system may receive and analyze this query (block 1110). In some embodiments, this may be performed by a computing device configured to support the user interface. In other embodiments, the computing device may simply pass the request to the system where a management module or other system process computing device may perform the analysis. The analysis may include determining characteristics of data in the metabase that may satisfy the selected criteria.

Once the search request or query has been analyzed or parsed, the system may identify all metabases likely to contain records related to relevant data objects based on a query (block 1120). This may be accomplished by using information obtained from analyzing or parsing the request as well as consulting with a management module that may have a substantially global view of metabases within the system that includes index information or a general overview of the information the metabases contain. After a set of metabases have been identified, the management module or other computing device may perform the search to identify a data set satisfying a query as further described herein and return a set of results (block 1130). At block 1140, the results may optionally be normalized. If normalization is not required, the results may be reported at block 1150. If normalization is desired, the system may analyze the results for both content and completeness. If, based on the returned results, other unsearched metabases are implicated as potentially having information that satisfies the search criteria, those metabases may be searched as well. This process may continue in an iterative fashion until a substantially complete set of results is obtained. Even if no additional metabases are implicated, these results may then be optionally normalized by performing certain functions such as locating and removing duplicative results, identifying network pathways to data objects identified in the search, and formatting or arranging the results for further processing (whether another computing process or for a user). For example, the returned results may be used to locate and retrieve the responsive data objects that may include information located on primary or secondary storage devices within the system or for other purposes as further described herein.

In some embodiments, the systems and methods of the present disclosure may be employed to identify and track some or all data interactions on a user or group basis. For example, a system administrator or user may wish to record and keep track of data interactions involving some or all system groups or users. This may include, for example, read and write operations performed on the user's or group's behalf, information and applications used or accessed, viewed web pages, electronic gaming interactions, chat, instant messages, and other communication interactions, multimedia usage, other Internet or network based electronic interactions as known in the art, combinations of the same or the like. Thus, in certain embodiments, the system identifies, captures, classifies, and may otherwise tracks user and group interactions with electronic data creating a data store or other repository of these interactions and metadata associated with these interactions. In some embodiments, this repository may serve as a "digital or electronic life record" that effectively chronicles and catalogues some or all user or group interactions with electronic information and data during a given time period as further described herein.

Figure 11A:
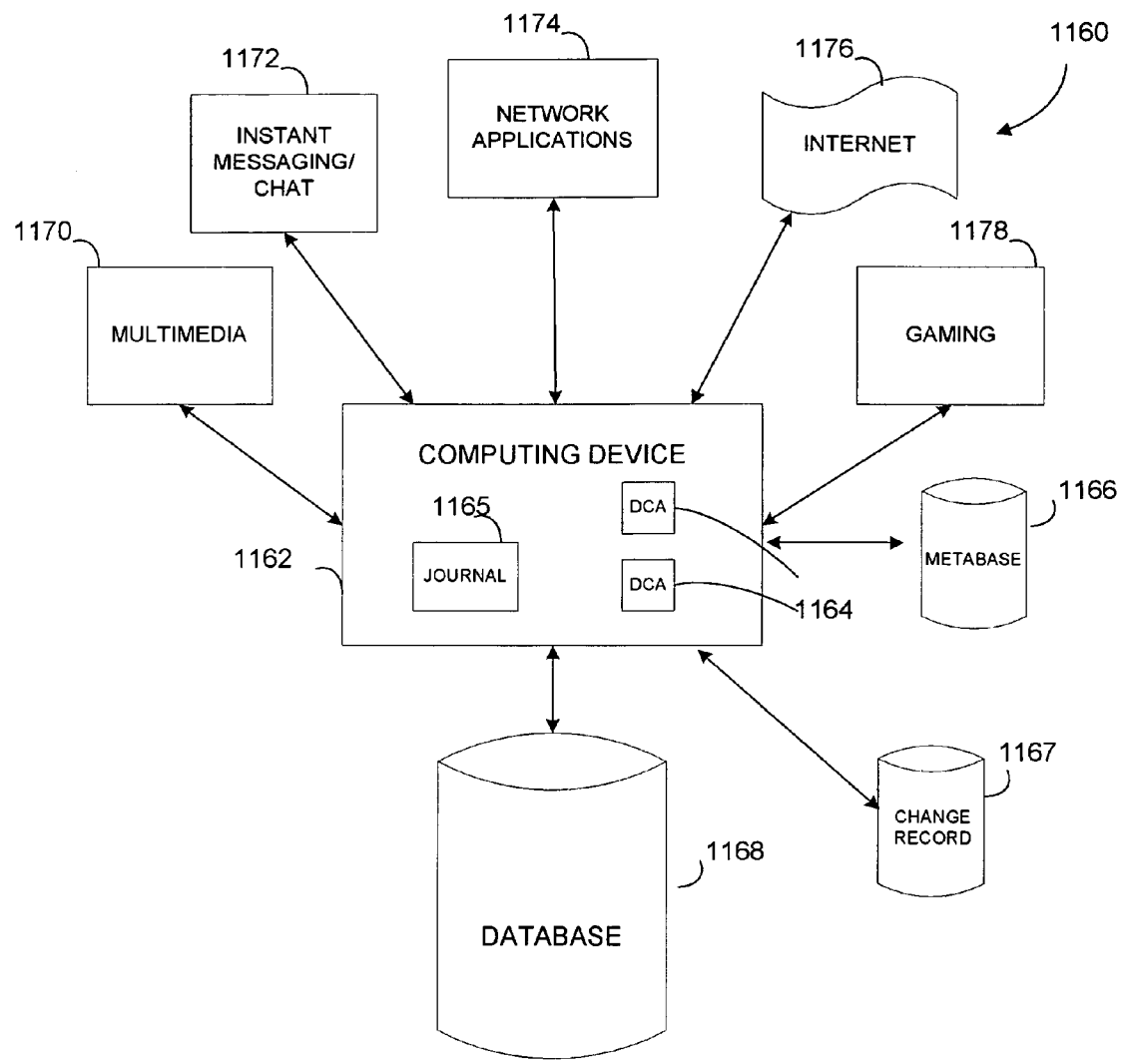
FIG. 11A illustrates another embodiment of a data classification system usable with a variety of applications.

For example, FIG. 11A illustrates a system 1160 constructed in accordance with the principles of the present disclosure that identifies, captures, classifies, and otherwise tracks user and group interactions with electronic data. As shown, the system 1160 may generally include computing device 1162, one or more classification agents 1164, one or more journaling agents 1165, a metabase 1166, a change record 1167, and a database 1168.

In operation computing device 1162 may be coupled to or interact with various other applications, networks, and electronic information such as, for example multimedia applications 1170, instant messaging/chat applications 1172, network applications 1174 such as an enterprise WAN or LAN, Internet 1176, and gaming applications 1178. It will be understood, however, that these are only exemplary and that any other network, application, or type of electronic information suitable for the purposes described herein may be added if desired.

Journaling agents 1165 and classification agents 1164 may operate in conjunction with one another to detect and record data interactions as further described herein. For example, each type electronic data interaction (e.g., instant messaging, web surfing, Internet search activities, electronic gaming, multimedia usage, combinations of the same or the like) may be identified, captured, classified, and otherwise tracked by a different journaling agent 1165 and classification agent 1164, for example an interaction-specific journaling agent 1165 or classification agent 1164 dedicated to processing a single type of interaction with electronic data. Thus, the system may have a first journaling agent 1165 and a first classification agent 1164 monitoring network traffic on a given network interface (not shown) directed to interactions associated with Internet usage, and a second journaling agent 1165 and a second classification agent 1164 monitoring a different system resource directed to interactions associated with electronic gaming (e.g., recording and classifying gaming interactions such as recording games played, opponents played, win/loss records, combinations of the same or the like) or directed to interactions associated with use of an Internet browser to "surf" web (e.g., tracking pages visited, content, use patterns, combinations of the same or the like) In some embodiments, journaling agent 1165 and classification agent 1164 may function as a single module capable of performing some or all functions associated with journaling agent 1165 and a classification agent 1164.

Thus, as a user or group interacts with various types of electronic information, some or all of those interactions may be captured and recorded in database 1168. Change record 1167 and metabase 1166 may record certain aspects of the interactions as further described herein and may represent an interaction by interaction log of the user's computing activities.

For example, in operation, a user of computing device 1162 may interact with certain applications such as multimedia application 1170 and instant messaging application 1172. This may include sending, receiving, viewing and responding to various audio/video files in any suitable format and may include instant, text or email messages. Journaling agent 1165 may detect the interactions between these applications and computing device 1162 and classification agent 1164 may classify and record information (e.g., metadata) associated with these interactions in metabase 1166 as further described herein.

Moreover, in some embodiments, some or all the content being exchanged or otherwise associated with these interactions may be captured and stored in database 1168 or other storage locations in the system. This may include capturing screen shots or summaries of information exchanges during data interactions. For example, the system may download all content associated with web pages viewed thus being able to recreate the original page content and interaction without access to the original or source version of the page on the Internet or other network. This may be advantageous, for example, if a user wishes to interact with content associated with a previous interaction when that content is no longer available, as is common with web pages and other network resources over time. As another example, the system may also capture or otherwise store data associated with other interactions, for example chat transcripts, video game replays, search queries, search results, and associated search content, songs accessed, movies accessed, stored songs and movies, combinations of the same or the like, in addition to metadata.

Moreover, in some embodiments, specialized classifications agents may be employed for some or all of the applications that a user or administrator desires to track and record. For example, the multimedia and instant messaging applications described above may each have a dedicated classification agent that analyzes journal records to create entries for metabase 1166. Further still, each classification agent may have its own associated metabase and or repository for source data (not shown), so application histories and content may be quickly indexed and searched. In other embodiments, however, a "universal" classification agent may be used that recognizes the application type (e.g., based on the journaling agent entries) and process interactions accordingly (which may include routing metadata to one or more specialized metabases).

As shown in FIG. 11A, computing device 1162 may also interact with various network applications 1174 such as LAN or WAN applications. These may include interaction with certain distributed programs such as Microsoft Word or Outlook. Users may also interact with Internet 1176 and download various web pages and other information. In accordance with an aspect of the present disclosure, interactions with these networks/applications may also be journaled as described above with certain information regarding these interactions stored in metabase 1166. Portions of exchanged content may also be stored in database 1166. For example, Word documents, emails, web pages, web addresses and HTML content may be captured and stored on database 1168 such that it substantially represents a record of all user interactions with computing device 1162, or other system devices. For example, user interactions may be recorded with respect to any identified user based on identifiers and tracked at any network computing device.

Thus, if desired a user may retrieve captured data and review or replay certain data exchanges or save such records for future reference. For example, a user may store all instant messaging interactions for replay or transmission to another. In some instances, it may be desirable to not record certain interactions, such as personal or private information. In some embodiments, this may be accomplished by "disabling" the appropriate classification agent for a certain period of time or the like.

Likewise, interactions with gaming applications (network or stand alone) may also be recorded stored with appropriate information stored in database 1168 and metabase 1166. Thus, a user may have the ability to retrieve, replay and transmit certain saved gaming sequences to third parties.

In some embodiments, database 1168 may become large and thus some information stored thereon may be moved to single instance storage from database 1168 with pointer placed in the logical address of the instanced information (not shown). This may be performed as a memory saving measure as at least some of the entries in database 1168 are likely to be duplicative.

Figure 12:
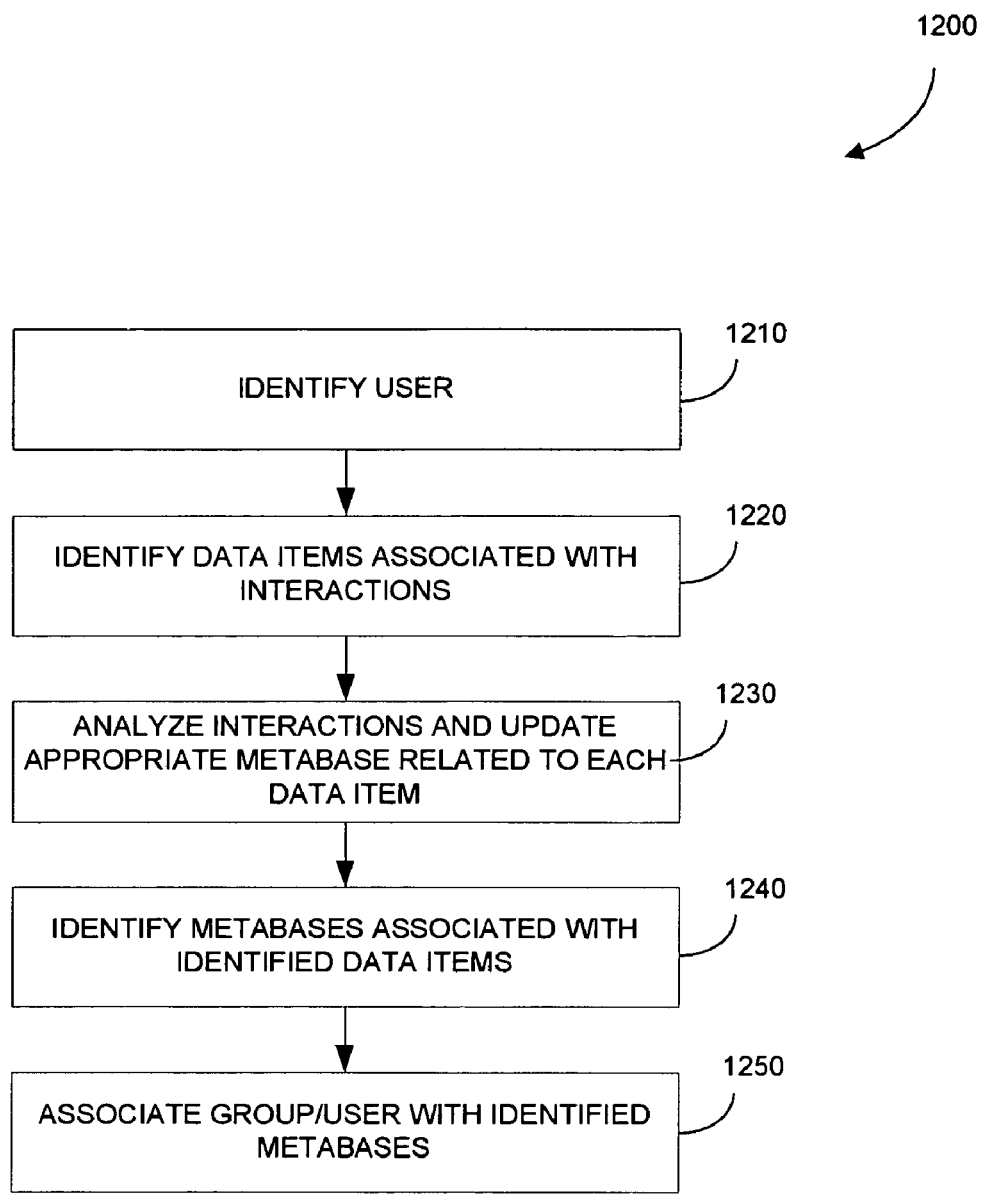
FIG. 12 illustrates a flow chart of a data classification process usable by the data classification system of FIG. 11A, in accordance with embodiments of the present disclosure.

Some of the blocks associated with the method generally described above are illustrated in the flow chart 1200 of FIG. 12 and may include the following. At the outset, a group or user of interest may be identified based on certain user related information or other network characteristics (block 1210). Such characteristics may include Active Directory privileges, network login, machine ID, or certain biometrics associated with a user or group member. These characteristics may be combined together or associated with one another to create a user or group profile. Such profiles may be stored in a database or index within a management module of the system and may be used as classification definitions within the system. When it is desired to identify or classify data items associated with a particular interaction, the system may compare certain attributes of the data involved in a detected interaction and associate that interaction with a particular group or user based on profile information (block 1220).

Such associations may be stored in a metabase created to keep track of user or group interactions. Thus, in one embodiment, the metabase essentially represents a list of all data interaction for a particular group or user. If desired, a list or copy of all the data items touched (e.g., interacted with) by a group or user may be quickly obtained.

In operation, the system may, through the use of a journaling agent or the like, monitor data interactions for a particular computing device as described herein. The interactions may be analyzed by a classification agent as described herein and associated with one or more profiles (block 1230). The association may be recorded in an identified metabase(s) that keeps track of a user's or group's interactions (block 1240) which may include references to the data object(s) identified, the attributes compared, and the basis for the association, combinations of the same or the like. As discussed herein, the journaling agent may continue to monitor data interactions throughout operation, so that each metabase is updated and continues to accurately represent the data touched by a particular group or user. The identified metabases are associated with an identified group or user (block 1250), such as by storing an indication of the association in an index.

Figure 13:
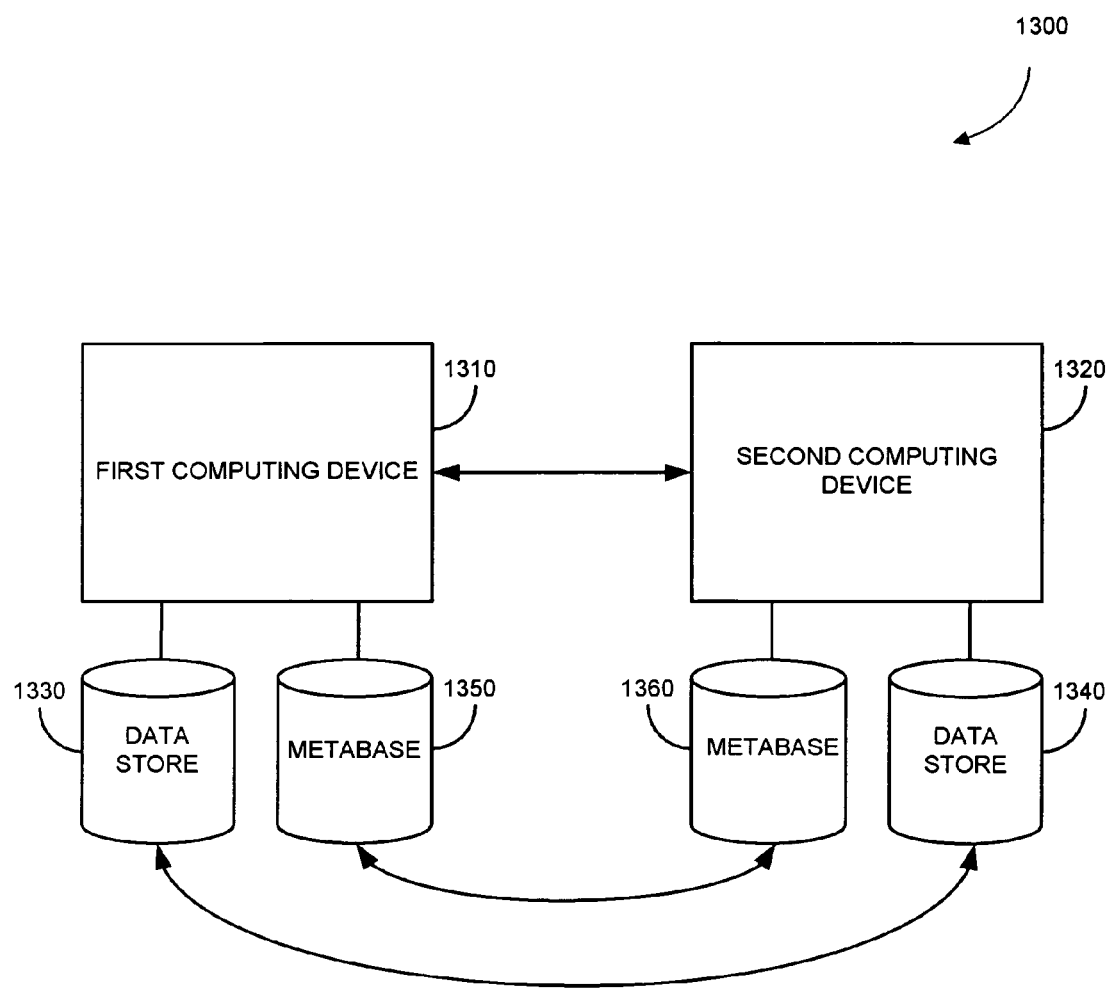
FIG. 13 illustrates a block diagram of an exemplary embodiment of a system for communicating metadata between multiple computing devices.

FIG. 13 presents a system 1300 constructed in accordance with the principles of the present disclosure for communicating metadata and/or data objects between two or more computing devices. As shown, system 1300 may generally include first and second computing devices 1310 and 1320, respectively, associated data stores 1330 and 1340, and metabases 1350 and 1360. Computing devices in system 1300 may store data objects and metadata in their respective metabases and data stores as further described herein. In certain situations, however, it may be desired to transfer certain metadata between metabases 1350 and 1360 and certain data objects between data stores 1330 and 1340. This may be desirable for example, to move certain data from one computing device to another, to recreate a certain application at another location, or to copy or backup certain data objects and associated metadata.

Figure 14:
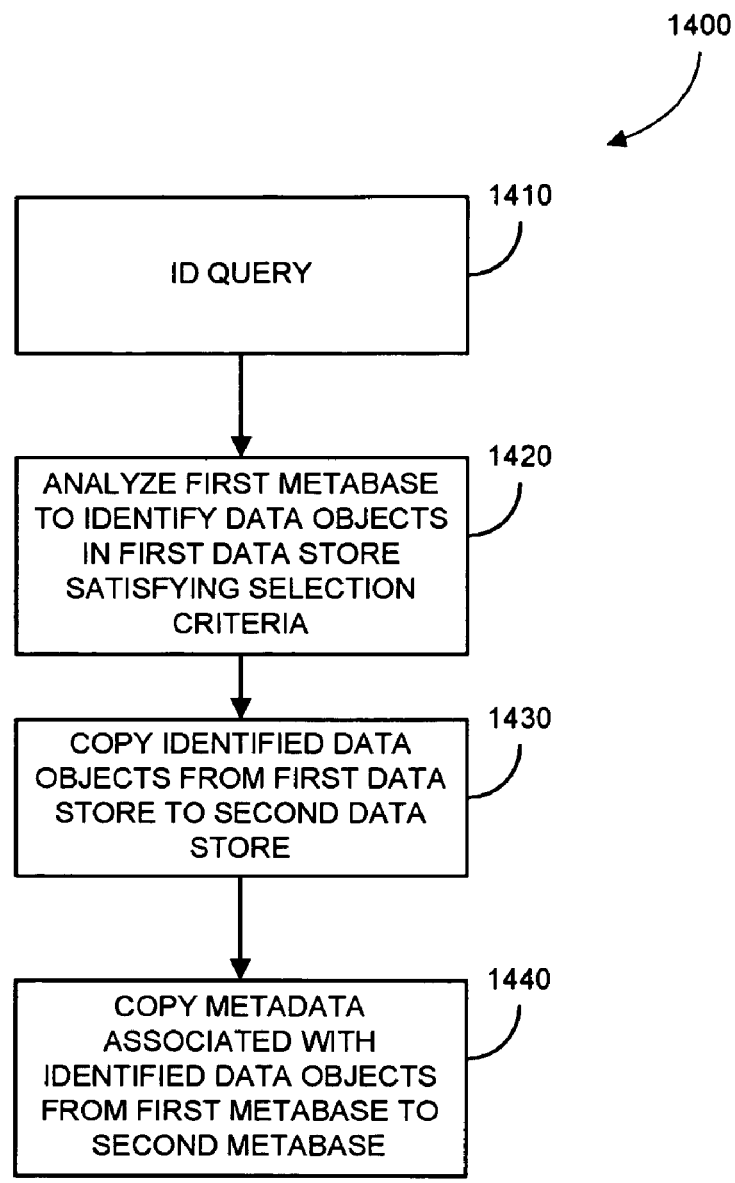
FIG. 14 illustrates a flow chart of a metadata transfer process usable by the system of FIG. 13 in accordance with embodiments of the present disclosure.

FIG. 14 presents a flow chart 1400 illustrating some of the blocks associated with moving data between the computing devices described above, according to certain embodiments of the present disclosure. First, at block 1410, data objects and/or associated metadata may be identified for movement from one computing device to another. This may be accomplished by forming a query for certain data, such as a search for data that may be to be moved or copied pursuant to a data management or storage policy, or in response to a request to move data relating to certain processes or applications from one computing device to another, for any other suitable purpose such as disaster recovery, resource reallocation or reorganization, load balancing, combinations of the same or the like.

At block 1420, the query may be analyzed and a first data store associated with a first computer may be searched for data objects satisfying the search criteria. Data objects identified during this process may then be transferred to a second data store associated with a second computing device (block 1430). Metadata associated with the transferred data objects may also be identified in a first metabase associated with the first computing device and transferred to an appropriate second metabase associated with the second computing device (block 1440). Such a transfer may involve copying data objects and metadata from one data store and metabase to another, or in some embodiments, may involve migrating the data from its original location to a second location and leaving a pointer or other reference to the second location so the moved information may be quickly located from information present at the original location.

Figure 15:
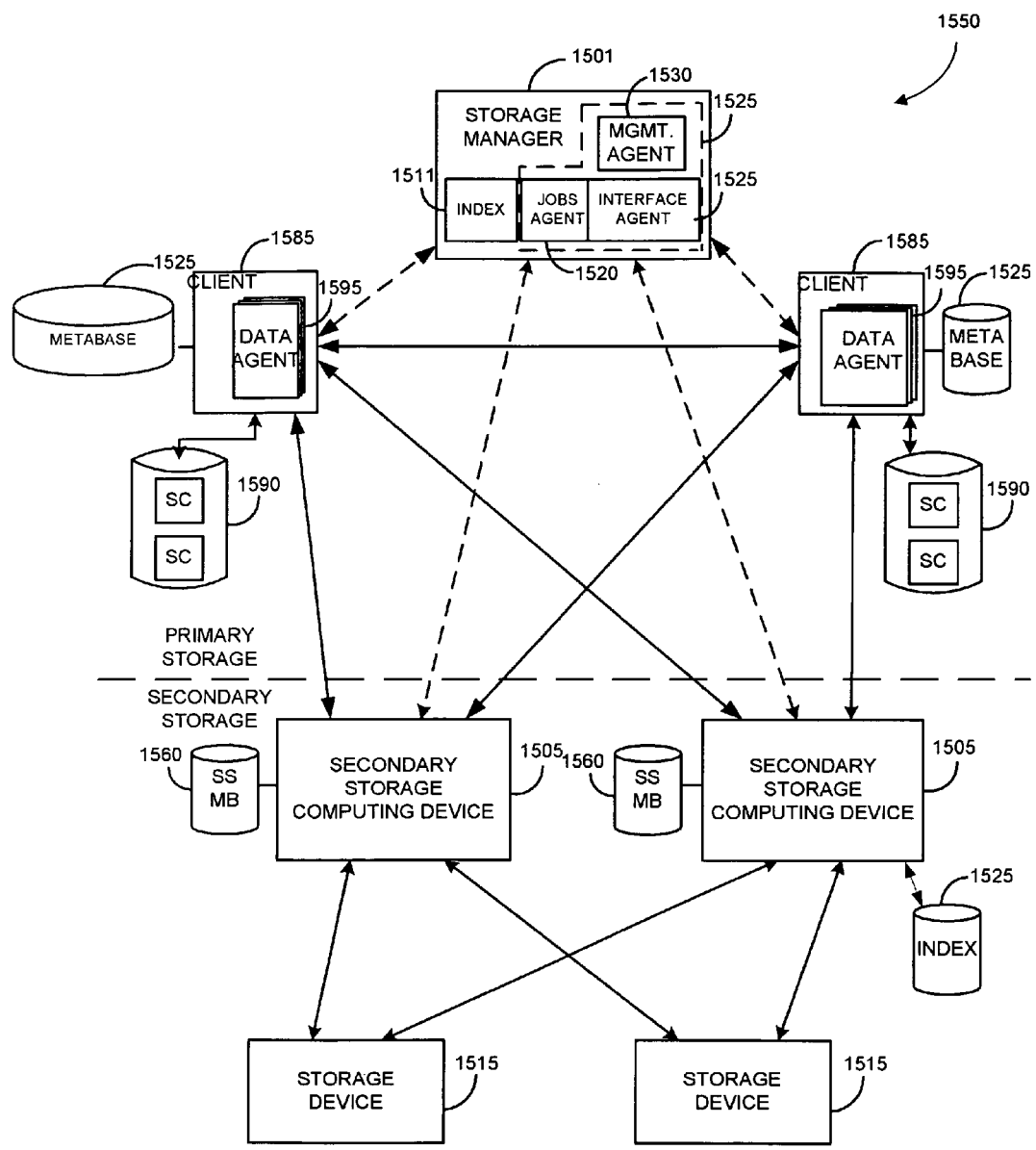
FIG. 15 illustrates a block diagram of an exemplary embodiment of a network system for performing data classification.

FIG. 15 illustrates one arrangement of resources in a computing network in accordance with the principles of the present disclosure. As shown, storage operation cell 1550 may generally include a storage manager 1501, a data agent 1595, a media agent 1505, a storage device 1515, and, in some embodiments, may include certain other components such as a client 1585, a data or information store 1590, database or index 1511, jobs agent 1520, an interface module 1525, and a management agent 1530. Such system and elements thereof are exemplary of a modular storage system such as the CommVault QiNetix® system, and also the CommVault GALAXY backup system, available from CommVault Systems, Inc. of Oceanport, N.J., and further described in U.S. patent application Ser. No. 09/610,738, which is incorporated herein by reference in its entirety.

A storage operation cell, such as cell 1550, may generally include combinations of hardware and software components associated with performing storage operations on electronic data. According to some embodiments of the present disclosure, storage operations cell 1550 may be related to backup cells and provide some or all of the functionality of backup cells as described in U.S. patent application Ser. No. 09/354,058, which is hereby incorporated by reference in its entirety. However, in certain embodiments, storage operation cells may also perform additional types of storage operations and other types of storage management functions that are not generally offered by backup cells.

In accordance with certain embodiments of the present disclosure, additional storage operations performed by storage operation cells may include creating, storing, retrieving, and migrating primary storage data (e.g., 1590) and secondary storage data (which may include, for example, snapshot copies, backup copies, HSM copies, archive copies, and other types of copies of electronic data) stored on storage devices 1515. In some embodiments, storage operation cells may also provide one or more integrated management consoles for users or system processes to interface with in order to perform certain storage operations on electronic data as further described herein. Such integrated management consoles may be displayed at a central control facility or several similar consoles distributed throughout multiple network locations to provide global or geographically specific network data storage information.

In some embodiments, storage operations may be performed according to various storage preferences, for example as expressed by a user preference or storage policy. A storage policy is generally a data structure or other information source that includes a set of preferences and other storage criteria associated with performing a storage operation. The preferences and storage criteria may include, but are not limited to, a storage location, relationships between system components, network pathway to utilize, retention policies, data characteristics, compression or encryption requirements, preferred system components to utilize in a storage operation, other criteria relating to a storage operation, combinations of the same and the like. Thus, in certain embodiments, a storage policy may indicate that certain data is to be stored in a specific storage device, retained for a specified period of time before being aged to another tier of secondary storage, copied to secondary storage using a specified number of streams. A storage policy may be stored in the storage manager database 1511, to archive media as metadata for use in restore operations or other storage operations, or to other locations or components of the system.

In certain embodiments, a schedule policy may specify when to perform storage operations and how often and may also specify performing certain storage operations on sub-clients of data and how to treat those sub-clients. A sub-client may represent static or dynamic associations of portions of data of a volume and are typically mutually exclusive. Thus, in certain embodiments, a portion of data may be given a label and the association is stored as a static entity in an index, database or other storage location used by the system. Sub-clients may also be used as an effective administrative scheme of organizing data according to data type, department within the enterprise, storage preferences, combinations of the same or the like.

For example, an administrator may find it preferable to separate e-mail data from financial data using two different sub-clients having different storage preferences, retention criteria, or the like. Storage operation cells may contain not only physical devices, but also may represent logical concepts, organizations, and hierarchies. For example, a first storage operation cell 1550 may be configured to perform a first type of storage operations such as HSM operations, which may include backup or other types of data migration, and may include a variety of physical components including the storage manager 1501 (or management agent 1530), the media agent 1505, the client component 1585, and other components as described herein. A second storage operation cell may contain the same or similar physical components, however, it may be configured to perform a second type of storage operations such as SRM operations, and may include as monitoring a primary data copy or performing other known SRM operations.

Thus, as can be seen from the above, although the first and second storage operation cells are logically distinct entities configured to perform different management functions (i.e., HSM and SRM respectively), each cell may contain the same or similar physical devices in both storage operation cells. Alternatively, in other embodiments, different storage operation cells may contain some of the same physical devices and not others. For example, a storage operation cell configured to perform SRM tasks may contain the media agent 1505, client 1585, or other network device connected to a primary storage volume, while a storage operation cell configured to perform HSM tasks may instead include a media agent 1505, client 1585, or other network device connected to a secondary storage volume and not contain the elements or components associated with and including the primary storage volume. These two cells, however, may each include a different storage manager that coordinates storage operations via the same media agents 1505 and storage devices 1515. This "overlapping" configuration allows storage resources to be accessed by more than one storage manager 1501 such that multiple paths exist to each storage device 1515 facilitating failover, load balancing and promoting robust data access via alternative routes.

Alternatively, in some embodiments, the same storage manager 1501 may control two or more cells 1550 (whether or not each storage cell 1550 has its own dedicated storage manager). Moreover, in certain embodiments, the extent or type of overlap may be user-defined (e.g., through a control console) or may be automatically configured to optimize data storage and/or retrieval.

Data agent 1595 may be a software module or part of a software module that is generally responsible for copying, archiving, migrating, and recovering data from client computer 1585 stored in an information store 1590 or other memory location. Each client computer 1585 may have at least one data agent 1595 and the system can support multiple client computers 1585. In some embodiments, data agents 1595 may be distributed between client 1585 and storage manager 1501 (and any other intermediate components) or may be deployed from a remote location or its functions approximated by a remote process that performs some or all of the functions of data agent 1595.

Embodiments of the present disclosure may employ multiple data agents 1595 each of which may backup, migrate, and recover data associated with a different application. For example, different individual data agents 1595 may be designed to handle Microsoft Exchange data, Lotus Notes data, Microsoft Windows 2000 file system data, Microsoft Active Directory Objects data, and other types of data. Other embodiments may employ one or more generic data agents 1595 that can handle and process multiple data types rather than using the specialized data agents described above.

If a client computer 1585 has two or more types of data, one data agent 1595 may be required for each data type to copy, archive, migrate, and restore the client computer 1585 data. For example, to backup, migrate, and restore all of the data on a Microsoft Exchange 2000 server, the client computer 1585 may use one Microsoft Exchange 2000 Mailbox data agent 1595 to backup the Exchange 2000 mailboxes, one Microsoft Exchange 2000 Database data agent 1595 to backup the Exchange 2000 databases, one Microsoft Exchange 2000 Public Folder data agent 1595 to backup the Exchange 2000 Public Folders, and one Microsoft Windows 2000 File System data agent 1595 to backup the client computer's 1585 file system. In such embodiments, these data agents 1595 may be treated as four separate data agents 1595 by the system even though they reside on the same client computer 1585.

Alternatively, other embodiments may use one or more generic data agents 1595, each of which may be capable of handling two or more data types. For example, one generic data agent 1595 may be used to back up, migrate and restore Microsoft Exchange 2000 Mailbox data and Microsoft Exchange 2000 Database data while another generic data agent may handle Microsoft Exchange 2000 Public Folder data and Microsoft Windows 2000 File System data, or the like.

Data agents 1595 may be responsible for arranging or packing data to be copied or migrated into a certain format such as an archive file which is discussed in more detail in connection with FIG. 16 herein. Nonetheless, it will be understood this represents only one example and any suitable packing or containerization technique or transfer methodology may be used if desired. Such an archive file may include a list of files or data objects copied in metadata, the file and data objects themselves. Moreover, any data moved by the data agents may be tracked within the system by updating indexes associated appropriate storage managers or media agents.

Generally speaking, storage manager 1501 may be a software module or other application that coordinates and controls storage operations performed by storage operation cell 1550. Storage manager 1501 may communicate with some or all elements of storage operation cell 1550 including client computers 1585, data agents 1595, media agents 1505, and storage devices 1515, to initiate and manage system backups, migrations, and data recovery.

Storage manager 1501 may include a jobs agent 1520 that monitors the status of some or all storage operations previously performed, currently being performed, or scheduled to be performed by storage operation cell 1550. Jobs agent 1520 may be communicatively coupled with an interface agent 1525 (typically a software module or application). Interface agent 1525 may include information processing and display software, such as a graphical user interface ("GUI"), an application program interface ("API"), or other interactive interface through which users and system processes can retrieve information about the status of storage operations. Through interface 1525, users may optionally issue instructions to various storage operation cells 1550 regarding performance of the storage operations as described and contemplated by the present disclosure. For example, a user may modify a schedule concerning the number of pending snapshot copies or other types of copies scheduled as needed to suit particular needs or requirements. As another example, a user may employ the GUI to view the status of pending storage operations in some or all of the storage operation cells in a given network or to monitor the status of certain components in a particular storage operation cell (e.g., the amount of storage capacity left in a particular storage device).

Storage manager 1501 may also include a management agent 1530 that is typically implemented as a software module or application program. In general, management agent 1530 provides an interface that allows various management components 1501 in other storage operation cells 1550 to communicate with one another. For example, assume a certain network configuration includes multiple cells 1550 adjacent to one another or otherwise logically related in a WAN or LAN configuration (not shown). With this arrangement, each cell 1550 may be connected to the other through each respective interface agent 1525. This allows each cell 1550 to send and receive certain pertinent information from other cells 1550 including status information, routing information, information regarding capacity and utilization, or the like. These communication paths may also be used to convey information and instructions regarding storage operations.

For example, a management agent in a first storage operation cell may communicate with a management agent in a second storage operation cell regarding the status of storage operations in the second storage operation cell. Another illustrative example includes the case where a management agent in first storage operation cell communicates with a management agent 150 in a second storage operation cell to control the storage manager 1501 (and other components) of the second storage operation cell via the management agent 1530 contained in the storage manager 1501.

Another illustrative example is the case where management agent 1530 in the first storage operation cell 1550 communicates directly with and controls the components in the second storage management cell 1550 and bypasses the storage manager 1501 in the second storage management cell. If desired, storage operation cells 1550 can also be organized hierarchically such that hierarchically superior cells control or pass information to hierarchically subordinate cells or vice versa.

Storage manager 1501 may also maintain an index, a database, or other data structure 1511. The data stored in database 1511 may be used to indicate logical associations between components of the system, user preferences, management tasks, media containerization and data storage information or other useful data. For example, the storage manager 1501 may use data from database 1511 to track logical associations between media agent 1505 and storage devices 1515 (or movement of data as containerized from primary to secondary storage).

Generally speaking, a media agent, which may also be referred to as a secondary storage computing device 1505, may be implemented as software module that conveys data, as directed by storage manager 1501, between a client computer 1585 and one or more storage devices 1515 such as a tape library, a magnetic media storage device, an optical media storage device, or any other suitable storage device. In one embodiment, secondary computing device 1505 may be communicatively coupled with and control a storage device 1515. A secondary computing device 1505 may be considered to be associated with a particular storage device 1515 if that secondary computing device 1505 is capable of routing and storing data to particular storage device 1515.

In operation, a secondary computing device 1505 associated with a particular storage device 1515 may instruct the storage device to use a robotic arm or other retrieval means to load or eject a certain storage media, and to subsequently archive, migrate, or restore data to or from that media. Secondary computing device 1505 may communicate with a storage device 1515 via a suitable communications path such as a SCSI or fiber channel communications link. In some embodiments, the storage device 1515 may be communicatively coupled to a data agent 105 via a storage area network ("SAN").

Each secondary storage computing device 1505 may maintain a index, a database, or other data structure 1506 which may store index data generated during backup, migration, and restore and other storage operations as described herein. For example, performing storage operations on Microsoft Exchange data may generate index data. Such index data provides a secondary computing device 1505 or other external device with a fast and efficient mechanism for locating data stored or backed up. Thus, in some embodiments, a secondary storage computing device index 1506, or a storage manager database 1511, may store data associating a client 1585 with a particular secondary computing device 1505 or storage device 1515, for example, as specified in a storage policy, while a database or other data structure in secondary computing device 1505 may indicate where specifically the client 1585 data is stored in storage device 1515, what specific files were stored, and other information associated with storage of client 1585 data. In some embodiments, such index data may be stored along with the data backed up in a storage device 1515, with an additional copy of the index data written to index cache in a secondary storage device. Thus the data is readily available for use in storage operations and other activities without having to be first retrieved from the storage device 1515.

Generally speaking, information stored in cache is typically recent information that reflects certain particulars about operations that have recently occurred. After a certain period of time, this information is sent to secondary storage and tracked. This information may need to be retrieved and uploaded back into a cache or other memory in a secondary computing device before data can be retrieved from storage device 1515. In some embodiments, the cached information may include information regarding format or containerization of archive or other files stored on storage device 1515.

In some embodiments, certain components may reside and execute on the same computer. For example, in some embodiments, a client computer 1585, such as a data agent 1595 or a storage manager 1501, coordinates and directs local archiving, migration, and retrieval application functions as further described in U.S. patent application Ser. No. 09/610,738. This client computer 1585 can function independently or together with other similar client computers 1585.

Moreover, as shown in FIG. 15, clients 1585 and secondary computing devices 1505 may each have associated indices and metabases (1525 and 1560, respectively). However, in some embodiments each "tier" of storage, such as primary storage, secondary storage, tertiary storage, or the like, may have multiple or a centralized metabase, as described herein. For example, in FIG. 15, rather than a separate metabase 1525 associated with each client 1585, the metabases on this storage tier may be centralized as discussed further herein. Similarly, second and other tiers of storage may have either centralized or distributed metabases. Moreover, mixed architectures systems may be used if desired, that may include a first tier centralized metabase system coupled to with a second tier storage system having distributed metabases and vice versa.

Moreover, in operation, a storage manager 1501 or other management module may keep track of certain information that allows the storage manager to select, designated or otherwise identify metabases to be searched in response to certain queries as further described herein. Movement of data between primary and secondary storage may also involvement movement of associated metadata and other tracking information as further described herein.

Figure 15A:
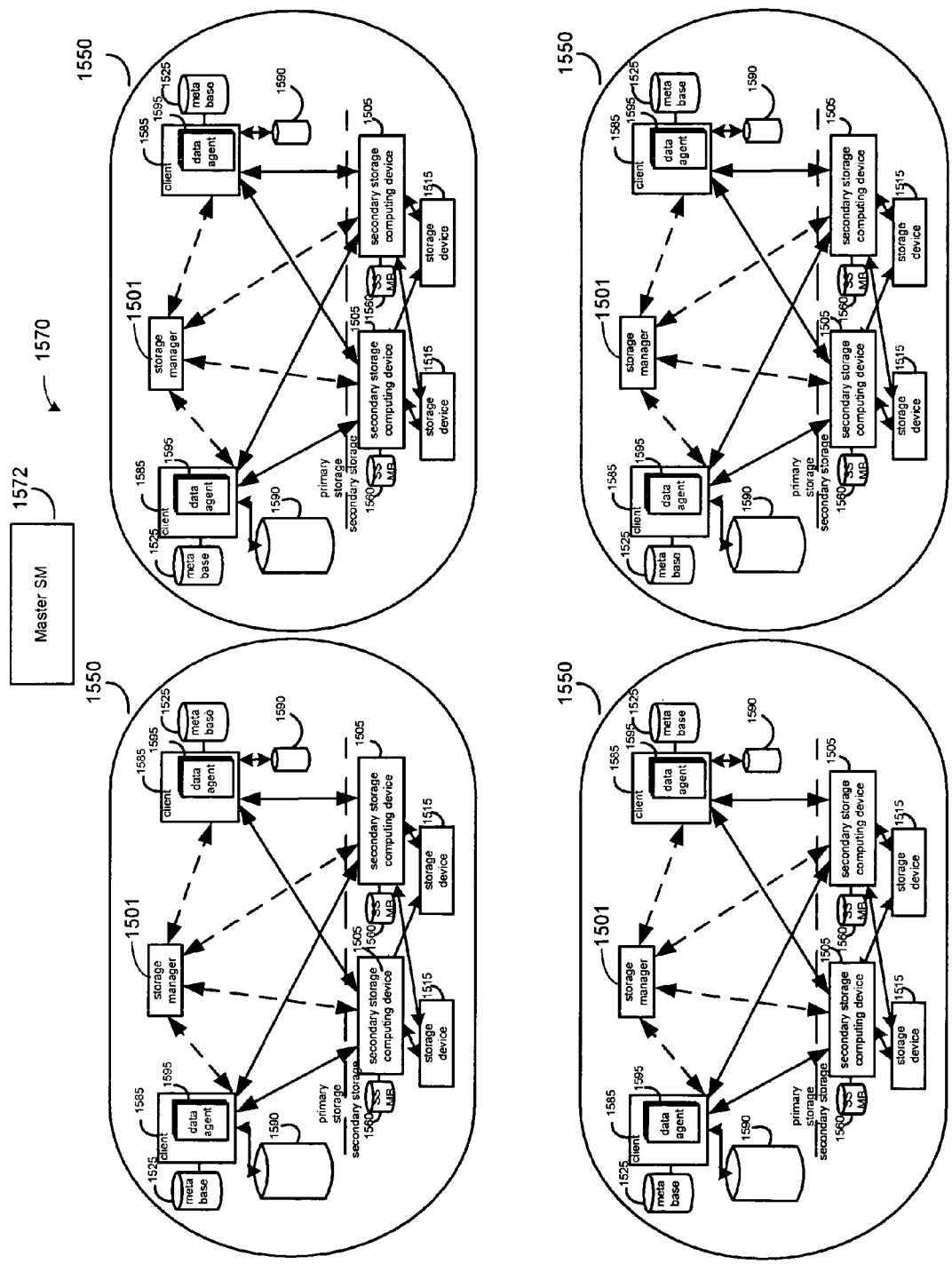
FIG. 15A illustrates a block diagram of an exemplary embodiment of a network system.

FIG. 15A shows an example configuration of a computing network 1570, where a plurality of storage operation cells 1550 can be managed by a master storage manager 1572. In one embodiment, each of the storage operation cells 1550 can be configured and operate in a manner similar to that described above in reference to FIG. 15. In one embodiment, the master storage manager 1572 can be configured to provide management of inter-cell operations involving data management. In one embodiment, the inter-cell operations can involve at least some functionalities that are similar to those associated with the storage managers 1501 and one or more metabases described above in reference to FIG. 15.

Figure 15B:
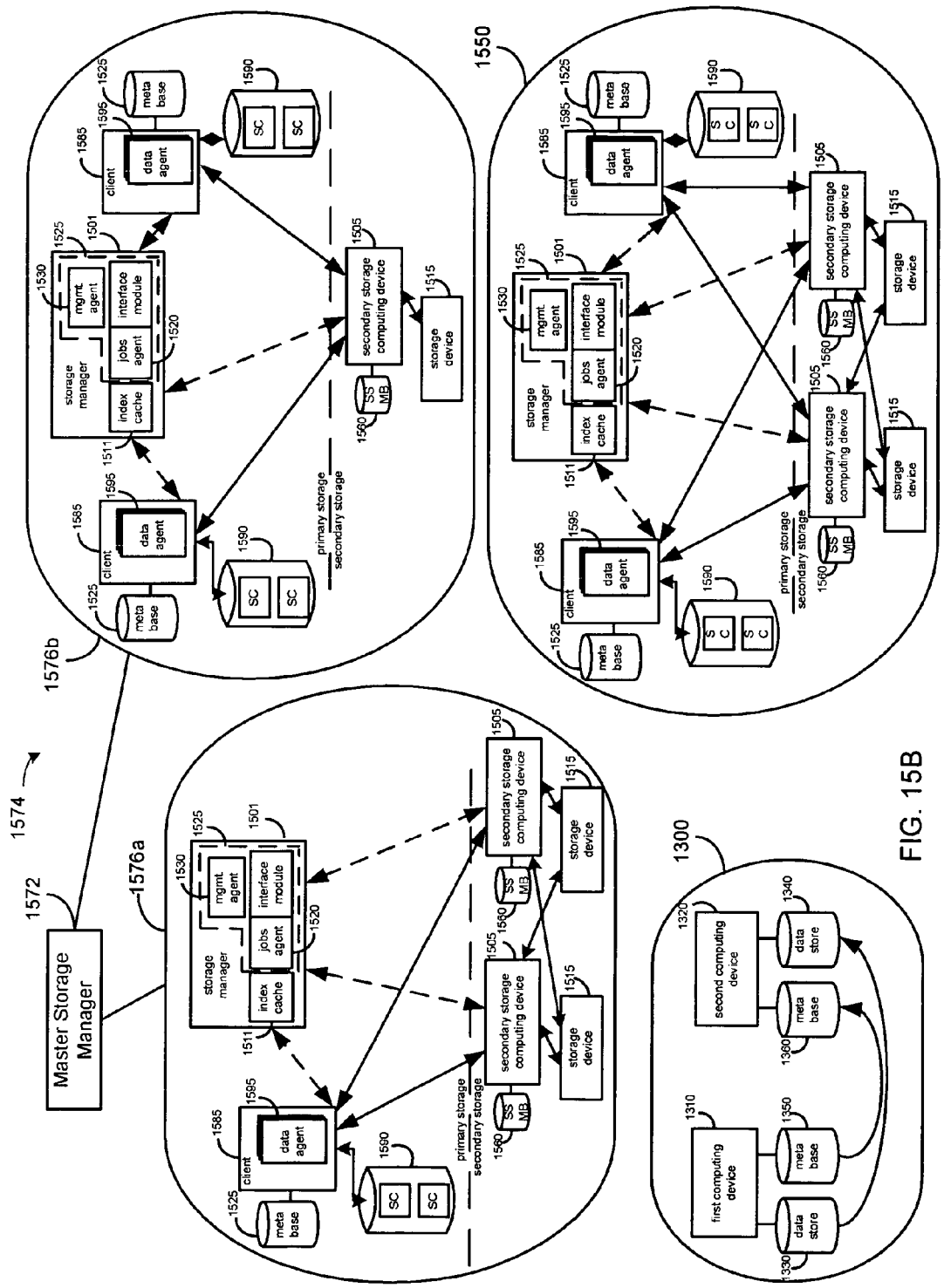
FIG. 15B illustrates a block diagram of another exemplary embodiment of a network system.

FIG. 15B shows another example configuration of a computing network 1574, where a master storage manager 1572 can manage one or more storage operation cells 1501 and 1576. The example storage operation cells 1576a and 1576b are depicted as being variations of the storage operation cell 1501 described above in reference to FIG. 15. For example, the storage operation cell 1576a is depicted as not having the second client 1585 and its associated metabase 1525 and storage device 1590 (see FIG. 15). In another example, the storage operation cell 1576b is depicted as not having the second secondary storage computing device 1505 and its associated metabase 1560 and storage device 1515 (see FIG. 15). Other configurations are possible.

FIG. 15B further shows that the master storage manager 1572 can also be configured to provide an inter-system management involving a system 1300 having a plurality of computing devices 1310. The system 1300 can be similar to that described above in reference to FIG. 13. In one embodiment, the inter-system operations can involve at least some functionalities that are similar to those associated with the storage managers 1501 and one or more metabases described above in reference to FIG. 15, and/or various functionalities described above in reference to FIG. 13.

Figure 16:
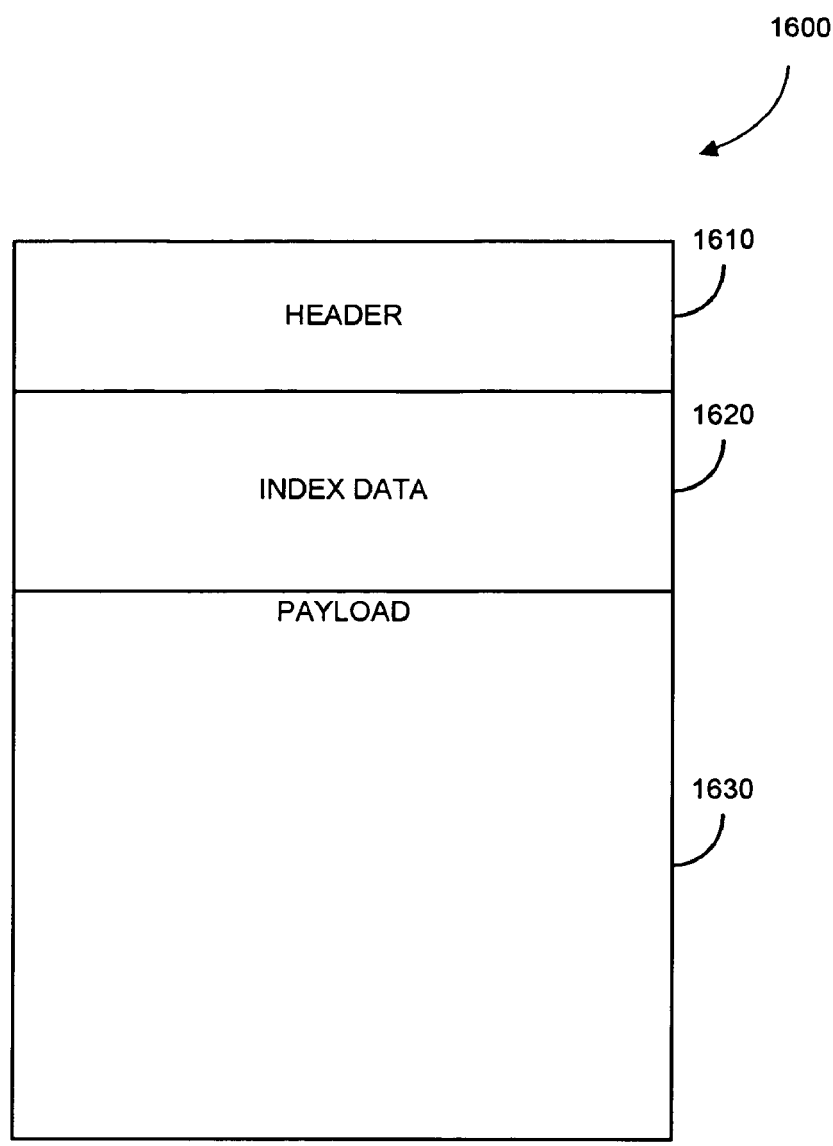
FIG. 16 illustrates an exemplary embodiment of a data structure for an archive file.

FIG. 16 is a diagram illustrating one arrangement of data that may be used in constructing an archive file according to one embodiment of the present disclosure. As shown, archive file 1600 may include a header section 1610, an index section 1620 and a payload section 1630. Such an archive file may be constructed by a data agent at a client computing device when migrating data, for example, from primary to secondary storage, primary storage to other primary storage, or the like. The payload section 1610 may include the data objects that are to be moved from a first location to a second location within the system (e.g., primary to secondary storage). These data objects may be identified by a data agent and designated to be moved pursuant to a storage preference such as a storage policy, a user preference, or the like. In certain embodiments, header 1610 may include routing and path information that identifies the origin and destination of the payload data and may include other information such as a list of files copied, checksums, combinations of the same or the like. In certain embodiments, index section 1620 may include certain other information regarding the payload data objects such as size, file type, and any offset or other logical indexing information that may been tracked by a storage management component or other component previously managing the data objects in the payload.

In some embodiments, storage managers may index information regarding archive files and related payload by time and storage on certain media so the archive files can be quickly located and/or retrieved. For example, it may be desired to identify certain data based on a query. The query may be analyzed and a certain time frame of interest may be identified. The system may use this information as a basis for a query search of certain index information (e.g., only search for records concerning operations that occurred during a specific time). In certain embodiments, this streamlines the search and retrieval process by narrowing the universe of data needs to be searched to locate responsive information.

Figure 17:
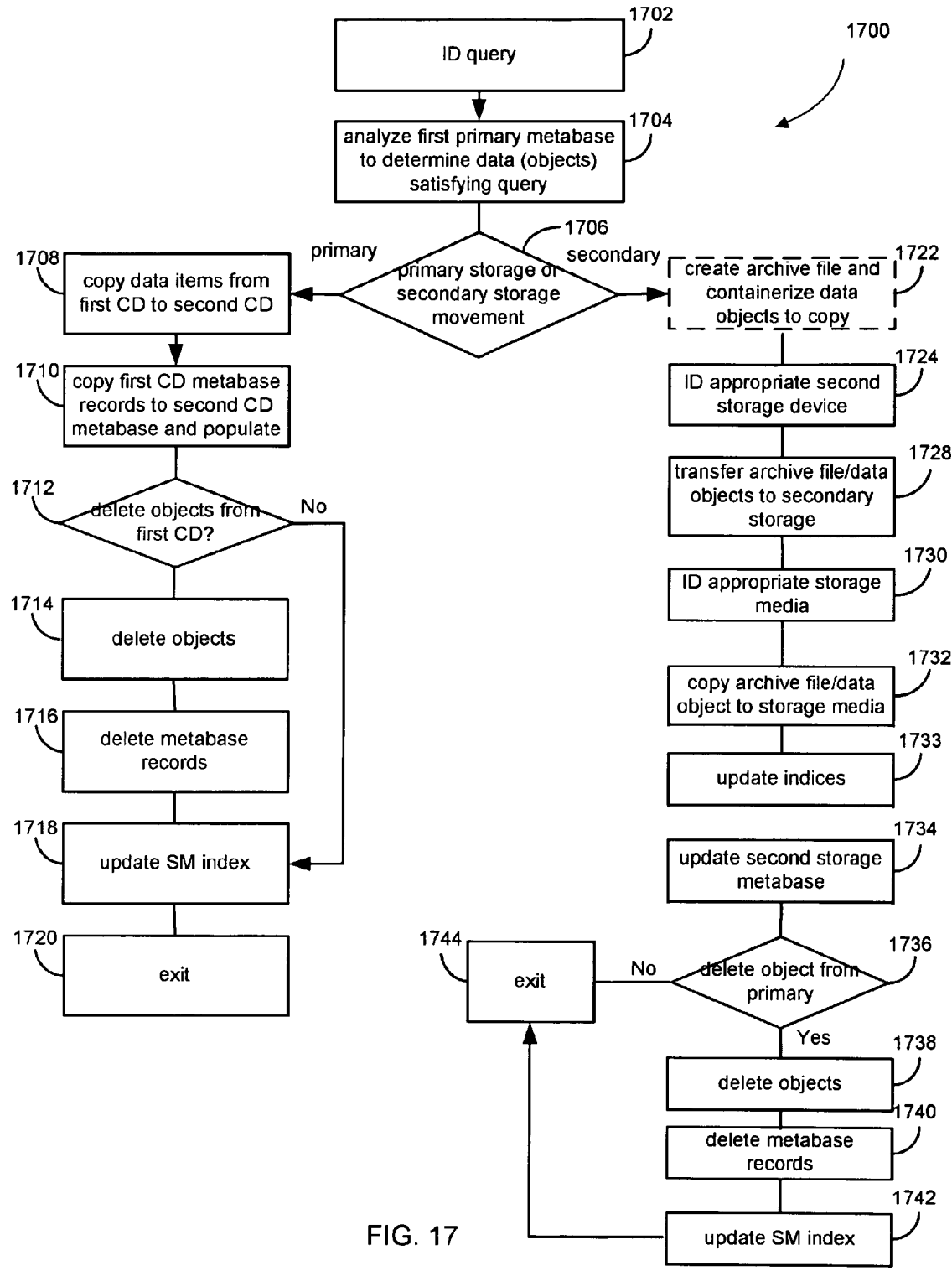
FIG. 17 illustrates a flow chart of a data transfer process, in accordance with embodiments of the present disclosure.

FIG. 17 presents a flow chart 1700 that illustrates some of the blocks that may be performed in moving data from primary storage to other storage devices within the system. First, at block 1702, a query seeking certain data may be identified. The query may include aspects of data such as a schedule policy, storage policy, storage preference or other preference. The query may be analyzed and a primary metabase searched to identify data objects that satisfy the query (block 1704). This may include parsing the query into constituent parts and analyzing each part alone or in combination with other portions as part of the evaluation process. At block 1706, it may be determined, whether data objects satisfying the query are to be copied to other primary storage devices, to secondary storage devices or both (pursuant to a storage policy or the like).

If at least some data objects satisfying the search criteria are to be copied to other primary storage devices, those data objects may be identified as further described herein and the target primary storage device(s) identified. This may involve consulting a storage policy or storage manager to determine the destination point. In some embodiments, destination maybe determined dynamically, such that it is selected based on certain system preferences or optimization routines that select a storage device based on storage capacity, availability, data paths to the destination, combinations of the same or the like.

At block 1708 the identified data objects may be copied from primary storage of a first computing device (the source) to primary storage of a second computing device (the target or destination). Any metadata associated with the first computing device describing the copied data may also be copied to a metabase associated with the second computing device such that this description information is not abandoned or lost, but rather travels with the copied data for subsequent use (block 1710).

Next, at block 1712, it may be determined whether the copied data objects and associated metadata are to be deleted from the source computing device. For example, this may be done in order to free storage space on the source computer or in accordance with certain data aging or migration criteria. If it is decided to delete the data objects (and associated metadata) the memory locations which include the data may be erased or designated for overwrite (block 1714 and 1716).

In some embodiments the data objects may be deleted but certain metadata may be retained. If it is decided not delete the data objects, the data is retained and an index in an associated storage manager may be updated (block 1718), for example by updating an index to reflect a new location, data object status, any changes, combinations of the same or the like, and return to block 1702. In other embodiments, if data is deleted from the system, for example, a user permanently deletes certain data from an application, that associated data may also be deleted from both primary and secondary storage devices and associated metabases to free storage space within the system.

Returning to block 1706, it is also determined whether certain data objects currently stored in primary storage are to be migrated to one or more secondary storage devices. If so, an archive file similar to the one described in FIG. 16 or other data structure suitable for transport may be constructed or created by the source computing device with identified data objects placed in the payload section and header and index information added (block 1722). Data may be moved from primary to secondary storage in predefined chunks which are constructed from such archive files, for example, using a data pipe, such as the data pipe described in U.S. Pat. No. 6,418, 478, entitled "Pipelined High Speed Data Transfer Mechanism."

Next, at block 1724 one or more target secondary storage devices may be identified. This may involve consulting a storage policy or storage manager to determine the destination point. In some embodiments, destination maybe determined dynamically, such that it is selected based on certain system preferences or optimization routines that select a storage device based on storage capacity, availability, data paths to the destination, or the like. Once the secondary storage device(s) are identified, the archive files may be routed to a media agent, storage manager, or other system component, that supervises the transfer to the target secondary storage device (blocks 1724 and 1728). This may involve selecting and appropriate data transfer route and ensuring the proper resources and are available (e.g., bandwidth) such that the data may be copied with a certain period of time. Supervision may further include parsing a copy operation into several portions with each portion being transferred by certain media agent or other resources, to meet system or transfer requirements (e.g., a time window).

Next, the appropriate media within the target storage device may be identified (block 1730) and the archive files may be transferred from the media management device to the secondary storage device (block 1732). Such media may be selected from available media already associated with a similar data transfer or may be selected and reserved from an available media pool or scratch pool within the storage device. During or after the transfer, a media agent index or storage manager index associated with the secondary storage device may be updated to reflect the transfer (block 1733). This may include copying the appropriate management files to the media management index such as offset, media ID file name or other management information.

At block 1734, any metadata stored in a first metabase associated with the transferred data objects may also be transferred and used to update a second metabase associated with the target secondary storage device. Such metadata may be copied from the first metabase to the second metabase using network transmission resources. In some embodiments, the metadata in the first metabase may be deleted after it is confirmed the metadata has been copied to the second metabase. In other embodiments, the metadata may remain in both first and second metabases.

At block 1736, it may be determined whether the data objects transferred from the primary storage device are to be deleted. If so, the data objects and associated metadata in a first metabase may be erased or otherwise designated for overwrite (blocks 1738 and 1740). In some cases, a pointer or other reference such as a file stub may be left in the original data location. In one embodiment, SM index is updated in block 1742.

Figure 18:
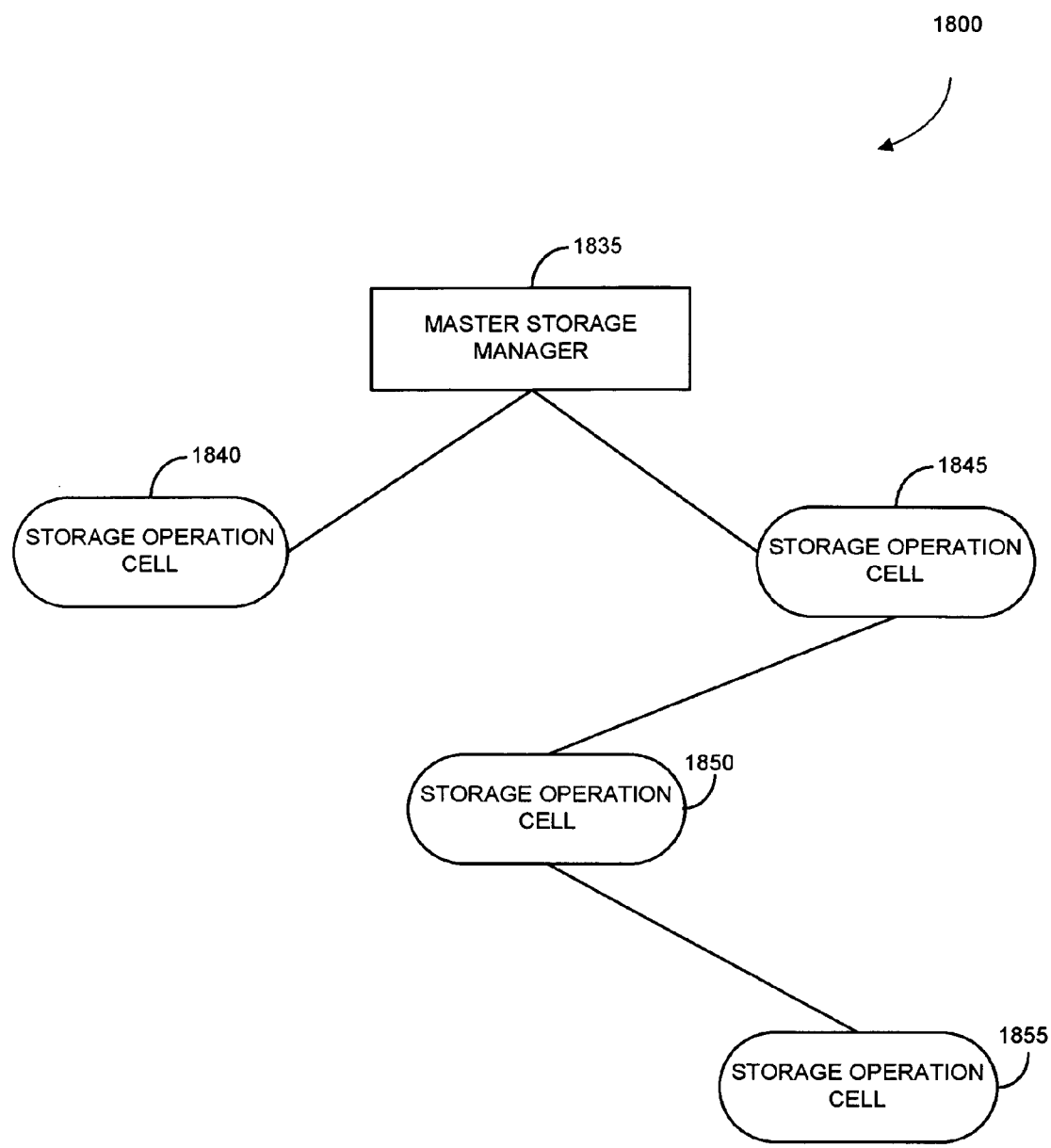
FIG. 18 illustrates an exemplary embodiment of a storage operation cell hierarchy, in accordance with embodiments of the present disclosure.

FIG. 18 presents a generalized block diagram of a hierarchically organized group of storage operation cells in a system to perform storage operations on electronic data in a computer network in accordance with an embodiment of the present disclosure. It will be understood that although the storage operation cells generally depicted in FIG. 18 have different reference numbers than the storage operation cell 1550 shown in FIG. 15, these cells may be configured the same as or similar to the storage cell 1550 as depicted in FIG. 15.

As shown, the system illustrated in FIG. 18 may include a master storage manager component 1835 and various other storage operations cells. As shown, the illustrative embodiment in FIG. 18 includes a first storage operation cell 1840, a second storage operation cell 1845, a third storage operation cell 1850, a fourth storage operation cell 1855, and may be extended to include nth storage operation cell, if desired (not shown). However, it will be understood this illustration is only exemplary and that fewer or more storage operation cells may be present or interconnected differently if desired.

Storage operation cells, such as the ones shown in FIG. 18 may be communicatively coupled and hierarchically organized. For example, a master storage manager 1835 may be associated with, communicate with, and direct storage operations for a first storage operation cell 1840, a second storage operation cell 1845, a third storage operation cell 1850, and fourth storage operation cell 1855. In some embodiments, the master storage manager 1835 may not be part of any particular storage operation cell. In other embodiments (not shown), master storage manager 1835 may itself be part of a certain storage operation cell. This logical organization provides a framework in which data objects, metadata and other management data may be hierarchically organized and associated with appropriate devices components (e.g., storage devices).

The storage operation cells may be configured in any suitable fashion, including those which involve distributed or centralized metabases. For example, storage operation cell 1840 may include a centralized primary storage metabase and a centralized secondary storage metabase, storage operation cell 1845 may include a centralized primary storage metabase and multiple secondary storage metabases, storage operation cell 1850 may include multiple primary storage metabases and a centralized secondary storage metabase, and storage operation cell 1855 may include multiple primary storage metabases and multiple secondary storage metabases (not shown). However, it will be understood that this is merely illustrative, and any other suitable configuration may be used if desired.

Thus, in operation, master storage manager 1835 may communicate with a management agent of the storage manager of the first storage operation cell 1840 (or directly with the other components of first cell 1840) with respect to storage operations performed in the first storage operation cell 1840. For example, in some embodiments, master storage manager 1835 may instruct the first storage operation cell 1840 with certain commands regarding a desired storage operation such as how and when to perform particular storage operations including the type of operation and the data on which to perform the operation.

Moreover, metabases associated with each storage operation cell may contain information relating to data and storage operations as described herein. In some embodiments, master storage manager 1835 may include a master metabase index or database (not shown) that reflects some or all of the metadata information from the hierarchically subordinate storage operation cells within the system. This allows the system to consult the master storage index or database for information relating to data within those storage operation cells rather than requiring each cell be contacted of polled directly for such information.

In other embodiments, master storage manager 1835 may track the status of its associated storage operation cells, such as the status of jobs, system components, system resources, and other items, by communicating with manager agents (or other components) in the respective storage operation cells. Moreover, master storage manager 1835 may track the status of its associated storage operation cells by receiving periodic status updates from the manager agents (or other components) in the respective cells regarding jobs, system components, system resources, and other items. For example, master storage manager 1835 may use methods to monitor network resources such as mapping network pathways and topologies to, among other things, physically monitor storage operations and suggest, for example, alternate routes for storing data as further described herein.

In some embodiments, master storage manager 1835 may store status information and other information regarding its associated storage operation cells and other system information in an index cache, database or other data structure accessible to manager 1835. A presentation interface included in certain embodiments of master storage manager 1835 may access this information and present it to users and system processes with information regarding the status of storage operations, storage operation cells, system components, and other information of the system.

In some embodiments, master storage manager 1835 may store and/or track metadata and other information regarding its associated storage operation cells and other system information in an index cache, database or other data structure accessible to manager 1835. Thus, during a search procedure as further described herein, queries can be directed to a specific storage operation cell or cells based on the cell's function, past involvement, routing or other information maintained within the storage manager or other management component.

As mentioned above, storage operation cells may be organized hierarchically. With this configuration, storage operation cells may inherit properties from hierarchically superior storage operation cells or be controlled by other storage operation cells in the hierarchy (automatically or otherwise). Thus, in the embodiment shown in FIG. 18, storage operation cell 1845 may control or is otherwise hierarchically superior to storage operation cells 1850 and 1855. Similarly, storage operation cell 1850 may control storage operation cells 1855. Alternatively, in some embodiments, storage operation cells may inherit or otherwise be associated with storage policies, storage preferences, storage metrics, or other properties or characteristics according to their relative position in a hierarchy of storage operation cells.

Storage operation cells may also be organized hierarchically according to function, geography, architectural considerations, or other factors useful or desirable in performing storage operations. For example, in one embodiment, storage operation cell 1840 may be directed to create snapshot copies of primary copy data, storage operation cell 1845 may be directed to create backup copies of primary copy data or other data. Storage operation cell 1840 may represent a geographic segment of an enterprise, such as a Chicago office, and storage operation cell 1845 may represents a different geographic segment, such as a New York office. In this example, the second storage operation cells 1845, 1850 and 1855 may represent departments within the New York office. Alternatively, these storage operation cells could be further divided by function performing various types of copies for the New York office or load balancing storage operations for the New York office.

As another example, and as previously described herein, different storage operation cells directed to different functions may also contain the same or a subset of the same set of physical devices. Thus, one storage operation cell in accordance with the principles of the present disclosure may be configured to perform SRM operations and may contain the same, similar or a subset of the same physical devices as a cell configured to perform HSM or other types of storage operations. Each storage operation cell may, however, share the same parent or, alternatively, may be located on different branches of a storage operation cell hierarchy tree. For example, storage operation cell 1845 may be directed to SRM operations whereas storage operation cell 1855 may be directed to HSM operations. Those skilled in the art will recognize that a wide variety of such combinations and arrangements of storage operation cells are possible to address a broad range of different aspects of performing storage operations in a hierarchy of storage operation cells.

In some embodiments, hierarchical organization of storage operation cells facilitates, among other things, system security and other considerations. For example, in some embodiments, only authorized users may be allowed to access or control certain storage operation cells. For example, a network administrator for an enterprise may have access to many or all storage operation cells including master storage manager 1835. But a network administrator for only the New York office, according to a previous example, may only have access to storage operation cells 1845-1855, which form the New York office storage management system.

Moreover, queries performed by the system may be subject to similar restrictions. For example, depending on access privileges, users may be limited or otherwise excluded from searching a certain cell or cells. For example, a user may be limited to searching information in cells or metabases within the system that are unrestricted or to those which specific access rights have been granted. For example, certain users may not have privileges to all information within the system. Accordingly, in some embodiments, as a default setting, users may have access privileges to information in cells that they interact with. Thus, confidential and sensitive information may be selectively restricted except only to certain users with express privileges (e.g., financial or legal information). For example, certain classification information within the metabases in the system may be restricted and therefore accessed only by those with the proper privileges.

Other restrictions on search criteria may include the scope of the search. For example, in a large network with many storage cells may require dedicating significant amounts of resources to perform go global or comprehensive searches. Thus, if a certain resource threshold is exceeded by a proposed search, the system may prompt that search to be modified or otherwise cancelled.

In other embodiments master storage manager 1835 may alert a user such as a system administrator when a particular resource is unavailable or congested. For example, a particular storage device might be full or require additional media. For example, a master storage manager may use information from an HSM storage operation cell and an SRM storage operation cell to present indicia or otherwise alert a user or otherwise identify aspects of storage associated with the storage management system and hierarchy of storage operation cells.

Alternatively, a storage manager in a particular storage operation cell may be unavailable due to hardware failure, software problems, or other reasons. In some embodiments, master storage manager 1835 (or another storage manager within the hierarchy of storage operation cells) may utilize the global data regarding its associated storage operation cells to suggest solutions to such problems when they occur (or act as a warning prior to occurrence). For example, master storage manager 1835 may alert the user that a storage device in a particular storage operation cell is full or otherwise congested, and then suggest, based on job and data storage information contained in its database, or associated metabase, or an alternate storage device. Other types of corrective actions based an such information may include suggesting an alternate data path to a particular storage device, or dividing data to be stored among various available storage devices as a load balancing measure or to otherwise optimize storage or retrieval time. In some embodiments, such suggestions or corrective actions may be performed automatically, if desired. This may include automatically monitoring the relative health or status of various storage operation cells and searching for information within the cells of the system relating to systems or resource performance within that cell (e.g., index, metabase, database, or the like) for use in diagnostics or for suggesting corrective action.

In certain embodiments, HSM and SRM components may be aware of each other due to a common database or metabase of information that may include normalized data from a plurality of cells. Therefore, in those embodiments there is no need for such information to pass through a master storage manager as these components may be able to communicate directly with one another. For example, storage operation cell 1845 may communicate directly with storage operation cell 1855 and vice versa. This may be accomplished through a direct communications link between the two or by passing data through intermediate cells.

Moreover, in some embodiments searches may be performed across a numerous storage cells within the hierarchy. For example, a query may be posed to master storage manager 1835 that may pass the query down through the hierarchy from cells 1840 to 1845 to 1850 and 1855. This may be accomplished by passing the query form one manager component of each cell to another, or from one data classification agent to another, one metabase to another. The results may be passed upward through the hierarchy and compiled with other results such that master storage manager 1835 has a complete set of results to report. In other embodiments, each storage manager cell may report results directly to the requester or to a designated location.

Figure 19:
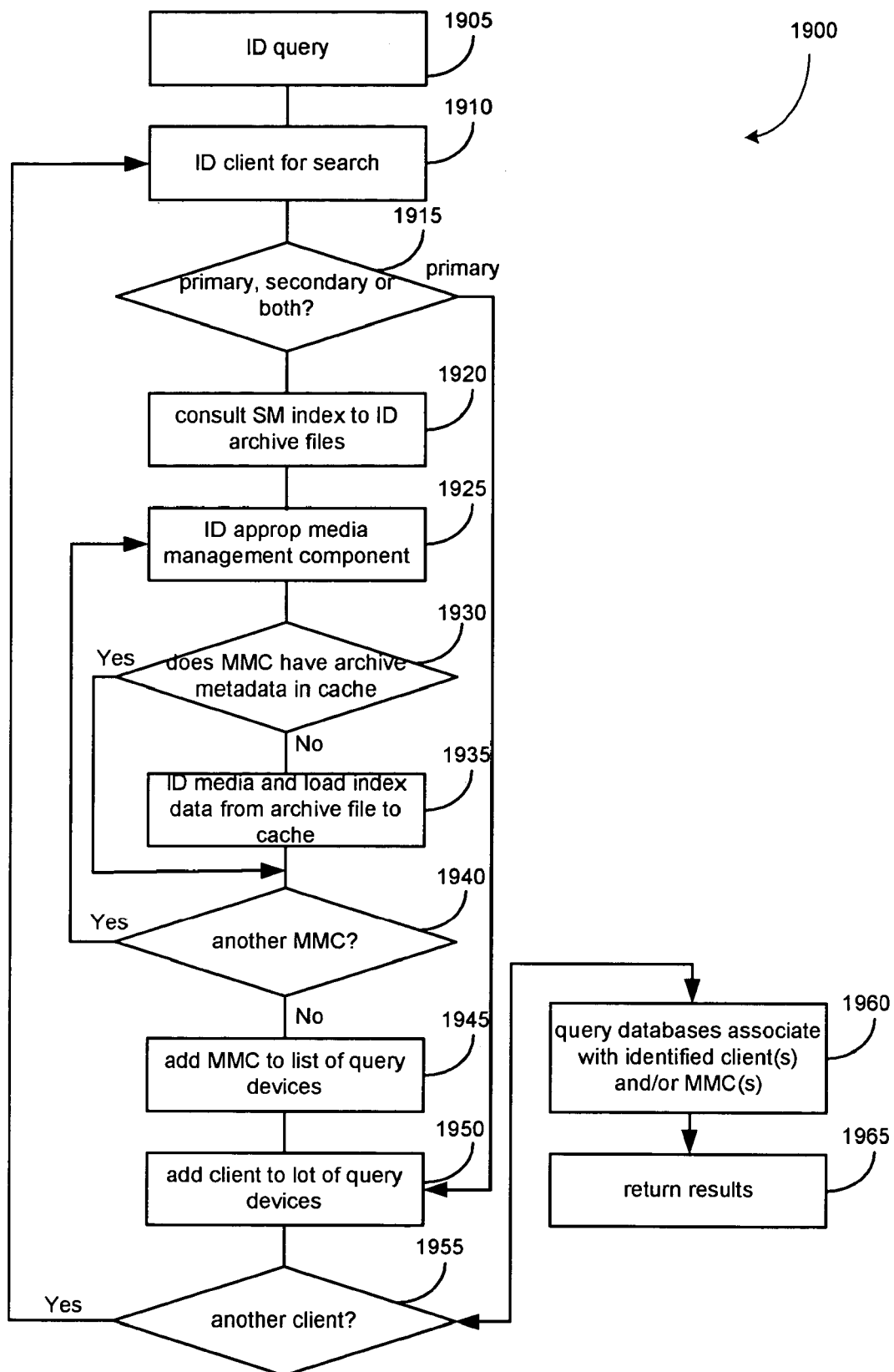
FIG. 19 illustrates a flow chart of a search process usable across multiple primary and/or secondary storage devices, in accordance with embodiments of the present disclosure.

FIG. 19 presents a flow chart 1900 that illustrates some of the blocks that may be involved in performing searches for data objects across systems that include multiple primary and secondary storage devices, according to certain embodiments of the present disclosure. First, at block 1905, a query seeking certain data may be identified (e.g., from a storage policy, user preference, other process, or the like). The query may be analyzed to identify system components, such as clients potentially having information such as certain data objects or metadata that may satisfy the query (e.g., by excluding certain clients that are unlikely to have data being sought based on certain query parameters such as location, time frame, client or other component, department, application type, or any other criteria used to classify data as described herein, combinations of the same or the like (block 1910)). Results may be presented based on a confidence factor indicating the likelihood that the results meet the specified parameters. For example, results substantially satisfying most or all criteria may be listed first with the confidence factors provided based on a percentage of the criteria satisfied (e.g., a query that returned results having three out of four criteria satisfied may be represented with a 75% confidence factor or the like). Less relevant results may be listed subsequently with the confidence factor provided based on any suitable relevant factor such as number of parameters satisfied, how close the match is, combinations of the same or the like.

The search process may further involve consulting one or more indexes associated with the clients to identify where responsive data objects or other copies of client data, may be located within the system. At block 1915, it may be determined whether client data objects satisfying the query are located in primary storage, secondary storage, or both (e.g., based on index information in a storage manager). This may be based on polling various storage manager or a master storage manager that includes information the covers or represents whole system or the portion of system specified for search.

If it is determined that responsive data objects are only located on client(s) in primary storage, that client may be added to the list of clients to be searched (block 1950). If it is determined that responsive data objects are located in secondary storage devices (or other primary storage locations that may be identified), the system may consult a storage manager index to identify archive files (or other files) based on certain query parameters such as a specified point in time, origination point, or the like, or on index data stored in a storage manager index identifying archive files or other file associated with the data objects.

Next at block 1920, storage managers may be consulted to identify responsive archive files. At block 1925, media management components that may have handled responsive data objects are be identified. This may be based on information retrieved from the storage manager index regarding archive files, e.g., an association of archive files with media agents and media items. It may then be determined whether the identified media management components ("MMCs") have metadata relating to the identified archive files available readily available in an index cache (block 1930).

This may be accomplished by searching for reference information relating to the identified archive files. If such information is already present in the cache, responsive data objects may be identified and retrieved using the index cache information, which may include, offsets and any file identifiers or the like, by the media management component, and the system may proceed to block 1940 (determine whether another media management component needs to be analyzed).

If not, the index information may need to be loaded from the secondary storage device so archive files may be retrieved and accessed. This may involve identifying the particular media on which the index data is stored and upload it to the media management component cache (block 1935). In some embodiments, a master storage manager or other component with information relating to files may be consulted to identify media containing the responsive information. These media may be mounted in drive or other input/output device and examined to locate the proper files or data structures. Index information may then be located and uploaded to an index or database associated with the appropriate media management component (e.g., media agent). This allows the media management component to locate and retrieve specific data objects on the media that satisfy the search criteria.

Next, if no further media management components have been identified, a list of media management components to be searched may be compiled (block 1945). At block 1950, a list of clients identified as potentially having responsive data objects may also be compiled. After a complete list of secondary storages devices and clients potentially having responsive data objects is identified (via block 1955), the associated metabases are queried for these components, in block 1960, and results are returned indicating data objects that may satisfy the search criteria, in block 1965. In some embodiments, these results may be reviewed and analyzed to ensure relevance, with only reasonably relevant or responsive data objects actually being retrieved.

Figure 20:
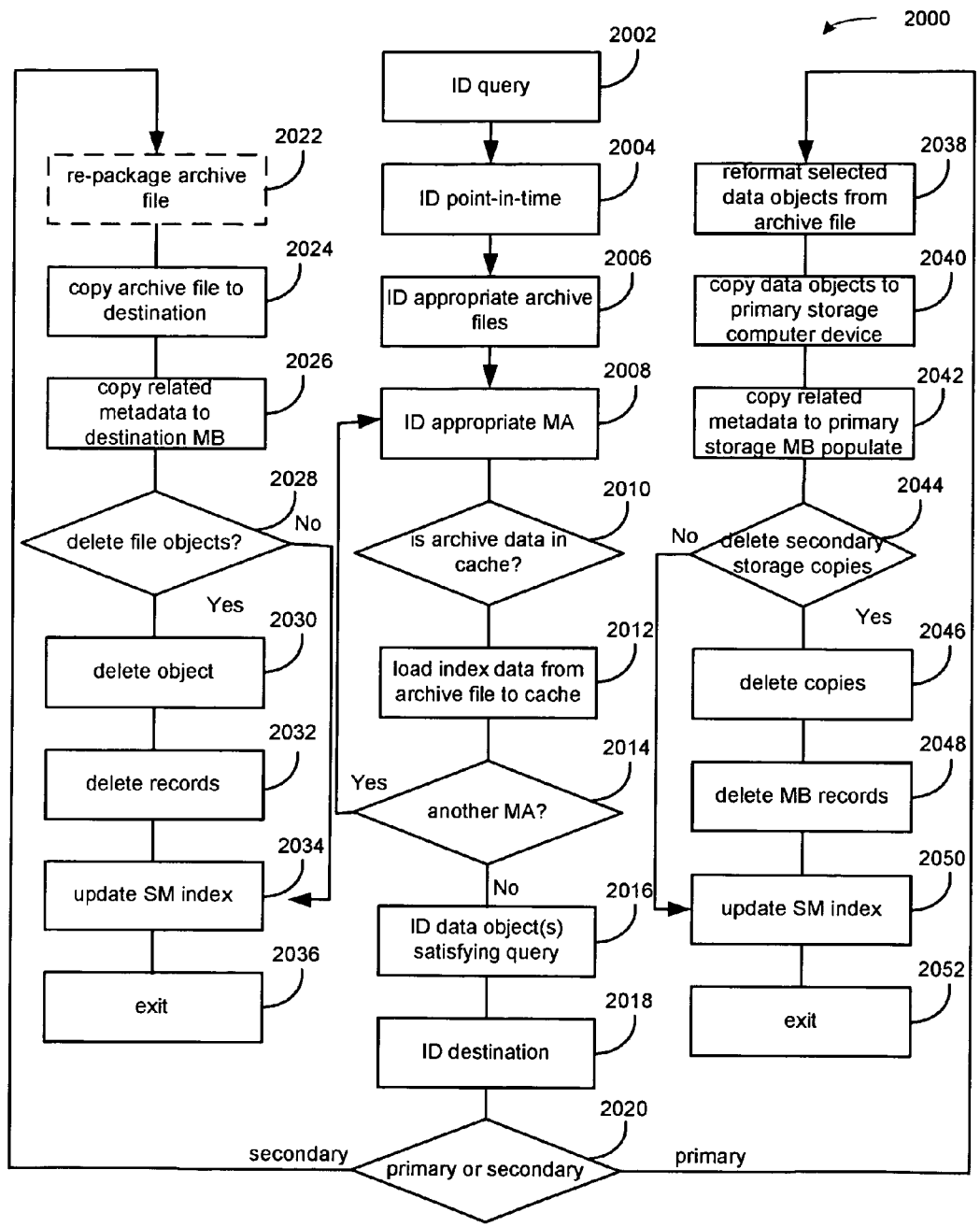
FIG. 20 illustrates a flow chart of a data retrieval process, in accordance with embodiments of the present disclosure.

FIG. 20 presents a flow chart 2000 that illustrates some of the blocks that may be involved in retrieving data objects from secondary storage (or other tiers or other storage locations) in accordance with principles of the present disclosure. This may be accomplished generally as follows. Certain data (e.g. data objects or associated metadata) from the system may need to be retrieved. That data may be requested and communicated to the system in the form of a query. The query may be used to search the system and identify media on which responsive data may be located. Once located, data satisfying the selection criteria may be uploaded and retrieved and analyzed for relevance, or other action may be taken. Or, alternatively, the identified data may be moved to other tiers of storage. More specific blocks involved in this process may be as follows.

First, at block 2002, a query seeking certain data may be identified. The query may be analyzed to ascertain certain additional information that may assist in identifying responsive information such as identifying a certain point in time to search (block 2004). This may involve consulting storage manager and/or media agent index or database for responsive information relating to a certain point in time. This may also involve consulting certain metabases for similar information that may be associated with these or other media management components providing copy and management functions. Point in time information may be specified by the user or may be assigned by the system absent a specific time frame established by the user. For example, a user may specify a certain time range within the query (e.g., a time range, a certain date, all information related to a project since its inception, combinations of the same or the like). The system however, may assign a certain time limit based on the query (e.g., such as based on the specifics of the query (e.g., only have data relating to a certain time frame)), and may limit the search to the time frame of information present in certain metabases, master storage manager, or index within the system, and/or poll or otherwise communicate with storage devices within the system to determine the range or time frame of available data within the system and present the user with options for retrieving it (e.g., some or all within a time frame)

Next, at block 2006 certain archive files may be identified and associated media agents (block 2008) that may have been involved in transferring responsive data objects. This may be determined by consulting a master storage manager or other media management component index or metabase to determine whether the archive files have been handled by such components. Once the appropriate media agents have been identified, it may be determined whether information regarding the identified archive files is present in a cache or index associated with the media agents (block 2010). If not, the index information may need to be uploaded so the appropriate archive files may be retrieved and accessed (block 2012). This process may be performed (via block 2014) until all identified media agents have the appropriate index information loaded and/or until it is determined that no responsive information has been handled by the media agents and therefore no index information need be uploaded.

Next, at block 2016 data objects satisfying the query criteria may be identified by searching metabases and/or indexes. In some embodiments, such data objects may be compiled into a list of data objects for present or subsequent retrieval. For example, such a list of responsive data objects may be provided to the user (which may itself satisfy the query) and then provide the user with the option to actually retrieve all or certain selected identified data objects.

At block 2018, the new destination for the data objects may be determined. For example, if certain data objects are being migrated off as part of an ILM operation, the query or other information may indicate the intent or reason for the search and the data object's destination. This may be useful in determining whether certain data objects are responsive to search criteria or query. At block 2020 it may be determined whether the new destination is primary storage (a restore operation) or secondary or other tier of storage (ILM). Such information may be further useful in determining whether the data objects are likely to fall within a time frame or category of interest and thus may be useful in further identifying data objects of interest.

If the identified data objects are moving to other secondary storage tiers, the data objects may be repackaged into form suitable for secondary storage, which may include repackaging into an archive file, converting to a new format, compressing of the data objects and associated files, encryption, or any other containerization technique known in the art (block 2022).

Once the data objects are in a suitable format, they may be copied to the appropriate storage destination by the system. This may be accomplished by a media agent or media component in conjunction with a storage manager or other media management component that coordinate routing and the specifics involved with file transfer (block 2024), as further described herein. Metadata relating to the copied data objects may then be copied to a metabase associated with a computing device at the destination (block 2026).

For example, metadata relating to the data being copied may be copied along with the data to the secondary storage device and may be copied to an index in the media agent or other media management component involved in the data transfer. This allows the media management component to locate and retrieve and otherwise manage the stored data. Such metadata may also useful when performing searches of secondary storage devices (or other tiers) as further described herein. Metadata stored along with the data on the secondary storage device may be useful to restore or refresh the media agent index in the case of lost or corrupt data and also may be transferred along with the data on storage media in the case whether it is necessary to copy all such data (or actually physically relocate) to another storage device. A master storage manager index or metabase associated with destination computing device may be updated reflecting the arrival and new location of the transferred data objects and/or archive file for system management purposes (block 2034).

In some embodiments, the copied data objects and metadata may be deleted from the source location (blocks 2028-2032). For example, at block 2028, it may be determined whether the copied data objects should be deleted based user preferences, storage policy requirements or other system constraints such has diminished storage capacity. At blocks 2030 and 2032 the data objects and records may be deleted. However, a stub, pointer or other referential element may be placed at the same logical location to act as a marker for the moved data. This allows subsequent operations to quickly track down and locate the moved data at its new location.

If, however, at block 2020, it may be determined that the identified data objects are moving to primary storage, accordingly, the data objects may be reformatted (e.g., unpacked from archive file format) for copying to a computing device (block 2038). Next the unpacked data may be copied to a target computing device along with any associated metadata (blocks 2040 and 2042). For example, this may involve reading metadata and/or index information from the archive file and repopulating the metabase and/or management component indexes with this information as further described herein. For example, metadata from the archive file may be retrieved and integrated into a metabase associated with the target computing device including information relating to data management and as well as certain content and storage information as further described herein with respect to the classification process and metabase population. Thus, such archive information may be fully restored to primary storage and any associated information, such as metabase information may be searched and retrieved accordingly.

Moreover, information relating to system management may be uploaded and used to repopulate storage management components within the system such as a storage manager or master storage manager reflecting the return of the retrieved data to primary storage (block 2050). For example, a storage manager index may be updated to reflect the presence of the retrieved data along with certain management information such as logical offsets and location of the retrieved information such that the retrieved information may be located and accessed. Other management components, such as a master storage manager may also be updated with the appropriate identification and location information to reflect the return of the retrieved data within the system.

In certain embodiments, the copied data and metadata may be deleted from the source location (blocks 2044-2048). For example, at block 2044, it may be determined whether the copied data objects in secondary storage should be deleted based user preferences, storage policy requirements or other system constraints such has diminished storage capacity. At blocks 2046 and 2048 the data objects and records may be deleted within the system including any metabase or other system management information associated with the retrieved data. Storage management components such as storage managers, media agents may also be updated to reflect the removal or deletion of such information (block 2050).

Systems and modules described herein may comprise software, firmware, hardware, or any combination(s) of software, firmware, or hardware suitable for the purposes described herein. Software and other modules may reside on servers, workstations, personal computers, computerized tablets, PDAs, and other devices suitable for the purposes described herein. Software and other modules may be accessible via local memory, via a network, via a browser or other application in an ASP context, or via other means suitable for the purposes described herein. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, command line interfaces, and other interfaces suitable for the purposes described herein. Screenshots presented and described herein can be displayed differently as known in the art to input, access, change, manipulate, modify, alter, and work with information.

While the invention has been described and illustrated in connection with preferred embodiments, many variations and modifications as will be evident to those skilled in this art may be made without departing from the spirit and scope of the invention, and the invention is thus not to be limited to the precise details of methodology or construction set forth above as such variations and modification are intended to be included within the scope of the disclosure.

What is claimed is:

1. A method of identifying data to store in a metabase, the method comprising:
    monitoring with a journaling module, data interactions between at least one application and one or more of a plurality of data objects stored in a file system, wherein the journaling module is separate from the application and wherein the journaling module populates an index with entries about the data interactions;
    displaying with one or more computer processors a user interface that allows a user to input a user-defined tag expression, wherein the user-defined tag expression comprises information associated with data interactions the user desires to track;
    tagging entries in the index that meet the user-defined tag expression, wherein the tagging associates a tag identifier with the entries;
    scanning entries in the index to identify at least a first entry from the index associated with the tag identifier, wherein the first entry corresponds to a first data interaction with a first data object meeting the tag expression;
    obtaining from the index first metadata about the data interaction associated with the first entry;
    accessing the first data object associated with the first entry, to obtain second metadata, wherein the second metadata comprises information about the first data object that the user desires to track;
    obtaining from the index third metadata, wherein the third metadata comprises the tag identifier associated with the first entry;
    updating a metabase with the first, second and third metadata such that the metabase associates the tag identifier with first metadata obtained from the index and the second metadata obtained from the first data object, wherein the metabase is stored separately from the first data object and separately from the file system containing the first data object, wherein said updating further comprises determining which of a plurality of metabases comprises records storing first, second or third metadata associated with the first data object; and
    in response to a user request for information about data interactions associated with the user-defined tag expression, accessing the first, the second or the third metadata in the metabase to determine data interactions that meet the user-defined tag expression without accessing either the plurality of data objects or the file system.

2. The method of claim 1, wherein information about the selected entry comprises information indicative of modifications to the first data object.

3. The method of claim 1, wherein the first, second and third metadata in the metabase is stored separately from the entire contents of the data objects.

4. The method of claim 1, further comprising accessing one or more of the first, second or third metadata associated with the data objects one or more times to update the metabase.

5. The method of claim 1, wherein said updating comprises:
    determining whether the selected entry in the index of data interactions has an existing record in the metabase;
    if no record exists corresponding to the selected entry, creating a new record in the metabase; and
    updating the existing record or the new record with at least a part of the information obtained from the selected entry.

6. The method of claim 1, wherein said selecting comprises determining whether the entry is a new entry in the index of data interactions.

7. The method of claim 6, wherein the entry is considered to be new if a time stamp of the entry is later than a time at which a previous entry was analyzed.

8. The method of claim 6, wherein the entry is considered to be new based on an identifier of the entry.

9. The method of claim 8, wherein the identifier comprises an update sequence number that identifies the entry in the index of data interactions.

10. The method of claim 1, further comprising initially populating the metabase by accessing the data objects so as to access available first, second or third metadata associated with the data objects.

11. The method of claim 10, additionally comprising:
    quiescing the data interactions associated with the at least one storage device; and
    performing said populating during said quiescing.

12. The method of claim 11, wherein said populating is performed during operation of the at least one storage device.

13. The method of claim 12, additionally comprising queuing the data interactions generated during said populating to allow capture of the data interactions during the accessing process.

14. The method of claim 1, additionally comprising receiving input regarding the user-defined tag expression, wherein said obtaining information is based at least in part on said user-defined tag expression.

15. A system for managing electronic data in a storage network, the system comprising:
- a journaling module executing in one or more processors that is configured to monitor data interactions between at least one application and one or more the plurality of data objects associated with a file system, wherein the journaling module is separate from the application and wherein the journaling module is further configured to populate an index with entries about the data interactions;
- a user interface executing in one or more computer processors, wherein the user interface allows a user to input a user-defined tag expression that comprises information associated with data interactions the user desires to track;
- a data classification module executing in one or more processors configured to:
  - entries in the index that meet the user-defined tag expression, wherein the data classification module associates a tag identifier with the entries;
  - scan entries in the index to identify at least a first entry from the index associated with the tag identifier, wherein the first entry corresponds to a first data interaction with a first data object meeting the tag expression;
  - obtain from the index first metadata about the data interaction associated with the first entry;
  - access the first data object associated with the first entry, to obtain second metadata, wherein the second metadata comprises information about the first data object that the user desires to track;
  - obtain from the index third metadata, wherein the third metadata comprises the tag identifier associated with the first entry;
  - update in a metabase the first, second and third metadata such that the metabase associates the tag identifier with the first metadata obtained from the index and the second metadata obtained from the first data object, wherein the metabase is stored separately from the first data object and separately from the file system containing the first data object,
  - wherein said updating further comprises determining which of a plurality of metabases comprises records storing first, second or third metadata associated with the first data object;
  - in response to a user request for information about data interactions associated with the user-defined tag expression, the data classification module is configured to access the first, the second or the third metadata in the metabase to determine data interactions that meet the user-defined tag expression without accessing either the plurality of data objects or the file system.

16. The system of claim 15, wherein the journal file is populated by a monitoring module.

17. The system of claim 15, wherein the data classification module is further configured to access the one or more data objects one or more times to update the metabase.

18. The system of claim 15, wherein the properties of the data objects are stored in the metabase separately from entire content of the data objects.

19. The system of claim 15, wherein the information obtained from the selected entry is indicative of modifications to metadata of the first data object resulting from the first data interaction.

20. The system of claim 19, wherein the first, second or third metadata comprises at least one of: a data owner, a last modified time, a last accessed time, a data object size and an application type.

21. The system of claim 15, wherein the data classification module is further configured to classify the one or more properties of the data object based on the user-defined tag expression.

22. The system of claim 15, wherein the data classification module is further configured to periodically scan the entries in the index.

23. The system of claim 22, wherein the data classification module is further configured to allow analysis of the one or more properties of the data objects based on a selected criteria without accessing the data objects.

* * * * *